Jan. 30, 1923. 1,443,638
F. MULLER
MACHINE FOR AND METHOD OF CUTTING UNDERCUT CUTTERS.
FILED MAY 13, 1921 7 SHEETS-SHEET 5

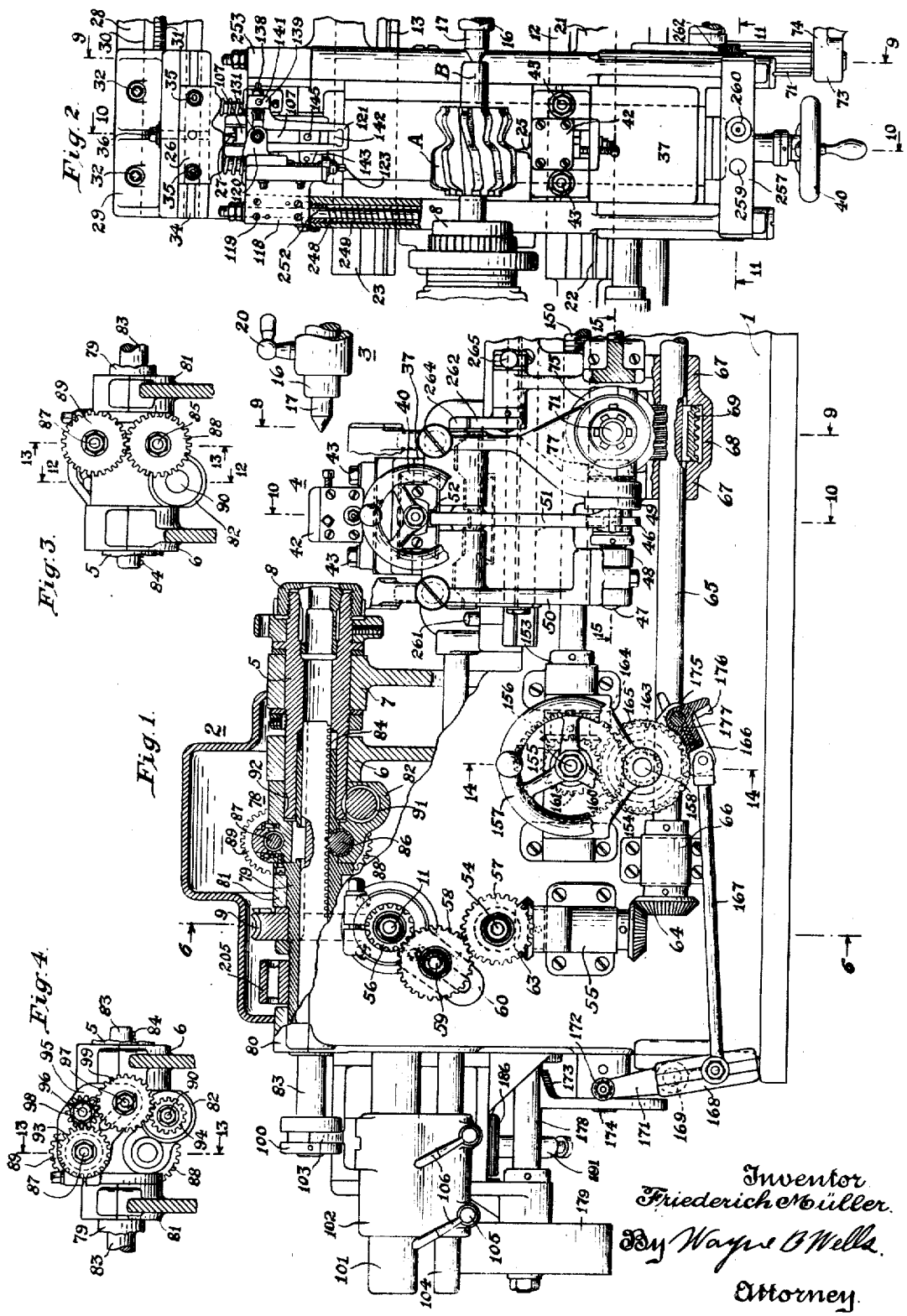
Jan. 30, 1923.
F. MÜLLER.
MACHINE FOR AND METHOD OF CUTTING UNDERCUT CUTTERS.
FILED MAY 13, 1921.
1,443,638
7 SHEETS-SHEET 1

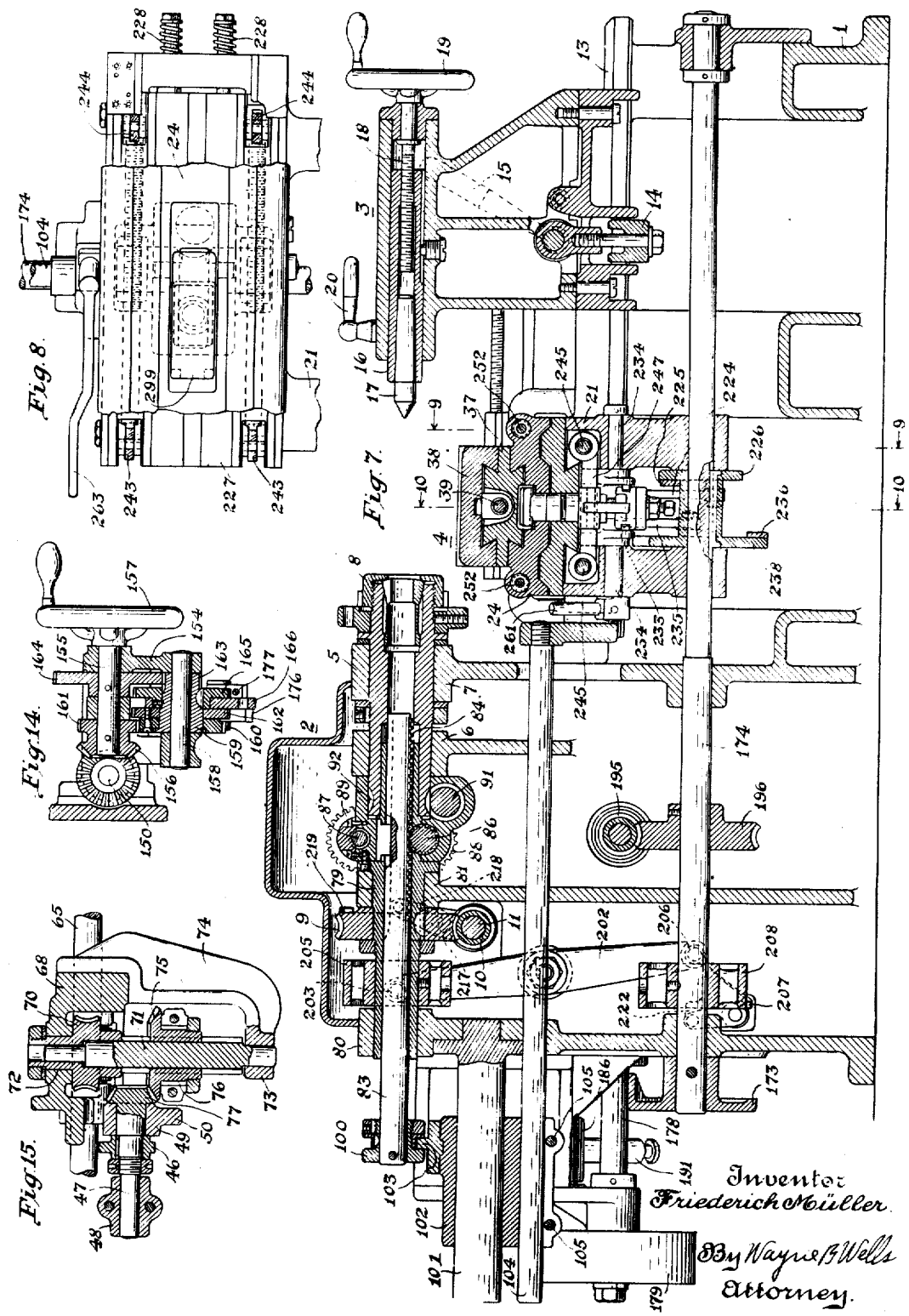

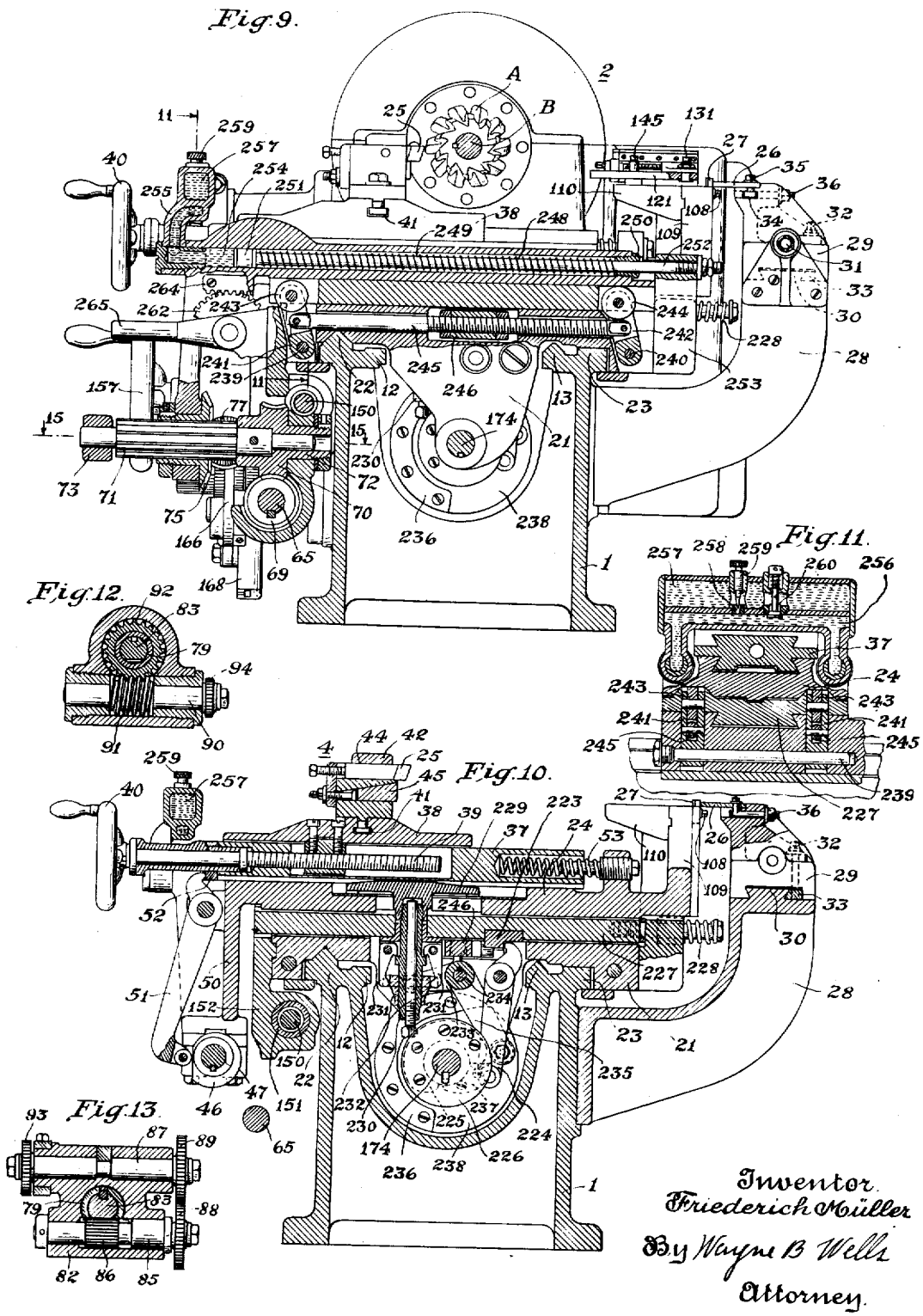

Inventor
Friederich Müller.
By Wayne B Wells
Attorney.

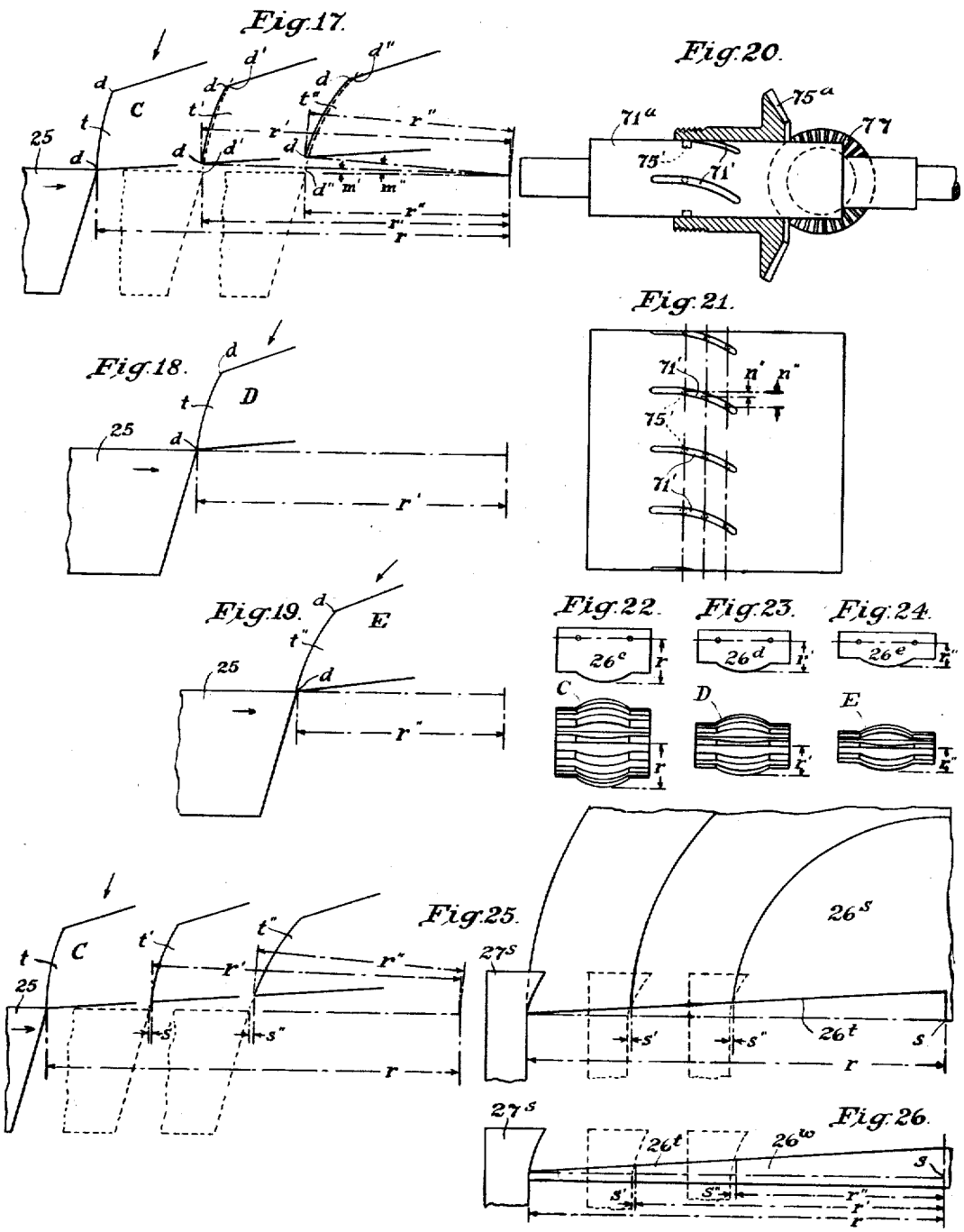

Jan. 30, 1923.
F. MÜLLER.
MACHINE FOR AND METHOD OF CUTTING UNDERCUT CUTTERS.
FILED MAY 13, 1921.
1,443,638
7 SHEETS-SHEET 7
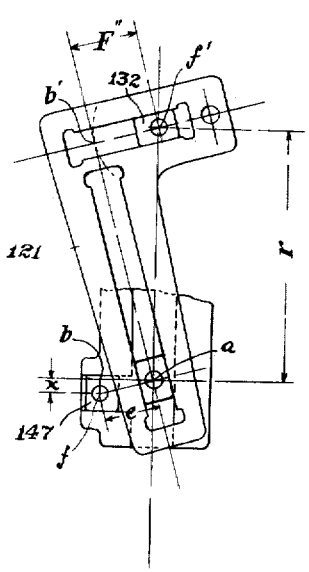
Fig. 30.
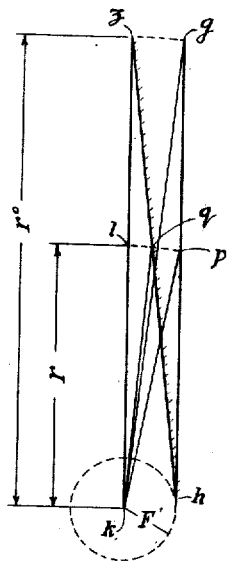
Fig. 31.
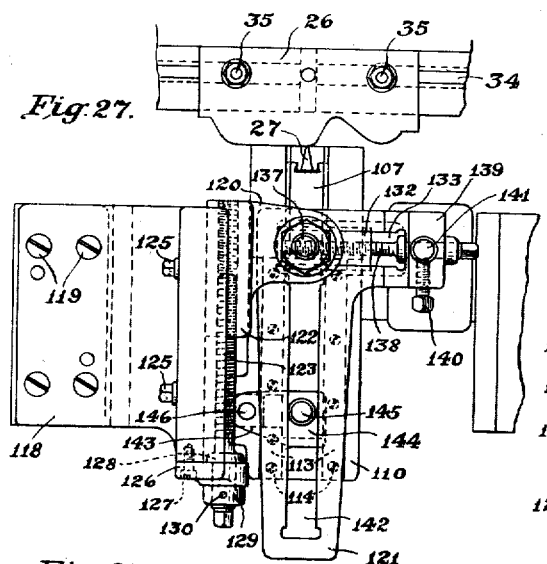
Fig. 27.
Fig. 28.
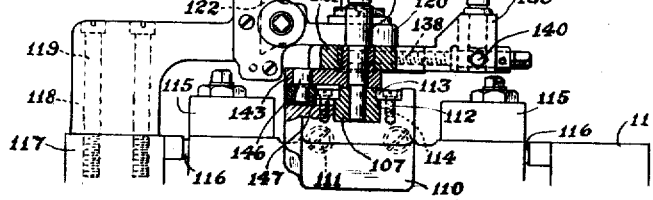
Fig. 29.
Inventor
Friederich Müller
By Wayne B Wells
Attorney.

Patented Jan. 30, 1923.

1,443,638

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MACHINE FOR AND METHOD OF CUTTING UNDERCUT CUTTERS.

Application filed May 13, 1921. Serial No. 469,266.

*To all whom it may concern:*

Be it known that I, FRIEDERICH MÜLLER, a citizen of the United States, residing at Hartford, in the county of Hartford and State of Connecticut, have invented certain new and useful Improvements in Machines for and Methods of Cutting Undercut Cutters, of which the following is a specification.

My invention relates to relieving machines for operating on cutter blanks having teeth provided with non-radially arranged cutting faces and to methods of shaping cutter blanks having non-radially arranged cutting faces.

One object of my invention is to provide a machine that shall cut a blank to a rectilinear or to a non-rectilinear contour while relieving the teeth and compensating such relieving operation at different blank diameters for non-radially arranged cutting faces on the teeth of the blank.

Another object of my invention is to provide a relieving machine that shall cut a blank, which is provided with helical teeth having undercut or non-radially arranged cutting faces, to a predetermined rectilinear or non-rectilinear contour while relieving the helical teeth on the blank and compensating such relieving operation for the non-radially arranged cutting faces on the teeth of the blank.

Another object of my invention is to provide a machine of the above indicated character that shall be provided with a pin and a former for guiding a cutting tool to cut the blank to a predetermined contour, means for relieving the teeth of the blank in conformity either to helical or straight teeth, and means for so varying the relieving operation as to compensate at different blank diameters for non-radially arranged cutting faces on the teeth of the blank.

Another object of my invention is to provide means for varying the rotative movement of the spindle, which carries the metal blank, in accordance with the helical teeth on the blank in combination with means for relieving the teeth, and means for varying the relieving operation at different blank diameters to compensate for the non-radial cutting faces on the teeth of the blank.

Another object of my invention is to provide a relieving machine with mechanism for effecting intermittent longitudinal feeding movements between the cutting tool and the blank, means for stopping the blank rotation during each feeding movement, means for effecting transverse movements of the tool to permit the intermittent longitudinal feeding movements, and means for relieving the teeth of the blank while compensating at different blank diameters for the non-radial cutting faces on the teeth.

Another object of my invention is to provide a method that shall form a blank with a rectilinear or a non-rectilinear contour while relieving the teeth and compensating such relieving operation at different blank diameters for non-radially arranged cutting faces on the teeth of the blank.

Another object of my invention is to provide a method of forming a milling cutter which consists in effecting intermittent longitudinal feeding movements between a cutting tool and the cutter blank, in stopping the blank rotation during each feeding movement, in effecting transverse movements of the tool to permit the intermittent longitudinal feeding movements, and in relieving the teeth of the blank while effecting compensation at different blank diameters for the non-radial cutting faces on the teeth.

A further object of my invention is to provide a relieving machine, which effects feeding movements of the above indicated character, that shall be provided with means, preferably comprising a pin and a former, for so guiding a cutting tool as to cut the blank to any predetermined variable contour while effecting relieving movements and that shall compensate the relieving operation at different blank diameters for non-radial cutting faces on the teeth of the blank.

More specifically, my invention comprises a relieving machine for cutting a blank, which is provided with either helical or straight teeth having undercut or non-radially arranged cutting faces, to any predetermined contour while relieving the teeth of the blank and, moreover, while varying either the relieving movements or the position of the relieving movements to compensate at different blank diameters for the non-radially arranged cutting faces on the teeth of the blank.

In the art of cutting many materials and particularly in cutting metals, it is preferable for many classes of work to incline the face of the cutting tool backward with respect to the direction of movement thus providing a rake or undercut which provides a sharper cutting edge and enables other advantages to be obtained. To a very limited extent this principle has been applied to milling cutters, the cutter faces being inclined backward with respect to radial lines, but it has not, heretofore, been deemed possible to cut a milling cutter to different diameters in accordance with a predetermined contour and to effect relieving movements so that the teeth could be ground on the cutting faces without changing the effective contour of the blank. If the cutter is cut to more than one diameter and the teeth have faces which are undercut or non-radially arranged, it is essential while cutting the blank to compensate the relieving operation at the different blank diameters for the non-radial cutting faces on the teeth.

The mechanism disclosed in this application includes some features of the machines disclosed in my patents Nos. 1,429,611 and 1,429,617, and is adapted to cut a cutter such as is described and claimed in my copending application, Serial No. 323,110, filed September 11th, 1919.

The cutters, which are shaped by the relieving machine disclosed in this application, are adapted to cut any practical contour. Each cutter blank is cut to different diameters and is adapted to cut either a rectilinear or non-rectilinear contour. The cutting teeth on the blank are either helical or straight in form and are provided with non-radially arranged cutting faces. In case the teeth are helical in form, the cutting face of each tooth conforms to a helicoid. The helicoid is formed by a generatrix following a helix on a small cylinder concentric with the axis of the cutter and also following a helix on a much larger cylinder also concentric with the axis. The teeth of the cutter and the cutting faces may be inclined in either direction with respect to the axis and the degree of inclination may be varied as required.

Each tooth of the cutter is relieved along lines extending backward and inward from the outline of the non-radial cutting face. The relief lines form a continuous surface or continuous surfaces which extend from end to end of the cutter. The relief lines are properly constructed notwithstanding variations in radius at different points along the outline of the cutter and notwithstanding the variations in angular positions resulting from the non-radial helical cutting face. Preferably, the relief lines are maintained in similar relationship to each other as they extend backward and inward, the lines conforming to spirals of Archimedes.

When the relief lines conform to spirals and are maintained in similar relationship as they extend backward and inward, as is preferred, it is possible to sharpen or grind the teeth of the cutter on the front cutting faces without changing the effective contour. The teeth present the same effective contour at successive non-radial helicoidal surfaces of intersection similar in form and position to the initial cutting faces. At any surface back of the initial cutting face and similar to said face, the same effective contour will be found. Therefore, if the teeth are ground on their front faces to non-radial helicoids which are the same as the non-radial helicoids of the initial cutting faces, the effective contour will remain the same.

In the accompanying drawings:

Figure 1 is a partial front elevational view, partially in section, of a machine constructed in accordance with my invention.

Fig. 2 is a partial plan view of the machine showing the tool-carrying slides.

Figs. 3 and 4 are detailed views of the mechanism for varying the movement of the blank-carrying spindle, the views being taken from opposite sides of the machine.

Fig. 7 is a vertical longitudinal sectional view of the machine.

Fig. 8 is a fragmentary plan view showing certain parts of the tool-carrying slides.

Fig. 9 is a transverse vertical sectional view taken along the lines 9—9 of Figs. 1, 2 and 7.

Fig. 10 is a transverse vertical sectional view taken along the lines 10—10 of Figs. 1, 2 and 7.

Fig. 11 is a fragmentary longitudinal sectional view along the lines 11—11 of Figs. 2 and 9.

Fig. 12 is a fragmentary transverse sectional view taken along the lines 12—12 of Fig. 3.

Fig. 13 is a transverse sectional view taken along the lines 13—13 of Figs. 3 and 4.

Fig. 14 is a fragmentary vertical transverse sectional view taken along the lines 14—14 of Fig. 1.

Fig. 15 is a horizontal longitudinal sectional view taken along the lines 15—15 of Figs. 1 and 9.

Figs. 17, 18 and 19 are diagrammatic views illustrating one operation that may be followed in operating on cutters having non-radially arranged cutting faces.

Fig. 20 is a fragmentary sectional view similar in part to Fig. 9 but showing an alternate construction adapted to be used when operating on cutters having non-radially arranged cutting faces.

Fig. 21 is a development view of the cam member shown in Fig. 20.

Figs. 22, 23 and 24 are diagrammatic views showing the relation between the former members and the blanks for cutters provided with non-radially arranged cutting faces.

Fig. 25 is a diagrammatic view, in some respects similar to Fig. 17, illustrating another operation that may be followed in operating on cutters having non-radially arranged cutting faces.

Fig. 26 is a fragmentary view showing an alternate construction of the former member and the former pin adapted to be used for operating on cutters having non-radially arranged cutting faces.

Fig. 27 is an enlarged plan view of the preferred mechanism used when operating on blanks having non-radially arranged cutting faces.

Fig. 28 is a side elevational view, partially in section, of the mechanism shown in Fig. 27.

Fig. 29 is an end elevational view, partially in section, of the mechanism shown in Fig. 27.

Fig. 30 is a diagrammatic view showing the relation of the levers illustrated in Figs. 27, 28 and 29.

Fig. 31 is a diagrammatic view showing in development a cutter having teeth provided with non-radially arranged cutting faces.

Figure 5:
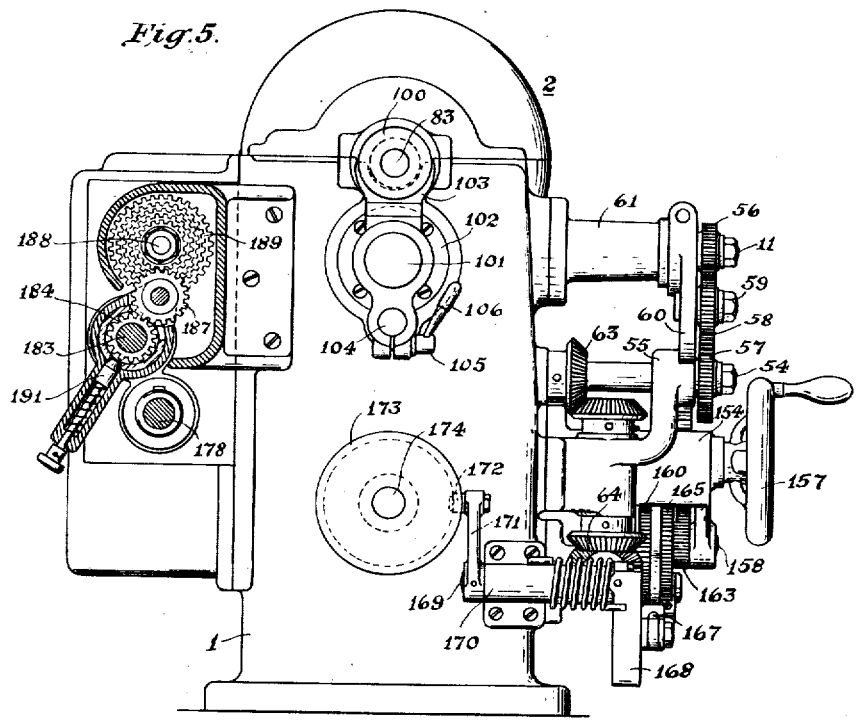
Fig. 5 is an end view of the machine taken from the left.

Referring to the drawings, a relieving machine is provided with a main frame or bed 1 upon which the other parts of the machine are mounted. A headstock 2 and a tailstock 3 are provided for carrying the blank which is to be operated on. A tool holding-and-operating mechanism 4 is provided, as shown in Fig. 1. Preferably the headstock 2 and the tailstock 3 are so arranged as to hold the blank against longitudinal movement, the tool mechanism 4 being moved longitudinally along the blank in the manner to be presently set forth. When the machine is so constructed, the headstock 2 is fixedly secured to the bed, preferably being formed in part integrally therewith, as shown. The tailstock 3 is adjustable along the bed to accommodate blanks or blank arbors of different lengths.

The headstock 2 is provided with a rotatable spindle 5 mounted in suitable bearings 6 and 7. Secured to the spindle 5, in any suitable manner, is a collet chuck 8 which may be of any usual or preferred form and which is adapted to grip either the shank of the tool to be formed and relieved or an arbor upon which the tool is mounted. As illustrated, there is a blank A mounted upon an arbor B, the arbor being engaged by the chuck 8. A drive mechanism including a driving member in the form of a worm wheel 9, which meshes with a worm 10 on a transverse rotatable shaft 11, is provided for rotating the spindle 5.

The tailstock 3 may be of any usual or preferred construction, and is adjustable along ways 12 and 13. The tailstock 3 can be secured in adjusted position by means of a clamp 14 which is controlled by a lever 15. The tailstock spindle 16, which carries a center 17, can be moved longitudinally by means of a screw 18 under the control of a hand wheel 19. A handle 20 is provided for clamping the sleeve in adjusted position. As shown in Fig. 2, the center 17 is adjusted into engagement with the end of the arbor B.

The tool mechanism 4 includes a carriage 21 which is longitudinally movable along ways 22 and 23 on the bed 1. A slide 24, which is mounted for transverse movement with respect to the carriage 21, carries the cutting tool. In the figures of the drawings I have shown a non-rotary lathe tool 25, and such a tool is preferable for many classes of work. However, the invention is not limited to a non-rotary tool and when preferred a rotary tool can be used. The tool 25 is preferably very narrow, but if desired a wider tool can be used when constructed in accordance with the method set forth in my application Serial No. 270,941, filed January 13th, 1919.

As stated at the outset, a machine embodying the invention is adapted for cutting a blank having a varying diameter. The diameter may vary uniformly from end to end of the blank, thus providing a uniform taper, or it may vary in any desired way so as to provide the blank with any predetermined contour differing from a straight line. The variations in the diameter of the blank are determined by moving the slide 24 together with the tool transversely, and preferably, for regulating and controlling the transverse movements, I provide a former and a former pin, one carried in fixed position on the bed 1, and the other carried by the slide 24. As illustrated, a former 26 is carried by the bed 1 and a former pin 27 is carried by the slide 24. The former 26 has exactly the same contour with which the blank is to be formed and the former pin 27 has exactly the same shape as the cutting tool 25. The pin is detachably secured to the slide in a manner to be hereinafter set forth, so that it can be removed and another pin be substituted corresponding to a tool differing in shape from the tool 25 which is shown. A bracket 28, which is rigidly secured to the bed 1, is provided for supporting the former 26. In order to permit adjustment, the former 26 is secured to a slide 29 which is longitudinally movable along a suitable guideway 30 on the bracket, a screw 31 being provided for effecting longitudinal movement. The slide can be locked in adjusted position by means of screws 32, 32 which engage a gib 33. The slide 29 is provided with a T-slot 34, which is adapted to receive T-bolts 35 passing through the former. Such arrangement is provided to permit the ready adjustment of the former. To further assist in holding the former in place and to prevent any possible free movement thereof, a hooked bolt 36 is provided which, when tightened, serves to draw the former back against a suitable shoulder on the slide. In practice, a former 26 is selected having the contour with which the blank A is to be formed and then by means of the slide 29 the former is adjusted longitudinally until it bears the same relation to the former pin 27 that the blank A bears to the tool 25. As the carriage 21 is moved longitudinally the slide 24 with the tool 25 is moved transversely so as to keep the former pin 27 in engagement with the former 26.

In order that the tool may be given a relieving movement to properly relieve the several teeth on the blank, it is not rigidly secured to the slide 24 but is transversely movable thereon. A slide 37, which is transversely movable along a suitable guideway, is mounted on the slide 24. A mechanism, for effecting regular reciprocating relieving movements of the slide 37 and the tool in suitable timed relation with the rotative movement of the blank, is carried in part by the slide 24. In order that the tool may be adjusted for blanks of different sizes, a tool-carrying slide 38 is provided which is transversely movable on the slide 37. A screw 39, which is rotated by means of a hand wheel 40, is provided for moving the slide 38. The slide 38 is provided with a transverse T-slot 41 and a tool post 42 is held in place by means of T-bolts 43 entering the slot 41. The tool post has a tool-receiving aperture provided with a horizontal top wall 44 exactly at the level of the axis of the blank. The tool 25 is positioned with its top surface engaging the horizontal wall 44 of the tool post and is held in this position by means of a wedge 45.

It will be observed that, with the construction described, the tool is maintained in parallelism as it moves longitudinally for feeding or inward and outward to follow the contour.

The relieving mechanism for moving the slide 37 together with the tool 25 includes a rotatable relieving cam 46 which is mounted on the slide 24 so as to be bodily movable therewith. As shown, the cam is mounted on a longitudinal rotatable shaft 47 which is mounted in bearings 48 and 49 on a bracket 50 depending from the front of the slide 24. A lever 51 is pivoted between its ends on the slide 24 and at its lower end is provided with a roller engaging the cam 46. The upper end of the lever engages an abutment 52 on the slide 37. A coil spring 53 is interposed between the slide 37 and the slide 24, this spring tending to press the slide 37 forward, thus holding the abutment 52 in firm contact with the upper end of the lever 51. It will be seen that, when the cam 46 is rotated, the lever 51 will be oscillated, thus giving a reciprocating movement to the slide 37 and to the tool 25. The shape of the cam 46 is such that the slide 37 is moved forward relatively slowly at a uniform rate so that the tool may effect a relieving cut, and is then drawn back relatively rapidly so as to withdraw the tool and position it for another cut.

The cam 46 is driven in timed relation with the blank rotation, as before stated. For rotating the cam, I make use of the aforesaid transverse shaft 11. A shaft 54, which is mounted partly in the main frame 1 and partly in a bracket 55 secured thereto, is positioned immediately below the shaft 11. The two shafts 11 and 54 are connected by means of a gear wheel 56 on the shaft 11, a gear wheel 57 on the shaft 54 and an idler gear wheel 58 meshing with the two gear wheels 56 and 57. The idler gear wheel is mounted on a bearing stud 59 which is carried by an adjustable slotted arm 60. The arm 60 is carried by a hub 61 which assists in supporting the shaft 11. The speed ratio between the two shafts 11 and 54 can be changed by removing one or both of the gear wheels 56 and 57 and substituting other gear wheels of different diameters, it being clear that the idler gear wheel 58 can be adjusted to mesh with such differently diametered gear wheels. A vertical shaft 62 is mounted in the bracket 55 and is driven from the shaft 54 by means of bevel gearing 63. The shaft 62 serves to drive a longitudinally splined shaft 65 by means of bevel gearing 64. The shaft is supported partly in a bearing 66 secured to the bed and partly in bearings 67 on a depending bracket 68 secured to the carriage 21.

A worm 69, which is mounted on the shaft 65 between the bearings 67, is splined to the shaft. The worm 69 meshes with a worm wheel 70 which is connected with a transverse shaft 71. The worm wheel 70 and the shaft 71 are rotatably mounted in a bearing 72 formed in the bracket 68, and in a bearing 73 formed on a supplemental bracket 74 secured to the bracket 68. A bevel gear wheel 75 is slidably mounted on the shaft 71 and is engaged by a bearing 76 on the aforesaid bracket 50 depending from the front end of the slide 24. The bevel gear wheel 75 meshes with a bevel gear wheel 77 on the shaft 47. The bevel gear wheel 75 and the shaft 71 are splined or otherwise suitably constructed so that the bevel gear wheel is rotated, but is at the same time free to move transversely of the machine when the slide 24 is moved. Inasmuch as the bevel gear wheels 75 and 77 are both supported by the bracket 50, they are at all times held in mesh. It will be seen that with this construction power is transmitted from the shaft 11, through the several parts that have been described, to the shaft 65, and is transmitted from the shaft 65 to the shaft 47 and the cam 46, the connection between the shaft 65 and the shaft 47 being such that free transverse movements of the cam and associated parts is permitted. The cam 46 is given one complete rotation for each tooth of the blank. The machine can be adjusted for blanks with different numbers of teeth by changing the gear wheels 56 and 57, as already explained.

As has already been stated, the machine is adapted for cutting blanks having helical teeth. In order that blanks with such teeth may be properly relieved, it is necessary to effect the relieving movements of the tool in peculiar relation to the rotative movement of the blank so that the relief may be in conformity with the helical teeth. I have stated that the relieving movements of the tool are effected in timed relation to the rotative movement of the blank; and, for any given position of the carriage, this timed relation is fixed and definite, but when the carriage is moved to bring the tool into a new cutting position, it is necessary to vary the relation between the relieving movements of the tool and the rotative movement of the blank. For this purpose I make use of a mechanism which is in many respects similar to that set forth in my aforesaid Patent No. 1,429,611. The present construction differs, however, in that I have so arranged the mechanism that the aforesaid relationship is varied by changing the rotative movement of the blank rather than by changing the relieving movements of the tool. While I prefer to change the blank rotation, it will be understood that my present invention in its broader aspects is not limited in this respect.

In the construction illustrated, the driving member or worm wheel 9 is not connected directly with the spindle 5 but is connected indirectly by means of suitable gearing 78 which can be supplementally moved to change the spindle rotation. By preference, this gearing is bodily rotatable and includes a rack and pinion, the rack being longitudinally slidable in accordance with the longitudinal movements of the carriage 21. A sleeve 79 is coaxially mounted with the spindle 5 and is supported by bearings 80 and 81 in the headstock. The inner end of the sleeve 79 preferably extends into and has a bearing in the outer end of the spindle 5. A frame 82 is recessed to receive the outer end of the spindle 5 and to engage the outer surface thereof. The aforesaid worm wheel 9 is rigidly secured to the sleeve 79. A shaft 83 having rack teeth formed thereon at 84 is slidably mounted in the sleeve 79. The shaft 83 is splined to the sleeve 79 so as to be rotatable therewith. A transverse shaft 85, which is provided with teeth 86 meshing with the rack teeth 84, is rotatably mounted in bearings in the frame 82. A transverse shaft 87 is also rotatably mounted in the frame 82. The two shafts 85 and 87 are connected by spur gear wheels 88 and 89. A third rotatable shaft 90 is rotatably mounted in the frame 82. A worm 91, which meshes with worm teeth 92 formed in the periphery of the spindle 5 near the end thereof, is secured to the shaft 90. A gearing is provided at the side of the bracket 82 opposite from the gears 88 and 89 for connecting the shafts 87 and 90. A gear wheel 93 is mounted on the shaft 87, and a gear wheel 94 is mounted on the shaft 90. An adjustable slotted bracket 95 is mounted on the frame 82 and this carries adjustable bearing studs 96 and 97 on which are mounted, respectively, idler gear wheels 98 and 99.

An annularly grooved collar 100 is carried by the shaft 83 near the outer end thereof. A longitudinal guide stud 101 is rigidly secured to the main frame 1 adjacent the shaft 83. A bracket 102 having a fork 103 entering the groove in the collar 100 is slidably mounted on the stud 101. The bracket 102 is apertured to receive a longitudinal rod 104, which is connected at its right-hand end with the carriage 21. The bracket 102 may be clamped to the rod 104 in any desired relative position and preferably by means of screws 105, 105 provided with handles 106.

It will be seen that, when the carriage 21 is moved longitudinally along the bed, the rod 104, together with the bracket 102, will be moved at the same time and to the same extent. By reason of the engagement of the fork 103 with the collar 100 the shaft 83 is similarly moved, thus moving the rack teeth 84. When the rack slides longitudinally the pinion 86 is turned and this serves, by means of the gearing and the several shafts that have been described, to turn the worm 91. The rotative movement of the worm 91 serves to turn the spindle 5 relatively to the frame 82 and the sleeve 79. It will be understood, as before stated, that the entire gearing 78 rotates bodily with the spindle 79. It will therefore be clear that the relative movement of the spindle 5 with respect to the sleeve 79 simply serves to either increase or decrease the spindle rotation to a certain extent. However, the relative movement of the spindle 5 is determined by the longitudinal movement of the rack 84, which in turn is determined by the longitudinal movement of the carriage 21 and of the cutting tool 25 carried thereby. Inasmuch as the relieving cam 46 reciprocates the tool with a frequency which is normally uniform, and inasmuch as the spindle 5 and the blank are given a changed rotation which is in exact proportion to the longitudinal movement of the carriage and the tool, it is clear that the relieving movements are effected in such relation to the blank as to be in conformity with helical teeth.

The amount of variation of the spindle 5 and blank rotation can be changed in accordance with the degree of inclination of the helical teeth by removing one or the other or both of the gear wheels 93 and 94 and substituting other gear wheels of different diameters. The idler gear wheels 98 and 99 can be properly adjusted to mesh with such differently diametered gear wheels. It is also possible to cause the relative movements of the spindle 5 to take place in either direction in conformity with helical teeth inclined in either direction. As illustrated, the machine is adjusted for cutting teeth with left-hand helices. For cutting teeth with right-hand helices the idler gear wheel 98 is removed and the gear wheel 99 is adjusted to mesh directly with the gear wheels 93 and 94. When it is desired to cut a blank with straight teeth instead of helical teeth, the gearing is rendered ineffective, as for instance by loosening the clamping screws 105, thus permitting the rod 104 to slide freely through the bracket 102. By loosening the clamping screws 105 it is possible to preliminarily adjust the carriage without affecting the position of the spindle 5 and blank. When the cutter and the blank have been properly adjusted relatively, the handles 106 are turned to connect the carriage with the mechanism for controlling the spindle rotation.

From the foregoing description it will be observed that in following helical teeth as described, the blank is rotated in each instance through a little more or a little less than one revolution, as required for right-hand or left-hand helices. It will further be seen that during each rotative movement of the spindle 5 and blank a whole number of relieving movements are effected.

The blank A, shown in Fig. 9, is provided with teeth having their front cutting faces arranged exactly radially. Frequently, however, it is desired to provide a cutter with undercut or hooked teeth; that is, teeth having their front cutting faces inclined with respect to radial lines. Such a cutter is set forth in my copending application for milling cutters, Serial No. 323,110, filed September 11th, 1919. For cutting a blank with undercut faces, it is necessary to vary the ordinary relation between the relieving movements of the tool and the rotative movement of the blank as the cutting tool moves inward or outward to conform to different blank diameters. When such blanks are to be cut, the mechanism heretofore described may be somewhat modified.

One way of varying the relation will be understood by reference to the diagrammatic Fig. 17. In this view $t$ may be considered to be a fragmentary sectional view taken at the maximum radius $r$ of a cutter C having undercut faces. Under the control of the former and the former pin, the cutting tool 25 is at a distance $r$ from the blank axis and is in position to engage the point of the tooth shown and to cut the proper relief line $d-d$ thereon. The tooth section at a smaller radius $r'$ is shown at $t'$. For this radius, without special provision being made, the tool 25 would be in the position indicated by dotted lines at the distance $r'$ from the blank axis. However, by reason of the inclined cutting face on the blank, the blank tooth would not be in engagement with the tool but would be separated therefrom by the angle $m'$. The tool, however, would immediately start its inward relieving movement notwithstanding the fact that the blank tooth had not yet reached it, and the result would be the cutting of an incorrect relief line $d'-d'$. For a still smaller radius $r''$ of the blank, as shown at $t''$, the result would be similar except that the point of the tooth would be separated from the tool by a greater angle $m''$, with the result that the incorrect relief line $d''-d''$ would be further from the correct relief line $d-d$.

In order to avoid the errors which would occur, as shown in Fig. 17, I vary the relationship between the relieving movements of the tool and the rotative movement of the blank in such a way that the tool, as concerns its relieving movements, is always in the same position when engaged by the front edge of the tooth. This will be clear from an inspection of Figs. 18 and 19. Fig. 18 shows the tool at the same radius $r'$ from the blank axis as was shown in Fig. 17, but the relation of the relieving movement has been so changed that the blank is in position to be engaged by the point of the tool when the relieving movement starts. The tooth is therefore cut with the correct relief line $d-d$. Similarly, in Fig. 19, the tool is shown at the same distance $r''$ from the blank axis as was shown in Fig. 17, but the relation of the relieving movement has been so changed that the blank is in position to be engaged by the point of the tool when the effective relieving movement starts. The tooth is therefore cut with the correct relief line $d$—$d$. It will be seen that the operation, as illustrated in Figs. 17 to 19, is in no way effected by or dependent on the longitudinal inclination of the cutting faces. In other words, it is immaterial whether the cutting faces be helical or straight.

The required variations in the relationship between the relieving movements of the tool and the rotative movement of the blank can be brought about either by changing (usually advancing) the blank movement or by changing (usually retarding) the tool movements. I have found it simpler, to retard the tool movements, and this is particularly desirable when means are provided as herein disclosed for changing the blank movement to conform to helical teeth. In order that the tool movements may be properly retarded, use may be made of an alternate construction such as shown in Figs. 20 and 21. This is similar to that already described except that a shaft $71^a$ and the bevel gear wheel $75^a$ are substituted for the shaft 71 and the gear wheel 75 before described. The shaft $71^a$, instead of being provided with straight splines, is provided with inclined cam grooves $71'$, and the bevel gear wheel $75^a$ is provided with pins $75'$ adapted to enter the said grooves. Fig. 21 is a development of the shaft $71^a$ showing the inclined cam grooves. With the pins $71'$ in the full line position shown, which corresponds to the radius $r$, the cam 46 is in position to immediately start the inward relieving movement of the tool. From the description which has been given of the mechanism for driving the relieving cam, it will be recalled that for any given longitudinal position of the tool, the cam is ordinarily rotated at a speed exactly in proportion to the rotative movement of the spindle and blank. When the tool is moved inward to a position corresponding to the radius $r'$, the normal rotative movement of the cam is retarded by an angular distance $n'$ which corresponds to the angle $m'$ shown in Fig. 17. When the tool moves still further inward to a position corresponding to the radius $r''$, the cam is still further retarded through an angular distance $n''$ corresponding to the angle $m''$ shown in Fig. 17. The result of this retarding of the tool is to cause it to be always in the same position as concerns its relieving movements when the front edge of the tooth reaches it.

The fact that the blank may not have the maximum radius $r$ is immaterial provided that the bevel gear wheel $75^a$ is made to take the proper positions along the cam shaft $71^a$. In order that this may be conveniently brought about, the former is preferably constructed so as to correspond to the radius of the blank to be cut. If the cutter C is to have a maximum radius $r$, the former $26^c$ is made with the point of maximum radius at a distance $r$ from a given reference line, for instance, the center line of the bolts 35, 35. If a cutter D is to be made having a radius $r'$, then the former $26^d$ is made with the point of maximum radius at the distance $r'$ from the center line of the bolts. If a cutter E is to be made having a maximum radius $r''$, then the former $26^e$ is made with its point of maximum radius at the distance $r''$ from the center line of the bolts. The construction of the formers in the way described insures the location of the sliding gear wheel $75^a$ on the shaft $71^a$ at positions corresponding exactly to the different radii of the blanks.

Another way of varying the relation between the relieving movements of the tool and the rotative movement of the blank to conform to undercut cutting faces, will be understood by reference to the diagrammatic Fig. 25. In this view $t$, $t'$ and $t''$ may be considered to be fragmentary sectional views of a cutter C having undercut faces, the views being taken at the radii $r$, $r'$ and $r''$ respectively, as in Fig. 17. In lieu of the former 26 ordinarily used, there is provided a special former $26^s$. This former $26^s$, instead of being provided with a vertical guide surface, is provided with a surface of revolution constructed about the center S and having the desired contour at any axial plane. The surface of revolution is such that the several radii thereof are the same as the corresponding radii of the cutter C to be formed. The former $26^s$ is provided with an undercut surface $26^t$, which is at the same angle as the undercut tooth faces of the cutter C. Cooperating with the former $26^s$ is a former pin $27^s$ of special form. At any horizontal plane the former pin $27^s$ has the same cross sectional shape as the tool 25, but the former pin is curved rearward at points above the center S of the former.

Under the control of the former $26^s$ and the former pin $27^s$ the cutting tool 25 is held at a distance $r$ from the center of the cutter C when the vertical part of the former pin $27^s$ is at a distance $r$ from the center S of the former. For a smaller radius such as $r'$, without special provision being made, the tool 25 would be in a position at the radius $r'$ from the blank. The tool would immediately start its inward relieving movement notwithstanding the fact that the blank tooth had not yet reached it, and the result would be the cutting of an incorrect relief line, as already fully explained in connection with Fig. 17. When using the construction illustrated in Figs. 20 and 21, this error is avoided by retarding the relieving movement of the tool. In accordance with the different operation now to be described, the relieving movement of the tool is not changed as to time but is changed as to position; that is, the tool 25, instead of being allowed to take a position at the radius $r'$ from the center, is caused to take a position at a radius which is greater by the distance $s'$. The distance $s'$ is such that the inward relieving movement of the tool, which starts immediately, will enable the tool to properly engage the tooth section $t'$ and properly cut the desired relief thereon. The tool 25 is held at the increased radius $r'+s'$ because of the peculiar curved shape of the former pin $27^s$ at its upper part. The former pin engages the edge of the former at a point along the inclined surface $26^t$, the point of engagement being at a higher elevation because of the inclination. The curvature is such that the vertical part of the pin is held at a distance $r'+s'$ from the center S of the former. Similarly, for the radius $r''$ the tool 25, instead of being allowed to take a position at the radius $r''$ from the center, is caused to take a position at a radius which is greater by the distance $s''$. The distance $s''$ is such that the inward relieving movement of the tool which starts immediately, will enable the tool to engage the tooth section $t''$ and properly cut the desired relief thereon. The increased radius $r''+s''$ is obtained by reason of the aforesaid curvature of the upper part of the former pin $27^s$. This curved part of the pin engages the former $26^s$ at another point along the surface $26^t$, this point being nearer the center and therefore at a still higher elevation.

A former such as $26^s$ illustrated diagrammatically in Fig. 25 would not be entirely practical for the reason that the upper part of the former pin would interfere with the former at places above the inclined surface $26^t$. A simpler and more practical former is shown in Fig. 26, this being marked $26^w$. It will be seen that this is the same in principle as the former $26^s$ but that the body of the former is below the surface $26^t$ instead of above it. This eliminates any interference with the curved part of the former pin $27^s$. The diagrammatic former $26^s$ is shown as having a radius equal to or exceeding the radius of the largest cutter which the machine is capable of cutting. The former $26^w$, as usually constructed, therefore, has a smaller radius such as $r'$.

Referring to Figs. 2, 9 and 10 and particularly to Figs. 27, 28, 29, 30, 31, 32, 33, 34 and 35, another manner of compensating the relieving operation at different blank diameters for the undercut teeth or non-radial cutting faces on the blank will be described.

The compensating mechanism disclosed in Figs. 27 to 35, inclusive, is specifically claimed in the joint application of Friederich Müller and Ernest Wildhaber, Serial No. 469,792, filed May 16, 1921. The former pin 27 is preferably dove-tailed to a sliding bar 107 and is firmly connected thereto by means of a bolt 108. The bar 107 is slidably mounted in an upstanding extending portion 109 from the slide 24 and an arm 110 which is attached to the portion 109. The arm 110 is shown attached to the extension 109 by means of bolts 111, but if so desired, such arm may be made an integral part of the slide 24. The bar 107, which slides in a slot formed in the extension 109 and the arm 110, is provided with shoulder portions 112 which are engaged by plates 113. The plates 113 are attached to the arm 110, in any suitable manner, as by means of screws 114 and hold the bar 107 in position.

Casings 115 each carrying a roller 116 are mounted on the extension 109 adjacent to the bar 107. The rollers 116 engage guideways on projecting portions 117 from the carriage 21. Reference may be had in my copending application Serial No. 522,304 filed Dec. 14, 1921, for a complete description of the construction and operation of the rollers 116 and the parts enclosed by the casings 115.

A bracket 118 is mounted on one of the projecting portions 117 of the carriage 21 and is connected thereto by bolts 119. The bracket 118 carries a supporting arm 120 which in turn pivotally supports an L-shaped guide lever or member 121. The supporting arm 120 is provided with a block portion 122 which slides in a suitable guideway formed in the bracket 118. A screw 123, which is attached to the block portion 122, is provided for adjusting the position of the bar 107 and the former pin 27 in accordance with the maximum diameter of the blank for a purpose to be hereinafter set forth. A gib member 124, which is held in position by set screws 125, is provided for holding the arm 120 in any set position. The screw 123 is rotatably mounted in a plate 126 which is attached to the bracket 118 by means of screws 127. A collar 128, which is an integral part of the screw 123, is disposed on one side of the plate 126 and a removable collar 129 is attached to the screw 123 by a pin 130 on the opposite side of the plate 126.

The arm 120 is attached to the guide member 121 by means of a connecting lever 131. The lever 131 is provided with an elongated portion 132 which fits within a slot 133 formed in the guide member 121. Shoulder portions 134 are provided which fit within grooves formed in the sides of the slot 133. A cylindrical portion 135 of the lever 131 is fitted to an opening in the arm 120 and a nut 136 is provided for holding the arm 120 and the lever 121 together. A portion 137, having a center point marked thereon, extends through the nut 136 to serve as a reference point when setting the former pin 27 for different blanks provided with different undercut.

A screw 138, which is threadedly connected to the connecting lever 131, serves to effect relative movement between the guide member 121 and the arm 120 which supports the guide member. The screw 138 is rotatably mounted in a lug 139 projecting from the lever 121. A fixed collar on the screw is disposed on one side of the lug and a removable collar is mounted on the screw on the opposite side thereof in order to prevent longitudinal movement of the screw. A set screw 140 is provided for holding the screw 138 in any adjusted position. A pin 141, having a center point marked therein, is mounted in the lug 139 and together with the portion 137 of the lever 131 serve as reference points for adjusting the lever 121.

A second slot 142, which is preferably disposed perpendicularly to the slot 133, is formed in the lever 121. A correcting lever 143 is provided with an elongated portion 144 which is fitted to the slot 142. A pin 145, which is attached to the bar 107, extends through the portion 144 of the lever 143 and is provided with a center point marked therein to serve as a reference point when adjusting the screw 123. The lever 143 is connected by a pin 146 to a block 147 which slides in a slot formed in the arm 110.

In the mechanism disclosed in Figs. 27, 28, 29, 32, 33, 34 and 35, the center marks on the pin 145 and the connecting lever 131 are adjusted, by the screw 123, a distance apart which is equal to the maximum radius of the blank. The pin 145 and the correction lever 143, which are mounted upon the slide 24, effect no translatory movement during such operation. The connecting lever 131, which carries the guide lever 121, is moved relatively to the slide 24. The center marks on the pin 141 and on the connecting lever 131 are moved a distance apart by the screw 138 in accordance with the undercut on the teeth of the blank and the angle of relief for the teeth. When adjusting the relative position of the pin 141 and connecting lever 131, it should be noted that the lever 131 is held against transverse movement by the arm 120 which is supported on the carriage 21. Consequently, the guide lever 121 is given a movement of rotation. Thus, the slot 142 is placed at an angle to the center line of the bar 107 and such angle is varied in accordance with the undercut and the angle of relief. Preferably the screw member 138 is adjusted prior to adjusting the screw member 123.

The elongated portion 144 of the correction lever 143, which is fitted to the slot 142 in the guide lever 121, compels the correction lever 143 to move an angular distance in accordance with the angular movement of the guide lever. Consequently, when the slot 142 is angularly moved with reference to the center line of the bar 107, the correction lever 143 effects an angular movement, and, in so doing not only moves the block 147 in the slot formed in the arm 110 but also moves the bar 107 and the former pin 21 forward a small amount. It should be noted that, when the guide lever 121 is given a movement of rotation, the only point on the center line of the slot 142, which coincides with the center line of the bar 107, is the center of the pin 145. Consequently, when the slide 24 is moved forward to cut smaller diameters on the blank, the correction lever 143 is moved forward to increase the angular position of the slot 142 relative to the center line of the bar 107. The arm 120, which supports the guide lever 121, is as before stated, mounted on the carriage 21 and consequently prevents the guide lever 121 from effecting any movement of translation during the forward movement of the slide 24. Thus, the forward movement of the correction lever 143 in the slot 142 compels the guide lever 121 to effect a movement of rotation about the part 135 of the connecting lever 131. The correction lever 143 is compelled to effect an angular movement in accordance with the angular movement of the guide lever. Such angular movement of the correction lever 143 effects a small translatory movement of the bar 107 and the former pin 27 relative to the slide 24.

In the above manner, the distance between the tool and the former pin is varied to compensate at different blank diameters for the non-radial cutting faces on the teeth. The means for determining the distance apart to set the center marks on the pin 141 and the connecting lever 131 will be disclosed more fully when reference is made to Figs. 30 and 31 of the drawings.

In considering the various means for varying the relieving operation at different blank diameters to compensate for the non-radial cutting faces on the teeth of the blank, it should be noted that either the position of the relieving movement may be varied or the relieving movement itself may be varied. In the means disclosed in Figs. 20 and 21 of the drawings, the relieving movement itself is varied to compensate for the undercut or non-radial cutting faces on the teeth of the blank. In the means disclosed in Figs. 25 and 26 and also in the means disclosed in Figs. 27, 28, 29, 32, 33, 34 and 35, the position of the relieving movement is varied to compensate for the non-radially arranged cutting faces.

The adjusting mechanism disclosed in Figs. 27, 28, 29, 32, 33, 34 and 35 for varying the relation between the cutting tool and the former pin is set in accordance with the maximum diameter of the cutter blank, the amount of relief and the amount of undercut on the teeth of the blank. The screw 123 is adjusted to make the distance between the center marks on the pin 145 and the connecting lever 131 equal to the maximum radius of the cutter blank. The distance between the center marks on the pins 145 and 146 is made equal to one unit of length, preferably one inch. The distance between the center marks on the pin 141 and connecting lever 131 is obtained mathematically by a formula to be explained in describing Figs. 30 and 31. The distance between the center marks on the pin 141 and connecting lever 131, when the slot 142 is parallel to the bar 107, is varied a distance $F''$ to compensate the relieving operation at different blank diameters in accordance with the undercut or the non-radial cutting faces on the teeth of the blank.

Referring to Figs. 30 and 31, it is assumed:

$x$ = The change in distance between the former pin and the cutting tool.

$e$ = Length of the correction lever 143 (one unit of length).

$F''$ = Correction factor for setting compensating mechanism.

$y$ = Required change in position of relieving movement.

$r$ = Radius of the cutter blank at any point.

$F$ = Total relief including all teeth.

$F'$ = The total undercut.

$r^\circ$ = Maximum radius of cutter blank.

Referring to Fig. 31, the distance $y$ that it is necessary to change the position of the relieving movement for non-radially arranged cutting faces is mathematically determined as follows: In Fig. 31 it is assumed $k$ is the center of the cutter blank, the line $zk$ is the cutting face of a tooth if the cutting faces were radially arranged, and the line $zh$ is the cutting face of a tooth if the cutting faces were non-radially arranged. The undercut is assumed to equal $F'$ and accordingly the line $zh$ is drawn tangent to the circle having a radius equal to $F'$. The line $qh$ is drawn parallel to, and at a distance $F'$ from the line $zk$.

At any point on the cutter having a radius $r$ which is less than the maximum radius $r^\circ$, the angle $pkq$ and $qkl$ are constructed with the lines $pk$ and $qk$ equal to the radius $r$. Comparing a cutter blank having radially arranged cutting faces with a cutter blank having undercut cutting faces, it is apparent that in the case of undercut teeth, the cutting tool would approach too near the center $k$ of the cutter blank before the cutting faces were reached by reason of the relieving movement. Thus, for a radius $r$, the cutting tool would approach the center $k$ of the cutter by a distance equal to relief effected through the angle $lkq$. Inasmuch as the total relief is $F$, the relieving distance for which compensating must be effected is equal to $$\left(\frac{\text{angle } qkl}{360}\right) F = y.$$

In other words, the position of the relieving movement tool must be changed or retarded a distance $$\left(\frac{\text{angle } qkl}{360}\right) F$$

when cutting a point on the cutter blank having a radius $r$.

Referring to Fig. 31:

The angle $qkl$ = angle $pkl$ − angle $pkq$.

The angle $pkq$ = angle $gkz$.

It is apparent that the angle $pkq$ equals the angle $gkz$ when the straight line $zq$ is assumed to be turned through an angle $pkq$ about the center $k$. Upon being turned through such an angle the line $zq$ takes a position coinciding with the line $gp$. In like manner the line $zq$ assumes a position coinciding with the line $gp$ when rotated through an angle $gkz$ about the center $k$.

Therefore angle $qkl$ = angle $pkl$ − angle $gkz$ and $$y = \frac{(\text{angle } pkl - \text{angle } pkq) F}{360} = \frac{(\text{angle } pkl - \text{angle } gkz) F}{360}.$$

Sine of angle $pkl = \dfrac{F'}{pk} = \dfrac{F'}{r}$.

Sine of angle $gkz = \dfrac{F'}{gk} = \dfrac{F'}{r^\circ}$.

Inasmuch as the value of $y$, the relieving distance for which compensation must be effected, is given in terms of the angle, values must be obtained for angles $pkl$ and $gkz$.

The angle $pkl$ is equal to the arc which corresponds to the known sine of such angle.

Angle $pkl = \arcsin \dfrac{F'}{r^\circ}$.

The angle $gkz$ is equal to the arc which corresponds to the sine $\dfrac{F'}{r^\circ}$. Angle $gkz = \arcsin \dfrac{F'}{r^\circ}$.

Therefore $y = \dfrac{(\text{angle } pkl - \text{angle } gkz) F}{360} = \dfrac{F}{2\pi}\left(\arcsin \dfrac{F'}{r} - \arcsin \dfrac{F'}{r^\circ}\right)$ The above value of $y$ is the amount the tool must be retarded at any radius $r$ of the cutter blank, when compared with the position of the tool at a radius $r°$. The retarding amount when compared with a position beyond $r°$ is larger, and the retarding amount is largest when the position compared with is considered to extend to infinity. If we consider $r°$ to equal infinity, then arcsin $$\frac{F'}{r°} = \frac{F'}{\text{infinity}} = 0.$$

Therefore, if we consider $r°$ to equal infinity the retarding amount $y$ equals $$\frac{F}{2\pi}\left(\arcsin \frac{F'}{r}\right).$$

In the case of very small angles, such as are being considered, the arcsin may be taken equal to sine. The solving of the above equation by substituting the sine for the arcsin does not produce an exact mathematical result but an approximation is obtained which is very much closer to the correct result than can be worked to by modern tools. Accordingly we may use an approximation formula $$y = \left(\frac{FF'}{2\pi}\right)\frac{1}{r}$$

for determining the required correction.

It is apparent from the above discussion that the tool must be retarded or compensated an amount which is inversely proportional to the varying radius $r$ of the cutter blank. In other words the relieving movement must be retarded an amount which varies inversely with the radius of the cutter blank. Referring to Fig. 30 it is shown that the compensating mechanism disclosed in Figs. 27, 28, 29, 32, 33, 34 and 35, satisfies the above requirement and changes the position of the relieving movement inversely in accordance with the radius of the cutter blank.

The levers, which are shown in Figs. 27, 28, 29, 32, 33, 34 and 35, are diagrammatically illustrated in Fig. 30 in order to more clearly set forth their operative relation to each other. The line $af'$ in Fig. 30 is equal to the radius $r$ of the cutter blank at any point and is the distance between the center marks on the pin 145 and connecting lever 131. The line $af$ is equal in length to $e$ and is placed in the position assumed by the correction lever 143 for any desired compensation of the relieving operation. The lines $ab$ and $fb$ are respectively drawn perpendicularly and parallelly to the line $af'$. The line $fb$ equals the distance $x$, which represents the variation in distance between the cutting tool and the former pin that must be made for certain values of the relief, the undercut and the diameter of the cutter blank. The line $b'f'$ is drawn perpendicularly to the line $ab'$ and has a length $F''$ which is to be determined. The line $ab'$ is drawn in the angular position necessary to place the slot 142 when a correction $x$ is made in the distance between the cutting tool and the former pin. Inasmuch as the triangles $abf$ and $af'b$ are right-angle triangles, it is apparent $$\frac{x}{e} = \frac{F''}{r} \text{ and } x = \frac{eF''}{r}.$$

The value of $x$ thus obtained varies inversely in accordance with the radius $r$ of the cutter blank. By taking $x$ equal to $y$, a value for the correcting constant $F''$ can be obtained for setting the compensating mechanism.

$$y = \left(\frac{FF'}{2\pi}\right)\frac{1}{r} \text{ and } x = \frac{eF''}{r}$$

Therefore, $$\left(\frac{FF'}{2\pi}\right)\frac{1}{r} = \frac{eF''}{r}$$

and $$F'' = \frac{FF'}{e2\pi}.$$

The above formula although not absolutely mathematically correct will determine the correction factor $F''$ much closer than can be worked to on modern machines.

By means of the equation $$F'' = \frac{FF'}{e2\pi}$$

the correction factor $F''$ may be determined inasmuch as $e$ is a constant and the relief $F$ and the undercut $F'$ are known. Upon determining the value of $F''$ for a given cutter blank, the screw 138 is operated to adjust the distance between the center-punch marks on the pin 145 and the connecting lever 131 in acordance therewith. The normal distance between the two center-punch marks is diminished in accordance with the value of $F''$. After setting the screw 138, the screw 123 is adjusted in accordance with the maximum radius of the cutter. The screw 123 is so adjusted that the distance between the center-punch marks on the pin 145 and on the connection lever 131 is equal to the maximum radius of the cutter blank. The cutting tool is finally set to cut the maximum radius on the cutter blank. Upon movement of the tool to cut a different radius, the position of the relieving movement is varied inversely with the value of $r$.

When the compensating mechanism is set for the maximum radius of the cutter a value of $x$ is indicated on the compensating mechanism inasmuch as the correction is referred to an infinite radius as above set forth. The value of $x$ thus indicated is $$\left(\frac{FF'}{2\pi}\right)\frac{1}{r^\circ}$$

and is taken care of by adjusting the tool in engagement with the blank. The correction at any radius $r$ when compared with an infinite radius is $$\left(\frac{FF'}{2\pi}\right)\frac{1}{r}.$$

The difference in the correction between points at radius $r^\circ$ and radius $r$ or the correction at $r$ when compared with the radius $r^\circ$ is $$\frac{F}{2\pi}\left(\frac{F}{r}-\frac{F'}{r^\circ}\right).$$

It will be seen that two independent variations are effected in the relation between the relieving movements of the tool and the rotative movement of the blank. One of these variations is dependent upon the longitudinal movements of the tool along the blank and the other of the variations is dependent upon the inward or outward movement of the tool whereby the blank is cut with different diameters. In the preferred embodiment of the invention, as shown and described, the first said variation is effected by changing the rotative movement of the blank and the second variation is effected by changing the relieving movements of the tool. It will be understood, however, that the invention is not limited to this exact construction, as any mechanism for effecting the required variations in the relationship would be within the scope of the invention.

A screw 150, which engages a nut 151 carried by a bracket 152 depending from the carriage, is provided for moving the carriage 21 longitudinally along the bed 1. The screw 150 is supported at its left-hand end in a bearing 153 formed in a bracket 154 secured to the bed. A transverse shaft 155, which is connected with the screw 150 by means of bevel gearing 156, is mounted in the bracket 154. At the front end of the shaft 155 is a hand wheel 157 by means of which the screw 150 may be turned manually to move the carriage 21. In order that the carriage may be moved automatically to feed the tool from one cutting position to another, a suitable mechanism is provided.

This mechanism is preferably adapted to feed the carriage intermittently, but it will be understood that as concerns certain phases of the invention I do not so limit myself inasmuch as the carriage may be removed continuously if desired. Mounted in the bracket 154 is a transverse bearing pin 158 upon which is rotatably mounted a sleeve 159. A gear wheel 160, which meshes with a gear 161 on the shaft 155, is loosely mounted on the sleeve 159 near the inner end thereof. A ratchet wheel 162 is connected to the gear wheel 160. Gear teeth 163, which mesh with a gear wheel 164 secured to the shaft 150, are formed on the sleeve 159 near the outer end thereof. A ratchet wheel 165, which is similar to the ratchet wheel 162, is keyed to the sleeve 159. A swinging arm 166 is loosely mounted on the hub of the ratchet wheel 165. A link 167, which is adjustably connected at its left-hand end with an oscillating crank arm 168, is pivotally connected with the arm 166 near the lower end thereof.

The crank arm 168 is secured to a transverse rock shaft 169 which is mounted in a bearing 170 and which carries at its rear end a lever 171. A roller 172, which is positioned to be engaged by a cam member 173 on a longitudinal rotatable shaft 174, is carried by the lever 171 near the upper end thereof. A transverse pin 175, which carries two similar ratchets 176 and 177 adapted respectively to engage the ratchet wheels 162 and 165, is mounted on the swinging arm 166. Either ratchet can be thrown into or out of engagement with the corresponding wheel. The shaft 174 is rotated, in the manner to be presently described, and it will be seen that at each rotation thereof the arm 171 and the crank arm 168 are oscillated. The oscillation of the crank arm 168 is transmitted by means of the link 167 to the plate 166, the extent of oscillation of the plate being adjustable by changing the connection between the link and the crank arm. By means of one or the other of the ratchets 176 or 177, one of the ratchet wheels 162 or 165 is turned through a small angle, thus turning the shaft 155 and the lead screw 150 and moving the carriage 21. It will be seen that the carriage movement is relatively great when the pawl 176 is in use, and is relatively small when the pawl 177 is in use. The desired amount of carriage movement may be obtained by selecting the proper ratchet and by adjusting the crank arm connection.

Preferably the rotation of the spindle end of the blank is stopped during the feeding movement of the tool. I therefore provide two alternately acting mechanisms, one serving to rotate the spindle and the blank through one revolution, or approximately one revolution, and also serving to effect the relieving movements of the tool, and the other mechanism serving to effect the longitudinal feeding of the tool and preferably also serving to effect other movements to be described.

The mechanism for rotating the spindle and the blank has already been described in part, this mechanism including the transverse shaft 11, the worm 10 and the worm wheel 9. The machine is provided with a main power shaft 178, which is adapted to be driven in any suitable way, as for instance, by means of a belt on a pulley 179. A gear wheel 180 is rotatably mounted on the shaft 178. The gear wheel 180 is preferably connected to the shaft 178 by means of a splined clutch element 181. The gear wheel 180 meshes with a gear wheel 182 on a longitudinal shaft 183. A long gear wheel 184 is secured to the shaft 183. The gear wheel 184 is surrounded by a sleeve 185 which is open at the forward upper side. A bushing 186 is slidably and rotatably mounted on the sleeve 185. The bushing 186 is provided with ears between which a gear wheel 187 is rotatably mounted. The gear wheel 187 meshes with the aforesaid gear wheel 184 on the shaft 183. A third longitudinal shaft 188 is provided, which carries a series of differently diametered gear wheels 189. The shaft 188 is connected with the aforesaid shaft 11 by means of bevel gearing 190. The bushing 186 can be moved angularly and longitudinally on the bushing 185 so as to bring the gear wheel 187 into mesh with any one of the differently diametered gear wheels 189. A spring-pressed plunger 191, which is carried by the sleeve 186, is adapted to enter any one of a series of apertures in the sleeve 185 so as to hold the gear wheel 187 in proper position to mesh with any desired one of the gear wheels 189. It will be seen that by this construction the shaft 188 together with the shaft 11 can be driven from the shaft 178 at any one of a series of speeds.

A short longitudinal shaft 192 is mounted in alignment with the main power shaft 178. The shaft 192 carries a clutch element which is adapted to be engaged by the aforesaid splined clutch element 181 on the shaft 178. When the clutch element is in its right-hand position as viewed in Fig. 16, it drives the gear wheel 180 and the several parts connected therewith. When the clutch element is in its left-hand position it drives the shaft 192. A transverse shaft 193 is suitably mounted in bearings in the bed and is connected with the shaft 192 by means of bevel gearing 194. The shaft 193 carries a worm 195 which meshes with a worm wheel 196 on the aforesaid longitudinal shaft 174.

Figure 6:
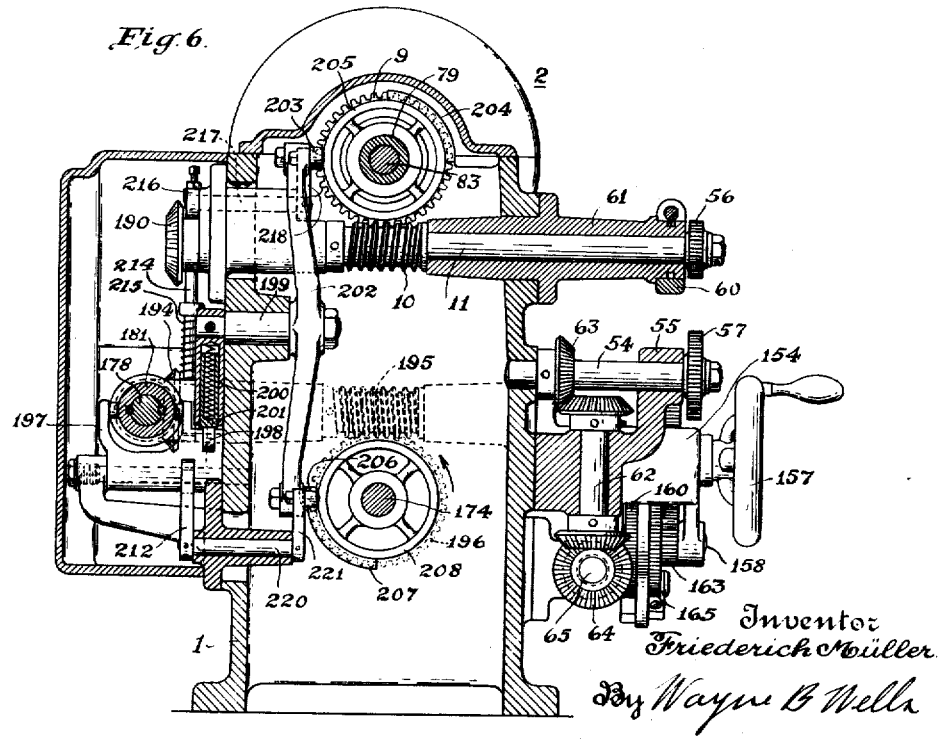
Fig. 6 is a transverse vertical sectional view taken along the line 6—6 of Fig. 1.

In the operation of the machine, it is desirable for the sleeve 79 and for the shaft 174 to each make one complete revolution alternately in succession. In order that the desired alternate movements of the sleeve and shaft may take place, I provide automatic mechanism for shifting the clutch element 181. The mechanism used in similar in principle to that shown and described in my Patent No. 1,273,903 for driving mechanism, dated July 30th, 1918. The clutch element 181 is provided with an annular groove into which fit rollers or projections on a forked lever 197. The lever 197 is transversely pivoted on the frame and is provided with a roller 198 by means of which it may be moved. A transverse rock shaft 199 is mounted in the frame above the forked lever 197. The rock shaft 199 carries at its rear end an arm 200 in which is mounted a spring-pressed plunger 201. As shown the plunger 201 is V-shaped at its lower end and is adapted to engage the roller 198. A lever 202 having upper and lower arms is secured to the rock shaft 199 at the front end thereof. The upper arm carries a roller 203 which is adapted to be engaged by a cam plate 204 secured to a cam drum 205 mounted on the sleeve 79. The lower arm of the lever 202 carries a roller 206 which is adapted to be engaged by a cam plate 207. The cam plate 207 is secured to a cam drum 208 which is mounted on the shaft 174. When the parts are in the positions shown in Figs. 6, 7 and 16 the sleeve 79 is in motion and continues to turn until the cam plate 204 engages the roller 203 and turns the lever 202 in a clockwise direction, as viewed in Fig. 7, or in a counter-clockwise direction, as viewed in Fig. 16. Such movement forces the spring-pressed plunger 201 over the top of the roller 198 and thus tends to swing the lever 197 in the direction to shift the clutch element into position to drive the shaft 192. When the shaft 192 is thus driven, the shaft 174 with the cam drum 208 thereon is driven in the direction indicated by the arrow in Fig. 6. Such movement continues until the cam plate 207 engages the roller 206 and swings the lever 202 in a counter-clockwise direction, as viewed in Fig. 7, or in a clockwise direction, as viewed in Fig. 16. In other words, the cam plate 207 serves to restore the lever to the position which is shown in the drawings. The spring-pressed plunger 201 is again moved over the top of the roller 198 and tends to move the lever 197 in the direction to move the clutch element 181 into position to drive the gear wheel 180.

Figure 16:
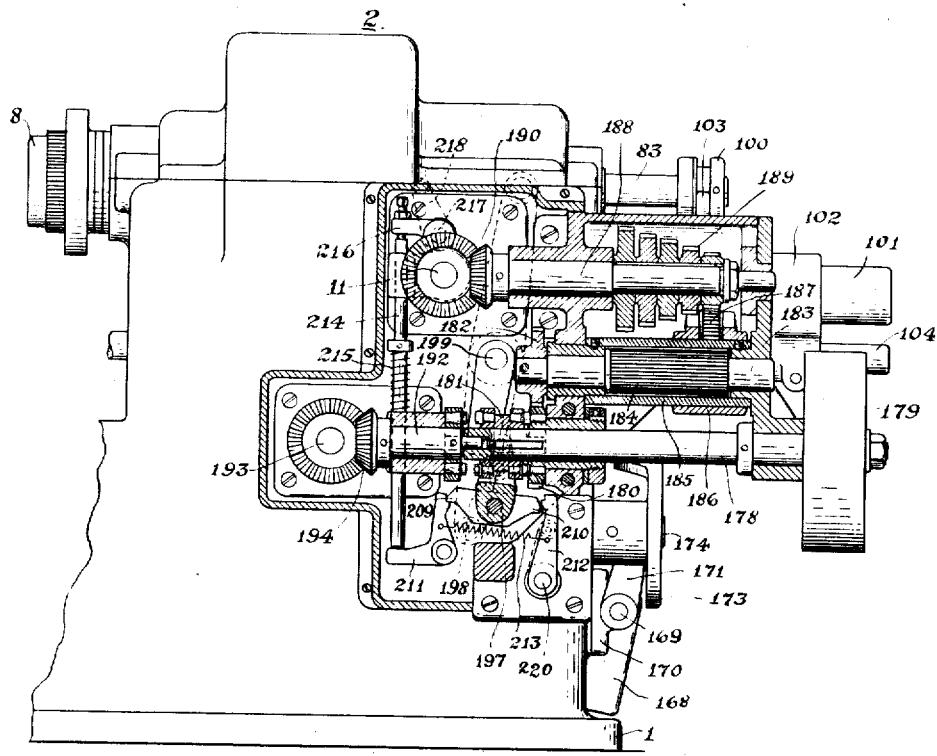
Fig. 16 is a partial rear view, partially in section, of the machine.
Figure 32:
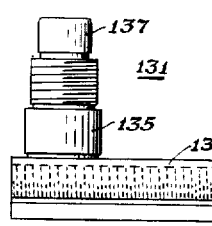
Figs. 32 and 33 are detail views of the adjusting bar.
Figure 33:
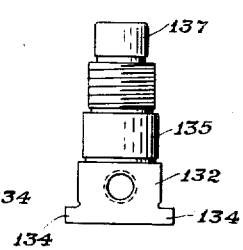
Figure 34:
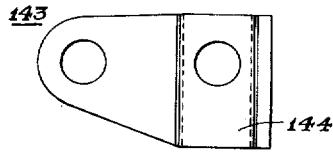
Figs. 34 and 35 are detail views of the correcting lever.
Figure 35:
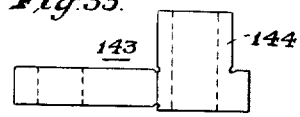

Preferably, I do not depend solely upon the shifting of the lever 202 for the timing of the movements of the clutch element 181. As illustrated, the lever 197 is provided with opposite fingers 209 and 210 which are adapted to be engaged respectively by latch members 211 and 212. The latch members are held in engagement with the fingers 209 and 210 by means of a spring member 213. Referring to Fig. 16, it will be seen that the latch 211 serves to prevent the movement of the lever 197 toward the left even after the arm 200 has been moved to its right-hand position. Similarly, the latch 212 serves to prevent the movement of the lever 197 toward the right even after the arm 200 has been moved to its left-hand position. A vertically slidable rod 214, which is normally pressed upward by a spring 215, is provided for releasing the latch 211. The upper end of the rod 214 is engaged by an arm 216 on a short transverse rock shaft 217. The rock shaft 217 carries a lever 218 at its front end. A roller, which is adapted to be engaged by a cam projection 219 secured to the worm wheel 9, is mounted on the lever 218. The cam projection 219 is so positioned with respect to the cam plate 204 that the plate first engages the roller 203 and moves the arm 200 into position to shift the lever 197. Subsequently, when the spindle 79 has completed the desired revolution, the cam projection 219 engages the roller on the lever 218, thus turning the rock shaft and the lever 216 and moving the rod 214 to release the latch member 211. The latch member having been released, the lever 197 turns under the action of the spring-pressed plunger 201 and disengages the clutch element from the gear wheel 180 and engages it with the shaft 192. The latch member 212 is mounted on a short transverse rock shaft 220 which carries a lever 221 at its front end. A roller is positioned at the upper end of the lever 221 to be engaged by a cam projection 222 on the cam drum 208. The cam projection 222 is so positioned with respect to the main cam plate 207 that the plate first engages the roller 206 and moves the arm 201 into position to shift the lever 197. Subsequently, when the shaft 174 has completed the desired revolution, the cam projection 222 engages to release the latch 212. The latch 212 having been released, the lever 197 turns under the action of the spring-pressed plunger 201 and disengages the clutch element from the shaft 192 and engages it with the gear wheel 180. It will be seen that by means of the mechanism described the spindle 79 serves to stop itself after making a complete revolution and to start the shaft 174. Similarly the shaft 174, after making one complete revolution, serves to stop itself and start the spindle 79. Thus these two parts operate alternately in continuous succession.

It is desirable to feed the tool longitudinally while out of engagement with the blank, that is, when the tool is opposite the groove between two teeth of the blank. The blank is therefore preferably mounted in the spindle so that at the position of stopping the tool will be opposite a groove. The grooves are helical but the spindle and the blank are supplementally turned at each longitudinal movement this supplemental turning exactly compensating for the inclination of the grooves and insuring the stopping of the blank with a groove opposite the tool.

Preferably the tool is withdrawn at the time of each longitudinal movement, the former pin also being withdrawn from engagement with the former. This withdrawal is effected by mechanism operated by the shaft 174, the withdrawal being thus properly timed with respect to the feeding movement. An abutment 223 is associated with the slide 24. The abutment 223 is engaged by the upper end of a lever 224 which is longitudinally pivoted to the carriage 21. The lower end of the lever 224 is provided with a roller which is adapted to be engaged by a cam plate 225 on a cam disk 226. The cam disk 226 is secured to the shaft 174. At the beginning of the rotation of the shaft 174 the cam plate 225 engages the roller on the lever 224 and swings it in the counter-clockwise direction, thus moving the abutment 223 together with the slide 24 toward the front. In this way the tool 25 is withdrawn from the blank and the former pin 27 is withdrawn from the former 26. As the shaft 174 continues to rotate, the cam member 173 operates the feeding mechanism in the way already described, and the carriage 21 is moved longitudinally along the bed. After such operation the cam plate 225 permits the lever 224 to return to the position shown, and the slide 24 is permitted to move rearward carrying the tool 25 and the former pin 27 to their operative positions. It will be seen that by thus withdrawing the former pin from the former at the time of longitudinal movement, I avoid any difficulties incident to forcing the former pin along the former while in contact therewith. If the former pin were maintained in contact with the former at all times difficulty would be experienced in effecting the longitudinal movement, particularly at places where the contour of the former is sharply inclined.

Preferably the former pin is restored to engagement with the former by a relatively slow movement with a minimum of pressure, so that there will be no tendency to bend or distort the pin or to secure uneven contact between the pin and the former. For this purpose I provide a mechanism for returning the carriage which is entirely independent in its operation from the mechanism for withdrawing it. The before mentioned abutment 223 is not connected directly to the slide 24 but is connected to a second slide 227 which is transversely movable independently of the first slide 24. Spring members 228 are interposed between the slide 227 and the carriage 21 and such spring members tend to move the slide 227 rearwardly, thus holding the abutment 223 at all times in engagement with the lever 224.

The two slides 24 and 227 are ordinarily connected by a lock. As shown most clearly in Figs. 7, 8 and 10, the lock includes a plate 229 located in the recess in the top of the slide 24. The plate 229 is provided with a boss which projects downward through a slot in the slide, and threaded into this boss is a vertical stud 230. The stud 230 extends through and closely fits an aperture in the slide 227. Two small bell-crank levers 231 are pivoted to the slide 227. The levers 231 are provided with horizontal upper arms which engage a collar on the stud 230. The lower ends of the levers are adapted to be engaged by a tapered cam bushing 232 which is vertically movable on the stud 230. When the bushing 232 is in its lower position, as shown, the levers 231 are forced outward, thus drawing the stud 230 downward and forcing the plate 229 into clamping engagement with the slide 24. In this way the slide 24 is firmly connected with the slide 227. When the bushing 232 is in its raised position, the levers 231 swing inward thus permitting the stud 230 to move upward and release the plate 229 from its clamping engagement with the slide 24. A forked lever 233 having projections engaging slides or notches in the bushing, is provided for moving the bushing 232. Such lever is secured to a longitudinal rock shaft 234, which is mounted in bearings in the carriage 21. A lever 235 is connected with the lever 233. The lever 235 is provided with a roller which is adapted to be engaged by cam plates 236 and 237. The cam plates 236 and 237 are secured to a cam disk 238 which is mounted on the shaft 174. It will be seen that as the shaft 174 rotates, the cam plate 236 engages the roller on the lever 235, thus moving the lever 233 and the cam bushing 232 upward and releasing the lock. Subsequently the roller is engaged by the cam plate 237, thus moving the cam bushing 232 downward and re-engaging the lock.

I have already stated that a supplemental mechanism is provided for returning the slide after it has been withdrawn in the way before described. Preferably, in order that this supplemental returning mechanism may operate without being effected in any way by the return movement of the slide 227, and in order further that the slide 24 may be returned with a minimum of effort, I provide a supplemental means for supporting the slide 24 after it has been unlocked from the slide 227. As illustrated, the carriage 21 is provided near its front and rear with transverse pivot pins 239 and 240. The carriage is slotted adjacent the pins 239 and 240, and in these slots are positioned arms 241 and 242 respectively pivoted on the said pins. The arms are respectively provided with rollers 243 and 244 which are adapted to engage the bottom of the slide 24. The arms are connected by pivoted links 245, and such links in turn are connected by a transverse yoke 246. The yoke 246 is provided with slots or notches in which fit pivot bosses 247 projecting upward from the lever 233. The result is that when the lever 233 is swung upward to release the lock, the arms 241 and 242 are swung in a clockwise direction, thus swinging the rollers 243 and 244 upward so as to lift the slide 24 off from the slide 227 and support it independently. The actual raising of the slide may be but a few thousandths of an inch. Coil spring members 248 are provided for returning the slide 24 rearward as soon as it has been released by the lock and elevated by the rollers. Preferably such spring members are located in long transverse cylindrical apertures 249 in the slide 24. The spring members abut at their rear ends against plugs 250 threaded into the apertures, and at their front ends abut against heads 251 on transverse rods 252. The rods 252 extend through central openings in the plugs 250 and are connected at their rear ends with brackets 253 which are mounted on the carriage 21. Preferably the heads 251 are in the form of pistons and the forward parts of the apertures 249 constitute cylinders 254 in which the pistons 251 fit and move. A casting 255 is secured to the slide 24. The casting 255 is provided with a transverse passageway 256 which communicates at its ends with the cylinders 254. A fluid reservoir 257 is also formed in the casting 255. A restricted aperture 258, which is preferably controlled by an adjustable needle valve 259, leads from the passageway 256 into the reservoir 257. An automatic check valve 260 leads from the reservoir 257 back to the passageway 256. The cylinders 254 together with the passageway 256 and a part of the reservoir 257 are filled with a suitable fluid, which is preferably a liquid such as oil. It will be seen that as soon as the slide 21 has been elevated and released from the slide 227, the spring members 248 tend to move it rearward. This tendency, however, is resisted by the engagement of the pistons 251 with the liquid in the cylinders. This engagement forces the liquid out of the cylinders into the passageway 256 and thence into the reservoir 257 through the restricted aperture 258. The liquid can pass through this aperture only relatively slowly, and thus the return movement of the slide is made to take place very slowly. When the slide is moved quickly forward at the time of next feeding, the check valve 260 opens to permit the liquid to flow from the reservoir 257 back to the passageway 256 and the cylinders 254. The slow return movement causes the former pin to engage the former gently and with a minimum force, so that there is little or no tendency to bend or deflect the parts.

It will be noted that the several cam members 173, 225, 236 and 237 are so positioned in relation to each other that the operations which they respectively control take place in the following order: First, the two slides 227 and 24 are moved backward in unison, they being still locked together. Then the slide 24 is unlocked from the slide 227 and is at the same time elevated on the rollers 243 and 244. At or about the same time the carriage is moved longitudinally to feed the tool to a new cutting position. Then the slide 227 is permitted to return to its normal position. In the meantime the slide 24 is being moved slowly rearward under the control of the spring members 248 and the fluid regulating mechanism. After the completion of the return movement of the slide 24, the rollers 243 and 244 are lowered and the slide 24 is again locked to the slide 227.

In order that the slide 24 may be manually released from the slide 227, I provide a lever 261 which is secured to the rock shaft 234. A wrench 263, as shown in Fig. 8, is provided for moving the lever 261. It will be seen that the operator, by moving the lever 261, can turn the rock shaft, thus raising the cam sleeve 232 and releasing the lock. A segmental gear 262, which is pivoted to the carriage and which meshes with a rack 264 secured to the slide, is provided for moving the slide 24 forward manually. A hand lever 265 is connected with the segmental gear wheel 262. It will be seen that by lowering or raising the handle the slide 24 can be moved forward or backward as desired.

It is believed that the general operation of the machine will be clear from the foregoing description and that a very brief summary will suffice.

A former 26 is provided having the desired contour. A blank is put in place, this blank having been previously grooved and roughed out in any usual or preferred manner. The gearing 78 is adjusted in accordance with the degree of inclination of the helical teeth on the blank and the gearing 56—57 is adjusted in accordance with the number of teeth on the blank. By means of the hand wheels 40 and 157, the tool is adjusted transversely and longitudinally into engagement with the blank at the righthand end thereof. Then the machine is started, the spindle 79 and the operating shaft 174 operating alternately in succession. During the rotative movement of the blank relieving movements of the tool are effected as described, thus cutting the desired relief on the teeth of the blank. After one complete revolution of the blank, the rotative movement of the spindle is stopped and also the relieving movements of the tool. The carriage is then fed longitudinally toward the left, the blank turning slightly in conformity with the helical teeth. Just prior to the longitudinal movement the tool slide is withdrawn, thus withdrawing the tool from the blank and the former pin from the former. After the longitudinal movement, the tool slide is moved slowly in the opposite direction, thus gently returning the former pin to the former which is engaged at a new position. The tool assumes a corresponding position with respect to the blank. After this movement of the tool and former pin the blank is again rotated through one revolution and these movements are repeated alternately in succession until the blank is completely formed. The relieving operation is changed in accordance with changes in diameter as already described, to compensate for the non-radial cutting faces on the teeth of the blank.

It will be understood that such changes and modifications may be made in my invention as fall within the limits of the appended claims.

What I claim is:

1. In a relieving machine for operating on a cutter blank having teeth provided with non-radially arranged cutting faces, the combination comprising a cutting tool, means for effecting feeding movements between said tool and the blank, means for effecting relieving movements of the tool, and means to compensate the relieving operation at different blank diameters for the non-radial tooth faces on the blank.

2. In a relieving machine for operating on a cutter blank having helical teeth provided with non-radially arranged cutting faces, the combination comprising a cutting tool, means for effecting feeding movements between said tool and the blank, and means for effecting relieving movements of the tool to compensate the relieving operation at different blank diameters for the non-radial cutting faces on the blank.

3. In a relieving machine for operating on a cutter blank having teeth provided with non-radially arranged cutting faces, the combination comprising a cutting tool, means for operating said tool to form a cutter adapted to cut a predetermined non-rectilinear contour, means for effecting relieving movements of said tool, and means to compensate the relieving operation at different blank diameters for the non-radial cutting faces on the teeth of the blank.

4. In a relieving machine for operating on a cutter blank having helical teeth provided with non-radially arranged cutting faces, the combination comprising a cutting tool, means for operating said tool to form a cutter adapted to cut a predetermined non-rectilinear contour, means for effecting relieving movements of said tool, and means to compensate the relieving operation at different blank diameters for the non-radial cutting faces on the teeth of the blank.

5. In a relieving machine for operating on a cutter blank having undercut teeth, the combination comprising a cutting tool, means for operating said tool to cut a predetermined contour, means for effecting relieving movements of the tool, and means to compensate the relieving operation at different blank diameters for the undercut teeth.

6. In a relieving machine for operating on a cutter blank having undercut helical teeth, the combination comprising a cutting tool, means for effecting feeding movements between the tool and the blank to cut the latter to different diameters, means for effecting relieving movements of the tool, and means to compensate the relieving operation at different blank diameters for the undercut teeth.

7. In a relieving machine, the combination comprising a rotatable spindle adapted to carry a blank having teeth provided with non-radially arranged cutting faces, a cutting tool, mechanism for effecting relative relieving movements of the tool at a normally uniform frequency, and means to compensate the relieving operation at different blank diameters for the non-radial cutting faces on the teeth of the blank.

8. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, and means to compensate the relieving operation at different blank diameters for the non-radial cutting faces on the teeth of the blank.

9. In a relieving machine, the combination comprising a rotatable spindle adapted to carry a blank having teeth provided with non-radially arranged cutting faces, a cutting tool, mechanism for feeding the tool longitudinally of the blank, mechanism acting independently of the feeding mechanism for effecting relieving movements of the tool at a normally uniform frequency, and means to compensate the relieving operation at different blank diameters for the non-radial cutting faces on the teeth of the blank.

10. In a relieving machine, the combination comprising a rotatable spindle adapted to carry a blank having teeth provided with non-radially arranged cutting faces, driving mechanism for the spindle, a cutting tool, mechanism for feeding the tool longitudinally of the blank, mechanism driven by said drive mechanism for effecting relieving movements between the tool and the blank, and means to compensate the relieving operation at different blank diameters for the non-radial cutting faces on the teeth of the blank.

11. In a relieving machine, the combination comprising a rotatable spindle adapted to carry a blank having teeth provided with non-radially arranged cutting faces, driving mechanism for the spindle, a cutting tool, mechanism for feeding the tool longitudinally of the blank, mechanism including change gearing driven by the said drive mechanism for effecting relieving movements of the tool, and means to compensate the relieving operation at different blank diameters for the non-radial cutting faces on the teeth of the blank.

12. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, and means to compensate the relieving operation at different blank diameters for the non-radial cutting faces on the teeth of the blank.

13. In a relieving machine, the combination comprising a rotatable spindle adapted to carry a blank having helical teeth provided with non-radially arranged cutting faces, a cutting tool, mechanism for effecting relieving movements of the tool, mechanism for varying the spindle rotation to effect relieving in conformity with helical teeth on the blank, and means to compensate the relieving operation at different blank diameters for the non-radial cutting faces on the teeth of the blank.

14. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism for effecting relieving movements of the tool, mechanism for varying the spindle rotation to effect relieving in conformity with the helical teeth on the blank, and means to compensate the relieving operation at different blank diameters for the non-radial cutting faces on the teeth of the blank.

15. In a relieving machine, the combination comprising a rotatable spindle adapted to carry a blank having helical teeth provided with non-radially arranged cutting faces, a cutting tool, mechanism for effecting relieving movements of the tool at a normally uniform frequency, mechanism for varying the spindle rotation to effect relieving in conformity with the helical teeth on the blank inclined in either direction, and means to compensate the relieving operation at different blank diameters for the non-radial cutting faces on the teeth of the blank.

16. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism for effecting relieving movements of the tool at a normally uniform frequency, mechanism for varying the spindle rotation to effect relieving in conformity with the helical teeth on the blank inclined in either direction, and means to compensate the relieving operation at different blank diameters for the non-radial cutting faces on the teeth of the blank.

17. In a relieving machine, the combination comprising a rotatable spindle adapted to carry a blank having teeth provided with non-radially arranged cutting faces, a carriage movable longitudinally of the spindle axis, a cutting tool carried by the carriage, mechanism acting independently of the carriage movements for effecting relieving movements of the tool at a normally uniform frequency, and means to compensate the relieving operation at different blank diameters for the non-radial cutting faces on the teeth of the blank.

18. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism acting independently of the carriage movements for effecting relieving movements of the tool at a normally uniform frequency, mechanism for varying the spindle rotation to effect relieving in conformity with the helical teeth on the blank, and means to compensate the relieving operation at different blank diameters for the non-radial cutting faces on the teeth of the blank.

19. In a relieving machine, the combination comprising a rotatable spindle adapted to carry a blank having helical teeth provided with non-radially arranged cutting faces, a cutting tool, mechanism for effecting relieving movements of the tool, drive mechanism for the spindle including gearing, means for operating said gearing to vary the spindle relation so as to effect relieving in conformity with the helical teeth on the blank, and means to compensate the relieving operation at different blank diameters for the non-radial cutting faces on the teeth of the blank.

20. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism for effecting relieving movements of the tool at a normally uniform frequency, drive mechanism for the spindle including gearing, means for operating said gearing to vary the spindle rotation so as to effect relieving in conformity with the helical teeth on the blank, and means to compensate the relieving operation at different blank diameters for the non-radial cutting faces on the teeth of the blank.

21. In a relieving machine, the combination comprising a rotatable spindle adapted to carry a blank having helical teeth provided with non-radially arranged cutting faces, a cutting tool, mechanism for effecting relieving movements of the tool at a normally uniform frequency, drive mechanism for the spindle including gearing, means for operating said gearing to vary the spindle rotation so as to effect relieving in conformity with the helical teeth on the blank inclined in either direction, and means to compensate the relieving operation at different blank diameters for the non-radial cutting faces on the teeth of the blank.

22. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism acting independently of the carriage movements for effecting relieving movements of the tool at a normally uniform frequency, drive mechanism for the spindle including gearing, means for operating said gearing to vary the spindle rotation so as to effect relieving in conformity with the helical teeth on the blank having any desired degree of inclination, and means to compensate the relieving operation at different blank diameters for the non-radial cutting faces on the teeth of the blank.

23. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism for effecting relieving movements of the tool, drive mechanism for the spindle including gearing and a slidable rack meshing therewith, means for sliding said rack to vary the spindle rotation so as to effect relieving movements in conformity with the helical teeth on the blank, and means to compensate the relieving operation at different blank diameters for the non-radial cutting faces on the teeth of the blank.

24. In a relieving machine, the combination comprising a rotatable spindle adapted to carry a blank having helical teeth provided with non-radially arranged cutting faces, a cutting tool, mechanism for effecting relative feeding movements between the tool and the blank longitudinally of the latter, mechanism acting independently of the feeding mechanism for effecting relieving movements of the tool, drive mechanism for the spindle including bodily rotatable gearing, means for operating said gearing to vary the spindle rotation so as to effect relieving in conformity with the helical teeth on the blank, and means to compensate the relieving operation at different blank diameters for the non-radial cutting faces on the teeth of the blank.

25. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism for effecting relieving movements of the tool, drive mechanism for the spindle including gearing and a slidable rack meshing therewith, the said gearing and rack being bodily rotatable, means for sliding said rack to vary the spindle rotation so as to effect relieving in conformity with the helical teeth on the blank, and means to compensate the relieving operation at different blank diameters for the non-radial cutting faces on the teeth of the blank.

26. In a relieving machine, the combination comprising a rotatable spindle adapted to carry a blank having teeth provided with non-radially arranged cutting faces, a cutting tool, mechanism for effecting relative relieving movements of the tool, mechanism for varying the spindle rotation relatively to the aforesaid movements between the tool and the blank, and means to compensate the relieving operation at different blank diameters for the non-radial cutting faces on the teeth of the blank.

27. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, mechanism for varying the spindle rotation relatively to the uniform relieving movements to effect relieving in conformity with the helical teeth on the blank, and means to compensate the relieving operation at different blank diameters for the non-radial cutting faces on the teeth of the blank.

28. In a relieving machine, the combination comprising a rotatable spindle adapted to carry a blank having helical teeth provided with non-radially arranged cutting faces, a cutting tool, mechanism for effecting feeding movements of the tool, mechanism acting independently of the feeding mechanism for effecting relieving movements of the tool, mechanism for varying the spindle rotation relatively to the uniform relieving movements to effect relieving in conformity with the helical teeth on the blank, and means to compensate the relieving operation at different blank diameters for the non-radial cutting faces on the teeth of the blank.

29. In a relieving machine, the combination comprising a rotatable spindle adapted to carry a blank having helical teeth provided with non-radially arranged cutting faces, driving mechanism for the spindle, a cutting tool, mechanism for feeding the tool longitudinally of the blank, mechanism driven by the said drive mechanism for effecting relieving movements of the tool at a normally uniform frequency, mechanism interposed between the driving mechanism and the spindle for varying the spindle rotation relatively to the driving mechanism and the relieving mechanism in conformity with the helical teeth on the blank, and means to compensate the relieving operation at different blank diameters for the non-radial cutting faces on the teeth of the blank.

30. In a relieving machine, the combination comprising a rotatable spindle adapted to carry a blank having helical teeth provided with non-radially arranged cutting faces, driving mechanism for the spindle, a cutting tool, mechanism for feeding the tool longitudinally of the blank, mechanism including change gearing driven by the said drive mechanism for effecting relieving movements of the tool at a normally uniform frequency, mechanism interposed between the driving mechanism and the spindle for varying the spindle rotation relatively to the driving mechanism and the relieving mechanism in conformity with helical teeth on the blank, and means to compensate the relieving operation at different blank diameters for the non-radial cutting faces on the teeth of the blank.

31. In a relieving machine, the combination comprising a rotatable spindle adapted to carry a blank having helical teeth provided with non-radially arranged cutting faces, a cutting tool, mechanism for effecting relative feeding movements between the tool and the blank longitudinally of the latter, mechanism acting independently of the feeding mechanism for effecting relieving movements of the tool at a normally uniform frequency, mechanism for varying the spindle rotation relatively to the uniform relieving movements to effect relieving in conformity with the helical teeth on the blank having any desired degree of inclination, and means to compensate the relieving operation at different blank diameters for the non-radial cutting faces on the teeth of the blank.

32. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, mechanism for varying the spindle rotation relatively to the uniform relieving movements to effect relieving in conformity with the helical teeth on the blank inclined in either direction, and means to compensate the relieving operation at different blank diameters for the non-radial cutting faces on the teeth of the blank.

33. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, mechanism dependent upon the longitudinal movement for varying the spindle rotation relatively to the uniform relieving movements, and means to compensate the relieving operation at different blank diameters for the non-radial cutting faces on the teeth of the blank.

34. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, mechanism dependent upon the longitudinal movement for varying the spindle rotation relatively to the uniform relieving movements and at any one of a plurality of rates, and means to compensate the relieving operation at different blank diameters for the non-radial cutting faces on the teeth of the blank.

35. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, mechanism dependent upon the longitudinal movement for either advancing or retarding the spindle rotation relatively to the uniform relieving movements to conform to either right-hand or left-hand helical teeth on the blank, and means to compensate the relieving operation at different blank diameters for the non-radial cutting faces on the teeth of the blank.

36. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism acting independently of the carriage movements for effecting relieving movements of the tool at a normally uniform frequency, mechanism connected with the carriage for varying the spindle rotation relatively to the uniform relieving movements in conformity with the helical teeth on the blank, and means to compensate the relieving operation at different blank diameters for the non-radial cutting faces on the teeth of the blank.

37. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism acting independently of the carriage movements for effecting relieving movements of the tool at a normally uniform frequency, mechanism connected with the carriage for varying the spindle rotation relatively to the uniform relieving movements in conformity with helical teeth on the blank, the connection between the said mechanism and the carriage being adjustable to permit preliminary adjustment of the carriage independently of the spindle, and means to compensate the relieving operation at different blank diameters for the non-radial cutting faces on the teeth of the blank.

38. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, drive mechanism for the spindle including gearing, means dependent upon the feeding movement for supplementally moving an element of the gearing to vary the the spindle rotation relatively to the uniform relieving movements so as to effect relieving in conformity with helical teeth on the blank, and means to compensate the relieving operation at different blank diameters for the non-radial cutting faces on the teeth of the blank.

39. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, drive mechanism for the spindle including gearing, means dependent upon the feeding movement for supplementally moving an element of the gearing to vary the spindle rotation relatively to the uniform relieving movements so as to effect relieving in conformity with helical teeth on the blank having any desired degree of inclination, and means to compensate the relieving operation at different blank diameters for the non-radial cutting faces on the teeth of the blank.

40. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, drive mechanism for the spindle including gearing, means dependent upon the feeding movement for supplementally moving an element of the gearing to vary the spindle rotation relatively to the uniform relieving movements so as to effect relieving in conformity with helical teeth on the blank inclined in either direction, and means to compensate the relieving operation at different blank diameters for the non-radial cutting faces on the teeth of the blank.

41. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism acting independently of the carriage movements for effecting relieving movements of the tool at a normally uniform frequency, drive mechanism for the spindle including gearing, mechanism connected with the carriage for supplementally moving an element of the gearing to vary the spindle rotation relatively to the uniform relieving movements so as to effect relieving in conformity with the helical teeth on the blank, and means to compensate the relieving operation at different blank diameters for the non-radial cutting faces on the teeth of the blank.

42. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism acting independently of the carriage movement for effecting relieving movements of the tool at a normally uniform frequency, drive mechanism for the spindle including gearing and a slidable rack meshing therewith, means connected with the carriage for sliding the rack to vary the spindle rotation relatively to the uniform relieving movements so as to effect relieving in conformity with the helical teeth on the blank, and means to compensate the relieving operation at different blank diameters for the non-radial cutting faces on the teeth of the blank.

43. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, drive mechanism for the spindle including bodily rotatable gearing, means dependent upon the feeding movement for supplementally moving an element of the gearing to vary the spindle rotation relatively to the uniform relieving movements so as to effect relieving in conformity with helical teeth on the blank, and means to compensate the relieving operation at different blank diameters for the non-radial cutting faces on the teeth of the blank.

44. In a relieving machine, the combination comprising a rotatable spindle adapted to carry a blank having helical teeth provided with non-radially arranged cutting faces, a carriage movable longitudinally of the spindle axis, a cutting tool carried by the carriage, mechanism acting independently of the carriage movements for effecting relieving movements of the tool at a normally uniform frequency, drive mechanism for the spindle including gearing and a slidable rack meshing therewith, the said gearing and rack being bodily rotatable, means connected with the carriage for sliding the rack to vary the spindle rotation relatively to the uniform relieving movements so as to effect relieving in conformity with helical teeth on the blank, and means to compensate the relieving operation at different blank diameters for the non-radial cutting faces on the teeth of the blank.

45. In a relieving machine, the combination comprising a rotatable spindle adapted to carry a blank having teeth provided with non-radially arranged cutting faces, a carriage movable longitudinally of the spindle axis, a transversely movable slide on the carriage, a cutting tool carried by the slide, mechanism for moving the slide and the tool transversely as the carriage moves longitudinally so as to cut the blank to a predetermined contour differing from a straight line, mechanism for effecting relieving movements of the tool relatively to the slide in timed relation to the blank rotation, and means to compensate the relieving operation at different blank diameters for the non-radial cutting faces on the teeth of the blank, the said mechanism serving to accurately time the relieving movements notwithstanding inward or outward movements of the tool under the control of the contour mechanism.

46. In a relieving machine, the combination comprising a rotatable spindle adapted to carry a blank having teeth provided with non-radially arranged cutting faces, a carriage, a slide on said carriage, a cutting tool carried by the slide, mechanism for moving the slide and the tool transversely as the carriage moves longitudinally so as to cut the blank with a predetermined contour differing from a straight line, mechanism for effecting relieving movements of the tool in timed relation to the blank rotation, and means to compensate the relieving operation at different blank diameters for the non-radial cutting faces on the teeth of the blank.

47. In a relieving machine for operating on a cutter blank having helical teeth provided with non-radially arranged cutting faces, the combination comprising a cutting tool, means for effecting feeding movements between said tool and the blank to form a cutter adapted to cut a predetermined non-rectilinear contour, and means for effecting relieving movements of the tool in conformity with the helical teeth on the blank and to compensate at different blank diameters for the non-radial cutting faces on the teeth of the blank.

48. In a relieving machine for operating on a cutter blank having helical teeth provided with non-radially arranged cutting faces, the combination comprising a cutting tool, means for effecting longitudinal feeding movements between said tool and the blank, means comprising a pin and a former for guiding the tool to cut a predetermined non-rectilinear contour, means for varying the movements of the cutting tool to relieve the teeth on the blank, and means to compensate the relieving operation at different blank diameters for the non-radial cutting faces on the teeth of the blank.

49. In a relieving machine the combination comprising a rotatable spindle adapted to carry a blank having helical teeth provided with non-radially arranged cutting faces, a carriage movable longitudinally of the spindle axis, a transversely movable slide on the carriage, a cutting tool carried by the slide, mechanism including a former and former pin for causing the slide and the tool to move transversely as the carriage moves longitudinally so as to cut the blank with a predetermined contour differing from a straight line, mechanism for effecting relieving movements of the tool relatively to the slide in timed relation to the blank rotation and in conformity with the helical teeth on the blank, and means to compensate the relieving operation at different blank diameters for non-radial cutting faces on the teeth of the blank, the said mechanism serving to accurately time the relieving movements notwithstanding inward or outward movements of the tool under the control of the contour mechanism.

50. In a relieving machine, the combination comprising a rotatable spindle adapted to carry a blank having teeth provided with non-radially arranged cutting faces, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, mechanism for effecting relieving movements of the tool relatively to the slide in timed relation to the blank rotation, the said mechanism serving to accurately time the relieving movements notwithstanding inward or outward movements of the tool under the control of the contour mechanism, means to compensate the relieving operation at different blank diameters for the non-radial cutting faces on the teeth of the blank, and means for preliminarily adjusting the tool toward or from the blank independently of the contour and relieving mechanisms.

51. In a relieving machine, the combination comprising a rotatable spindle adapted to carry a blank having helical teeth provided with non-radially arranged cutting faces, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, mechanism including a relieving cam carried by the slide for effecting relieving movements of the tool relatively to the slide in timed relation to the blank rotation and in conformity with the helical teeth on the blank, and means to compensate the relieving operation at different blank diameters for the non-radial cutting faces on the teeth of the blank, the said mechanism serving to accurately time the relieving movements notwithstanding inward or outward mechanism.

52. In a relieving machine, the combination comprising a rotatable spindle adapted to carry a blank having helical teeth provided with non-radially arranged cutting faces, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, mechanism for effecting relieving movements of the tool relatively to the slide in timed relation to the blank rotation and in conformity with the helical teeth on the blank, and means to compensate the relieving operation at different blank diameters for the non-radial cutting faces on the teeth of the blank, the said mechanism including a relieving cam carried by the slide and a transverse splined shaft carried by the carriage for driving the cam and the said mechanism and serving to accurately time the relieving movements notwithstanding inward or outward movements of the tool under the control of the contour mechanism.

53. In a relieving machine, the combination comprising a rotatable spindle adapted to carry a blank having teeth provided with radially arranged cutting faces, a cutting tool, mechanism for effecting relative feeding movement between the tool and the blank longitudinally of the latter, mechanism for moving the tool inward or outward during the feeding movement to cut the blank to a predetermined contour, mechanism for effecting relieving movements of the tool with respect to the contour mechanism in timed relation to the blank rotation, the said mechanism serving to accurately time the relieving movements notwithstanding in ward or outward movements of the tool under the control of the contour mechanism, and means to compensate the relieving operation at different blank diameters for the non-radial cutting faces on the teeth of the blank.

54. In a relieving machine, the combination comprising a rotatable spindle adapted to carry a blank having teeth provided with radially arranged cutting faces, a cutting tool, mechanism for feeding the tool longitudinally of the blank, mechanism for moving the tool inward or outward during the feeding movement to cut the blank to a predetermined contour differing from a straight line, mechanism for effecting relieving movements of the tool with respect to the contour mechanism in timed relation to the blank rotation, the said mechanism serving to accurately time the relieving movements notwithstanding inward or outward movements of the tool under the control of the contour mechanism, and means to compensate the relieving operation at different blank diameters for the non-radial cutting faces on the teeth of the blank.

55. In a relieving machine, the combination comprising a rotatable spindle adapted to carry a blank having helical teeth provided with non-radially arranged cutting faces, a non-rotary cutting tool, mechanism for effecting relative feeding movement between the tool and the blank longitudinally of the latter, mechanism for moving the tool inward or outward during the feeding movement to cut the blank to a predetermined contour differing from a straight line, mechanism for effecting relieving movements of the tool with respect to the contour mechanism in timed relation to the blank rotation and in conformity with the helical teeth on the blank, the said mechanism serving to accurately time the relieving movements notwithstanding inward or outward movements of the tool under the control of the contour mechanism, and means to compensate the relieving operation at different blank diameters for the non-radial cutting faces on the teeth of the blank.

56. In a relieving machine, the combination comprising a rotatable spindle adapted to carry a blank having teeth provided with non-radially arranged cutting faces, a cutting tool, mechanism for effecting relative feeding movement between the tool and the blank, mechanism for moving the tool inward or outward during the feeding movement to cut the blank to a predetermined contour, mechanism for effecting relieving movements of the tool with respect to the contour mechanism in timed relation to the blank rotation, means to compensate the relieving operation at different blank diameters for the non-radial cutting faces on the teeth of the blank, and means dependent upon the longitudinal movement for varying the relation between the relieving movements of the tool and the rotative movement of the blank.

57. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism for moving the tool inward or outward during the feeding movement to cut the blank to a predetermined contour, mechanism for effecting relieving movements of the tool with respect to the contour mechanism in timed relation to the blank rotation, means to compensate the relieving operation at different blank diameters for the non-radial cutting faces on the teeth of the blank, and means dependent upon the longitudinal movement for varying the relation between the relieving movements of the tool and the rotative movement of the blank at any one of a plurality of rates.

58. In a relieving machine, the combination comprising a rotatable spindle adapted to carry a blank having teeth provided with non-radially arranged cutting faces, a cutting tool, mechanism for effecting relative feeding movement between the tool and the blank, mechanism for moving the tool inward or outward during the feeding movement to cut the blank to a predetermined contour, mechanism for effecting relieving movements of the tool with respect to the contour mechanism in timed relation to the blank rotation, means to compensate the relieving operation at different blank diameters for the non-radial cutting faces on the teeth of the blank, and means dependent upon the longitudinal movement for varying the relation between the relieving movements of the tool and the rotative movement of the blank to conform to either right-hand or left-hand helical teeth on the blank.

59. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, automatically acting mechanism for moving the tool inward or outward during the feeding movement to cut the blank to a predetermined contour differing from a straight line, mechanism for effecting relieving movements of the tool with respect to the contour mechanism in timed relation to the blank rotation and in conformity with helical teeth on the blank, the said mechanism serving to accurately time the relieving movements notwithstanding inward or outward movements of the tool under the control of the contour mechanism, and means to compensate the relieving operation at different blank diameters for the non-radial cutting faces on the teeth of the blank.

60. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism including a former and former pin for causing the tool to move inward or outward during the feeding movement to cut the blank to a predetermined contour, mechanism for effecting relieving movements of the tool with respect to the former and former pin in timed relation to the blank rotation, the said mechanism serving to accurately time the relieving movements notwithstanding inward or outward movements of the tool under the control of the contour mechanism, and means to compensate the relieving operation at different blank diameters for the non-radial cutting faces on the teeth of the blank.

61. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism including a former and former pin for causing the tool to move inward or outward during the feeding movement to cut the blank to a predetermined contour, the said tool and the said former pin being the same in shape, mechanism for effecting relieving movements of the tool with respect to the former and former pin in timed relation to the blank rotation, the said mechanism serving to accurately time the relieving movements notwithstanding inward or outward movements of the tool under the control of the contour mechanism, and means to compensate the relieving operation at different blank diameters for the non-radial cutting faces on the teeth of the blank.

62. In a relieving machine, the combination comprising a rotatable spindle adapted to carry a blank having teeth provided with non-radially arranged cutting faces, a cutting tool, mechanism for effecting relative feeding movement between the tool and the blank longitudinally of the latter, mechanism including a former and former pin for causing the tool to move inward or outward during the feeding movement to cut the blank to a predetermined contour, means for moving the former longitudinally to properly position it with respect to the blank, mechanism for effecting relieving movements of the tool with respect to the former and former pin in timed relation to the blank rotation, and means to compensate the relieving operation at different blank diameters for the non-radial cutting faces on the teeth of the blank.

63. In a relieving machine, the combination comprising a rotatable spindle adapted to carry a blank having teeth provided with non-radially arranged cutting faces, a carriage movable longitudinally of the spindle axis, a transversely movable slide on the carriage, a cutting tool carried by the slide, mechanism for moving the slide and the tool transversely as the carriage moves longitudinally so as to cut the blank to a predetermined contour, mechanism for effecting relieving movements of the tool relatively to the slide in timed relation to the blank rotation, the said mechanism serving to accurately time the relieving movements notwithstanding inward or outward movements of the tool under the control of the contour mechanism, and means to compensate the relieving operation at different blank diameters for the non-radial cutting faces on the teeth of the blank.

64. In a relieving machine, the combination comprising a rotatable spindle adapted to carry a blank having helical teeth provided with non-radially arranged cutting faces, a carriage movable longitudinally of the spindle axis, a transversely movable slide on the carriage, a cutting tool carried by the slide, mechanism for moving the slide and the tool transversely as the carriage moves longitudinally so as to cut the blank to a predetermined contour mechanism for effecting relieving movements of the tool relatively to the slide and in timed relation to the blank rotation and in conformity with the helical teeth on the blank having any desired degree of inclination, the said mechanism serving to accurately time the relieving movements notwithstanding inward or outward movements of the tool under the control of the contour mechanism, and means to compensate the relieving operation at different blank diameters for the non-radial cutting faces on the teeth of the blank.

65. In a relieving machine, the combination comprising a rotatable spindle adapted to carry a blank having helical teeth provided with non-radially arranged cutting faces, a carriage movable longitudinally of the spindle axis, a transversely movable slide on the carriage, a cutting tool carried by the slide, mechanism for moving the slide and the tool transversely as the carriage moves longitudinally so as to cut the blank to a predetermined contour, mechanism for effecting relieving movements of the tool relatively to the slide in timed relation to the blank rotation and in conformity with the helical teeth on the blank inclined in either direction, and means to compensate the relieving operation at different blank diameters for the non-radial cutting faces on the teeth of the blank.

66. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, means to compensate the relieving operation at different blank diameters for the non-radial cutting faces on the teeth of the blank, mechanism for moving the tool inward or outward during the feeding movement to cut the blank with different diameters, and mechanism for varying the spindle roation to effect relieving in conformity with the helical teeth on the blank.

67. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting the relieving movements of the tool at a normally uniform frequency, means to compensate the relieving operation at different blank diameters for the non-radial cutting faces on the teeth of the blank, automatically acting mechanism for moving the tool inward or outward during the feeding movement to cut the blank to different diameters, and mechanism for varying the spindle rotation to effect relieving in conformity with the helical teeth on the blank.

68. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, means to compensate the relieving operation at different blank diameters for the non-radial cutting faces on the teeth of the blank, automatically acting mechanism for moving the tool inward or outward during the feeding movement to cut the blank with a predetermined contour differing from a straight line, and mechanism for varying the spindle rotation to effect relieving in conformity with the helical teeth on the blank.

69. In a relieving machine, the combination comprising a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, means to compensate the relieving operation at different blank diameters for the non-radial cutting faces on the teeth of the blank, mechanism including a former and former pin for causing the tool to move inward or outward during the feeding movement to cut the blank to a predetermined contour, and mechanism for varying the spindle rotation to effect relieving in conformity with the helical teeth on the blank.

70. In a relieving machine, the combination comprising a rotatable spindle adapted to carry a blank having helical teeth provided with non-radially arranged cutting faces, a carriage movable longitudinally of the spindle axis, a transversely movable slide on the carriage, a cutting tool carried by the slide, mechanism for moving the slide and the tool transversely as the carriage moves longitudinally so as to cut the blank with different diameters, mechanism acting independently of the carriage movement for effecting relieving movements of the tool at a normally uniform frequency, means to compensate the relieving operation at different blank diameters for the non-radial cutting faces on the teeth of the blank, and mechanism dependent on the carriage movements for varying the spindle rotation relatively to the uniform relieving movements in conformity with helical teeth on the blank.

71. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, automatically-acting mechanism for effecting relieving movements, and means to compensate the relieving operation at different blank diameters for the non-radial cutting faces on the teeth of the blank.

72. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, automatically-acting mechanism for effecting, between each two feeding movements, a predetermined whole number of regular relieving movements of the tool supplemental to the feeding movements, and means to compensate the relieving operation at different blank diameters for the non-radial cutting faces on the teeth of the blank.

73. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent approximating one revolution, automatically-acting mechanism for effecting, between each two feeding movements, a predetermined whole number of regular relieving movements of the tool supplemental to the feeding movements, and means to compensate the relieving operation at different blank diameters for the non-radial cutting faces on the teeth of the blank.

74. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent a little more or a little less than one revolution in accordance with helical teeth on the blank, automatically-acting mechanism for effecting, between each two feeding movements, a predetermined whole number of regular relieving movements of the tool supplemental to the feeding movements, and means to compensate the relieving operation at different blank diameters for the non-radial cutting faces on the teeth of the blank.

75. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent approximating one revolution, means for changing the relation between the intermittent feeding movements and the spindle rotation, automatically-acting means for effecting relieving movements of the tool in conformity to the teeth on the blank, and means to compensate the relieving operation at different blank diameters for the non-radial cutting faces on the teeth of the blank.

76. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent approximating one revolution, means for changing the relation between the intermittent feeding movements and the spindle rotation, means for changing the amount of each of the intermittent feeding movements independently of the extent of spindle rotation, automatically-acting means for effecting relieving movements of the tool, and means to compensate the relieving operation at different blank diameters for the non-radial cutting faces on the teeth of the blank.

77. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent approximating one revolution, means for changing the said extent of spindle rotation independently of the rate of the intermittent feeding movements, automatically-acting means for effecting relieving movement of the tool, and means to compensate the relieving operation at different blank diameters for the non-radial cutting faces on the teeth of the blank.

78. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent approximating one revolution, means for changing the relation between the intermittent feeding movements and the spindle rotation, automatically-acting mechanism for effecting regular relieving movements of the tool supplemental to the aforesaid feeding movements, and means to compensate the relieving operation at different blank diameters for the non-radial cutting faces on the teeth of the blank, the said relieving mechanism remaining in operative relation to the tool during the said feeding movements.

79. A metal-cutting machine comprising in combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent approximating one revolution, automatically-acting mechanism for effecting, between each two feeding movements, a predetermined whole number of regular relieving movements of the tool supplemental to the feeding movements, means to compensate the relieving operation at different blank diameters for the non-radial cutting faces on the teeth of the blank, and means for changing the extent of spindle rotation independently of the rate of the said feeding and relieving movements.

80. A metal-cutting machine comprising in combination, a rotatable spindle adapted to carry a blank having teeth provided with non-radially arranged cutting faces, a cutting tool, automatic means for effecting at intervals relative intermittent feeding movements all in the same direction between the tool and the blank longitudinally of the latter, means for moving the tool inward or outward as longitudinal movement takes place so as to cut the blank with different diameters, automatically-acting means for effecting relieving movements of the tool, and means to compensate the relieving operation at different blank diameters for the non-radial cutting faces on the teeth of the blank.

81. A metal-cutting machine comprising in combination, a rotatable spindle adapted to carry a blank having teeth provided with non-radially arranged cutting faces, a cutting tool, automatic means for effecting a relative feeding between the tool and the blank longitudinally of the latter, automatic mechanism including a former and a former pin for moving the tool inward or outward as longitudinal movement takes place so as to cut the blank with a predetermined contour differing from a straight line and corresponding to that of the former, means associated with the tool feeding means for effecting relative intermittent longitudinal movements between the former and the former pin, automatically-acting means for effecting relieving movements of the tool, and means to compensate at different blank diameters for the non-radial cutting faces on the teeth of the blank.

82. A metal-cutting machine comprising in combination, a rotatable spindle adapted to carry a blank having teeth provided with non-radially arranged cutting faces, a cutting tool, automatic means for effecting regular step-by-step longitudinal feeding movements of the tool with respect to the blank all in the same direction, automatic mechanism for moving the tool inward or outward as longitudinal movement takes place so as to cut the blank with a predetermined contour, automatically-acting mechanism for effecting regular relieving movements of the tool independent of the aforesaid movements, and means to compensate the relieving operation at different blank diameters for the non-radial cutting faces on the teeth of the blank.

83. A metal-cutting machine comprising in combination, a rotatable spindle adapted to carry a blank having teeth provided with non-radially arranged cutting faces, a cutting tool, automatic means for effecting regular step-by-step longitudinal feeding movements of the tool with respect to the blank all in the same direction, automatic mechanism including a former and a former pin for moving the tool inward or outward as longitudinal movement takes place so as to cut the blank with a predetermined contour differing from a straight line and corresponding to that of the former, means associated with the tool feeding means for effecting regular step-by-step longitudinal movements of the former pin with respect to the former in unison with the tool movements, automatically-acting mechanism for effecting regular relieving movements of the tool independent of the aforesaid movements, and means to compensate the relieving operation at different blank diameters for the non-radial cutting faces on the teeth of the blank.

84. A metal-cutting machine comprising in combination, a rotatable spindle adapted to carry a blank having teeth provided with non-radially arranged cutting faces, a cutting tool, automatic means for effecting regular step-by-step longitudinal feeding movements of the tool with respect to the blank all in the same direction, automatic mechanism including a former and a former pin for moving the tool inward or outward as longitudinal movement takes place so as to cut the blank with a predetermined contour corresponding to that of the former, means associated with the tool feeding means for effecting regular step-by-step longitudinal movements of the former pin with respect to the former in unison with the tool movements, automatically-acting mechanism for effecting regular relieving movements of the tool relatively to the former and former pin and independent of the aforesaid movements, and means to compensate the relieving operation at different blank diameters for the non-radial cutting faces on the teeth of the blank.

85. A metal-cutting machine comprising in combination, a rotatable spindle adapted to carry a blank having teeth provided with non-radially arranged cutting faces, a cutting tool, automatic means for effecting at intervals relative intermittent feeding movements all in the same direction between the tool and the blank longitudinally of the latter, means for moving the tool inward or outward as longitudinal movement takes place so as to cut the blank with different diameters, automatically-acting mechanism for effecting regular supplemental relieving movements of the tool independent of the aforesaid movements, the said mechanism serving to effect the relieving movements in timed relation to the spindle rotation, means to compensate the relieving operation at different blank diameters for the non-radial cutting faces on the teeth of the blank, and means for varying the said timed relation in accordance with the aforesaid longitudinal feed.

86. A metal-cutting machine comprising in combination, a rotatable spindle adapted to carry a blank having teeth provided with non-radially arranged cutting faces, a cutting tool, automatic means for effecting regular step-by-step longitudinal feeding movements of the tool with respect to the blank all in the same direction, automatic mechanism including a former and a former pin for moving the tool inward or outward as longitudinal movement takes place so as to cut the blank with a predetermined contour differing from a straight line and corresponding to that of the former, means associated with the tool feeding means for effecting regular step-by-step longitudinal movements of the former pin with respect to the former in unison with the tool movements, automatically-acting mechanism for effecting regular supplemental relieving movements of the tool independent of the aforesaid movements, the said mechanism serving to effect the relieving movements in timed relation to the spindle rotation, means to compensate the relieving operation at different blank diameters for the non-radial cutting faces on the teeth of the blank, and means for varying the said timed relation in accordance with the aforesaid longitudinal feed.

87. The described combination comprising a rotatable spindle adapted to carry a blank having teeth provided with non-radially arranged cutting faces, a cutting tool, automatic means for longitudinally feeding the tool with respect to the blank, automatically-acting mechanism for effecting regular relieving movements of the tool supplemental to the aforesaid feeding movement, means to compensate the relieving operation at different blank diameters for the non-radial cutting faces on the teeth of the blank, and automatic means for stopping the blank rotation and the relieving movements after each rotation of the blank to a predetermined extent.

88. The described combination comprising a rotatable spindle adapted to carry a blank having teeth provided with non-radially arranged cutting faces, a cutting tool, automatic means for feeding the tool longitudinally with respect to the blank, automatic means for stopping the blank after each rotation thereof to a predetermined extent, automatically-acting mechanism for effecting a predetermined whole number of regular relieving movements of the tool supplemental to the feeding movement while the blank is rotating to the aforesaid predetermined extent, and means to compensate the relieving operation at different blank diameters for the non-radial cutting faces on the teeth of the blank.

89. The described combination comprising a rotatable spindle adapted to carry a blank having teeth provided with non-radially arranged cutting faces, a driving member for the spindle, automatic means for stopping the said driving member after rotation thereof through one revolution, a cutting tool, automatic means for longitudinally feeding the tool with respect to the blank, mechanism interposed between the drive member and the spindle for varying the rotation of the spindle relatively to that of the drive member in accordance with helical teeth on the blank, means for effecting relieving movements of the tool, and means to compensate the relieving operation at different blank diameters for the non-radial cutting faces on the teeth of the blank.

90. The described combination of a rotatable spindle adapted to carry a blank having teeth provided with non-radially arranged cutting faces, a cutting tool, automatic means for longitudinally feeding the tool with respect to the blank, automatic mechanism for moving the tool inward or outward as longitudinal feed takes place so as to cut the blank with a predetermined contour differing from a straight line, automatically-acting mechanism for effecting regular relieving movements of the tool supplemental to the aforesaid feeding movements, the said relieving mechanism remaining in operative relation to the tool during the said feeding movements, and means to compensate the relieving operation at different blank diameters for the non-radial cutting faces on the teeth of the blank.

91. The described combination of a rotatable spindle adapted to carry a blank having teeth provided with non-radially arranged cutting faces, a cutting tool, automatic means for longitudinally feeding the tool with respect to the blank, automatic mechanism including a former and former pin for moving the tool inward or outward as longitudinal movement takes place so as to cut the blank with a predetermined contour corresponding to that of the former, automatic means for stopping the blank after each rotation thereof to a predetermined extent, automatically-acting mechanism for effecting a predetermined whole number of regular relieving movements of the tool supplemental to the feeding movement while the blank is rotating to the aforesaid predetermined extent, and means to compensate the relieving operation at different blank diameters for the non-radial cutting faces on the teeth of the blank.

92. In combination, a rotatable spindle adapted to carry a blank having teeth provided with non-radially arranged cutting faces, a cutting tool, automatic means for effecting regular intermittent longitudinal feeding movements of the tool with respect to the blank, automatically-acting mechanism for effecting regular relieving movements of the tool supplemental to the aforesaid feeding movements, the said relieving mechanism remaining in operative relation to the tool during the said feeding movements, means to compensate the relieving operation at different blank diameters for the non-radial cutting faces on the teeth of the blank, and automatic means for stopping the spindle rotation and relieving movements at the time of each feeding movement.

93. In combination, a rotatable spindle adapted to carry a blank having teeth provided with non-radially arranged cutting faces, a cutting tool, automatic means for effecting regular intermittent longitudinal feeding movements of the tool with respect to the blank, automatically-acting mechanism for effecting between each two feeding movements a predetermined whole number of regular relieving movements of the tool supplemental to the feeding movements, means to compensate the relieving operation at different blank diameters for the non-radial cutting faces on the teeth of the blank, and automatic means for stopping the spindle rotation and relieving movements at the time of each feeding movement.

94. In combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent approximating one revolution, means for changing the said extent of spindle rotation independently of the rate of the intermittent feeding movements, automatic means for stopping the spindle rotation at the time of each feeding movement, automatically-acting means for effecting relieving movement of the tool, and means to compensate the relieving operation at different blank diameters for the non-radial cutting faces on the teeth of the blank.

95. In combination, a rotatable spindle adapted to carry a blank having teeth provided with non-radially arranged cutting faces, a cutting tool, automatic means for effecting regular intermittent longitudinal feeding movements of the tool with respect to the blank, the said means acting after each rotation of the spindle to a predetermined extent approximately one revolution, means for changing the relation between the intermittent feeding movements and the spindle rotation, automatically-acting mechanism for effecting regular relieving movements of the tool supplemental to the aforesaid feeding movements, means to compensate the relieving operation at different blank diameters for the non-radial cutting faces on the teeth of the blank, and automatic means for stopping the spindle rotation and relieving movements at the time of each feeding movement.

96. In combination, a rotatable spindle adapted to carry a blank having teeth provided with non-radially arranged cutting faces, a cutting tool, automatic means for effecting regular intermittent longitudinal feeding movements of the tool with respect to the blank all in the same direction, the said means acting after each rotation of the spindle to a predetermined extent approximating one revolution, automatically-acting mechanism for effecting, between each two feeding movements, a predetermined whole number of regular relieving movements of the tool supplemental to the feeding movements, means to compensate the relieving operation at different blank diameters for the non-radial cutting faces on the teeth of the blank, means for changing the extent of spindle rotation independently of the rate of the said feeding and relieving movements, and automatic means for stopping the spindle rotation and relieving movements at the time of each feeding movement.

97. In a relieving machine for operating on a cutter blank having helical teeth provided with non-radially arranged cutting faces, the combination with a cutting tool, and means for effecting intermittent longitudinal feeding movement of the cutting tool relative to the blank, of means for withdrawing the tool from engagement with the blank prior to each feeding movement and for restoring the tool into operative relation therewith after each feeding operation, means for effecting relieving movements, and means to compensate the relieving operation at different blank diameters for the non-radial cutting faces on the blank.

98. In combination, a rotatable spindle adapted to carry a blank having teeth provided with non-radially arranged cutting faces, a cutting tool, automatic means for effecting at intervals relative intermittent feeding movements between the tool and the blank longitudinally of the latter, means for moving the tool inward or outward as longitudinal movement takes place so as to cut the blank with different diameters, automatically-acting mechanism for effecting regular supplemental relieving movements of the tool independent of the aforesaid movements, means to compensate the relieving operation at different blank diameters for the non-radial cutting faces on the teeth of the blank, and automatic means for stopping the spindle rotation and the relieving movements at the time of each feeding movement.

99. In combination, a rotatable spindle adapted to carry a blank having teeth provided with non-radially arranged cutting faces, a cutting tool, automatic means for effecting at intervals relative intermittent feeding movements between the tool and the blank longitudinally of the latter, after each rotation of the blank to a predetermined extent a little more or a little less than one revolution in accordance with helical teeth on the blank, means for effecting relieving movements of the tool, means to compensate the relieving operation at different blank diameters for the non-radial cutting faces on the teeth of the blank, means for moving the tool inward or outward as longitudinal movement takes place so as to cut the blank with different diameters, and automatic means for stopping the spindle rotation at the time of each feeding movement.

100. In combination, a rotatable spindle adapted to carry a blank having teeth provided with non-radially arranged cutting faces, a cutting tool, automatic means for effecting at intervals relative intermittent feeding movements between the tool and the blank longitudinally of the latter, means for moving the tool inward or outward as longitudinal movement takes place so as to cut the blank with different diameters, automatically-acting mechanism for effecting regular supplemental relieving movements of the tool independent of the aforesaid movements, the said mechanism serving to effect the relieving movements in timed relation to the spindle rotation, means to compensate the relieving operation at different blank diameters for the non-radial cutting faces on the teeth of the blank, means for varying the said timed relation in accordance with the aforesaid longitudinal feed, and automatic means for stopping the spindle rotation and the relieving movements at the time of each feeding movement.

101. The combination comprising a rotatable spindle adapted to carry a blank having teeth provided with non-radially arranged cutting faces, a cutting tool, means for feeding the tool longitudinally of the blank, automatic means for withdrawing the tool from the blank at intervals, automatically-acting mechanism for effecting regular relieving movements of the tool supplemental to the aforesaid withdrawing movements, and means to compensate the relieving operation at different blank diameters for the non-radial cutting faces on the teeth of the blank.

102. The combination comprising a rotatable spindle adapted to carry a blank having teeth provided with non-radially arranged cutting faces, a cutting tool, means for feeding the tool longitudinally of the blank, automatic means for withdrawing the tool from the blank at intervals, automatically-acting mechanism for effecting regular relieving movements of the tool supplemental to the aforesaid withdrawing movements, and means to compensate the relieving operation at different blank diameters for the non-radial cutting faces on the teeth of the blank, the said relieving mechanism being bodily movable with the tool during the said withdrawing movements.

103. The combination comprising a rotatable spindle adapted to carry a blank having teeth provided with non-radially arranged cutting faces, a cutting tool, means for feeding the tool longitudinally of the blank, automatic means for withdrawing the tool from the blank at intervals, automatically-acting mechanism for effecting regular relieving movements of the tool supplemental to the aforesaid withdrawing movements, the said relieving mechanism being bodily movable with the tool during the said withdrawing movements, means to compensate the relieving operation at different blank diameters for the non-radial cutting faces on the teeth of the blank, and driving devices for the relieving mechanism including a splined shaft parallel to the direction of the aforesaid bodily movement.

104. The combination comprising a rotatable spindle adapted to carry a blank having teeth provided with non-radially arranged cutting faces, a cutting tool, means for feeding the tool longitudinally of the blank, automatic means for withdrawing the tool from the blank at intervals, automatically-acting mechanism for effecting a predetermined whole number of regular relieving movements of the tool supplemental of the said withdrawing movements between each two withdrawing movements, and means to compensate the relieving operation at different blank diameters for the non-radial cutting faces on the teeth of the blank.

105. The combination comprising a rotatable spindle adapted to carry a blank having teeth provided with non-radially arranged cutting faces, a cutting tool, means for feeding the tool longitudinally of the blank, automatic means for withdrawing the tool from the blank after each rotation of the spindle to a predetermined extent, automatically-acting mechanism for effecting a predetermined whole number of regular relieving movements of the tool supplemental of the said withdrawing movements between each two withdrawing movements, and means to compensate the relieving operation at different blank diameters for the non-radial cutting faces on the teeth of the blank.

106. The combination comprising a rotatable spindle adapted to carry a blank having teeth provided with non-radially arranged cutting faces, a cutting tool, means for feeding the tool longitudinally of the blank, automatic means for withdrawing the tool from the blank after each rotation of the spindle to a predetermined extent, automatically-acting mechanism for effecting regular relieving movements of the tool supplemental to the aforesaid withdrawing movements, the said relieving mechanism remaining in operative relation to the tool during the said withdrawing movements, means to compensate the relieving operation at different blank diameters for the non-radial cutting faces on the teeth of the blank, and means for changing the relation between the withdrawing movements and the spindle rotation.

107. The combination comprising a rotatable spindle adapted to carry a blank having teeth provided with non-radially arranged cutting faces, a cutting tool, means for feeding the tool longitudinally of the blank, automatic means for withdrawing the tool from the blank after each rotation of the spindle to a predetermined extent, automatically-acting mechanism for effecting a predetermined whole number of regular relieving movements of the tool supplemental of the said withdrawing movements, means to compensate the relieving operation at different blank diameters for the non-radial cutting faces on the teeth of the blank, and means for changing the relation between the withdrawing movements and the spindle rotation.

108. The combination comprising a rotatable spindle adapted to carry a blank having teeth provided with non-radially arranged cutting faces, a cutting tool, means for feeding the tool longitudinally of the blank, automatic means for withdrawing the tool from the blank after each rotation of the spindle to a predetermined extent, automatically-acting mechanism for effecting regular relieving movements of the tool supplemental to the aforesaid withdrawing movements, the said relieving mechanism remaining in operative relation to the tool during the said withdrawing movements, means to compensate the relieving operation at different blank diameters for the non-radial cutting faces on the teeth of the blank, and means for changing the extent of spindle rotation independently of the rate of the intermittent feeding movements.

109. The combination comprising a rotatable spindle adapted to carry a blank having helical grooves to form teeth provided with non-radially arranged cutting faces, a cutting tool, means for feeding the tool longitudinally of the blank, automatic means for withdrawing the tool from the blank at intervals, each withdrawal taking place in a predetermined definite relation to one of the helical grooves, automatically-acting means for effecting a predetermined whole number of regular relieving movements of the tool supplemental of the said withdrawing movements between each two withdrawing movements, and means to compensate the relieving operation at different blank diameters for the non-radial cutting faces on the teeth of the blank.

110. The combination comprising a rotatable spindle adapted to carry a blank having teeth provided with non-radially arranged cutting faces, a cutting tool, means for feeding the tool longitudinally of the spindle, means for moving the tool inward or outward as longitudinal movement takes place so as to cut the blank with different diameters, automatic means supplemental to the mechanism last aforesaid for moving or withdrawing the tool from the blank at intervals, automatically-acting mechanism for effecting regular relieving movements of the tool supplemental to the aforesaid movements, and means to compensate the relieving operation at different blank diameters for the non-radial cutting faces on the teeth of the blank.

111. The combination comprising a rotatable spindle adapted to carry a blank having teeth provided with non-radially arranged cutting faces, a cutting tool, means for feeding the tool longitudinally of the spindle, automatic mechanism including a stationary former and a former pin for moving the tool inward or outward as longitudinal movement takes place so as to cut the blank with a predetermined contour, corresponding to that of the former, automatic means supplemental to the mechanism last aforesaid for moving or withdrawing the former pin from the stationary former and for moving or withdrawing the tool from the blank at intervals, automatically-acting mechanism for effecting regular relieving movements of the tool supplemental to the aforesaid movements, and means to compensate the relieving operation at different blank diameters for the non-radial cutting faces on the teeth of the blank.

112. The combination comprising a rotatable spindle adapted to carry a blank having teeth provided with non-radially arranged cutting faces, a cutting tool, means for feeding the tool longitudinally of the spindle, means for moving the tool inward or outward as longitudinal movement takes place so as to cut the blank with different diameters, automatic means supplemental to the mechanism last aforesaid for withdrawing the tool from the blank after each rotation of the spindle to a predetermined extent a little more or a little less than one revolution in accordance with helical grooves on the blank, automatically-acting mechanism for effecting, between each two withdrawing movements, a whole number of relieving movements of the tool supplemental to the aforesaid movements, and means to compensate the relieving operation at different blank diameters for the non-radial cutting faces on the teeth of the blank.

113. The combination comprising a rotatable spindle adapted to carry a blank having teeth provided with non-radially arranged cutting faces, a cutting tool, means for feeding the tool longitudinally of the spindle, automatic mechanism including a stationary former and a former pin for moving the tool inward or outward as longitudinal movement takes place so as to cut the blank with a predetermined contour differing from a straight line and corresponding to that of the former, automatic means supplemental to the mechanism last aforesaid for withdrawing the former pin from the stationary former and for withdrawing the tool from the blank after each rotation of the spindle to a predetermined extent a little more or a little less than one revolution in accordance with helical grooves on the blank, automatically-acting mechanism for effecting, between each two withdrawing movements, a whole number of relieving movements of the tool supplemental to the aforesaid movements, and means to compensate the relieving operation at different blank diameters for the non-radial cutting faces on the teeth of the blank.

114. In a machine of the class described, the combination comprising a rotatable spindle adapted to carry a blank having generally longitudinal grooves to form teeth provided with non-radially arranged cutting faces, a cutting tool, automatic means for effecting regular intermittent longitudinal feeding movements of the tool with respect to the blank, the said automatic means serving to effect the feeding movements in timed relation to the blank rotation so that each movement occurs with the tool opposite one of the grooves in the blank, automatically-acting mechanism for effecting, between such two feeding movements, a predetermined whole number of regular relieving movements supplemental to the feeding movements, and means to compensate the relieving operation at different blank diameters for the non-radial cutting faces on the teeth of the blank.

115. In a machine of the class described, the combination comprising a rotatable spindle adapted to carry a blank having generally longitudinal grooves to form teeth provided with non-radially arranged cutting faces, a cutting tool, automatic means for effecting regular intermittent longitudinal feeding movements of the tool with respect to the blank and for withdrawing the tool from the blank during feeding, the said automatic means serving to effect the feeding and withdrawing movements in timed relation to the blank rotation so that each movement occurs with the tool opposite one of the grooves in the blank, automatically-acting mechanism for effecting, between each two feeding and withdrawing movements, a predetermined whole number of regular relieving movements supplemental to the feeding and withdrawing movements, and means to compensate the relieving operation at different blank diameters for the non-radial cutting faces on the teeth of the blank.

116. In a machine of the class described, the combination comprising a rotatable spindle adapted to carry a blank having generally longitudinal grooves to form teeth provided with non-radially arranged cutting faces, a cutting tool, automatic means for effecting regular intermittent longitudinal feeding movements of the tool with respect to the blank and for withdrawing the tool from the blank during feeding, the said automatic means serving to effect the feeding and withdrawing movements in timed relation to the blank rotation so that each movement occurs with the tool opposite one of the grooves in the blank, automatically-acting mechanism for effecting, between each two feeding and withdrawing movements, a predetermined whole number of regular relieving movements supplemental to the feeding and withdrawing movements, the said relieving mechanism being bodily movable with the tool during the said feeding and withdrawing movements, and means to compensate the relieving operation at different blank diameters for the non-radial cutting faces on the teeth of the blank.

117. In a machine of the class described, the combination comprising a rotatable spindle adapted to carry a blank having helical grooves to form teeth having non-radially arranged cutting faces, a cutting tool, automatic means for effecting regular intermittent longitudinal feeding movements of the tool with respect to the blank, the said automatic means serving to effect each of the feeding movements after a little more or a little less than a complete revolution of the blank so that each movement occurs when the tool is opposite one of the helical grooves in the blank, automatically-actuated means for effecting relieving movements of the tool, and means to compensate the relieving operation at different blank diameters for the non-radial cutting faces on the teeth of the blank.

118. In a machine of the class described, the combination comprising a rotatable spindle adapted to carry a blank having helical grooves to form teeth provided with non-radially arranged cutting faces, a cutting tool, automatic means for effecting regular intermittent longitudinal feeding movements of the tool with respect to the blank, the said automatic means serving to effect each of the feeding movements after a little more or a little less than a complete revolution of the blank so that each movement occurs when the tool is opposite one of the helical grooves in the blank, automatically-acting mechanism for effecting, between each two feeding movements, a predetermined whole number of regular relieving movements supplemental to the feeding movements, and means to compensate the relieving operation at different blank diameters for the non-radial cutting faces on the teeth of the blank.

119. In a machine of the class described, the combination comprising a rotatable spindle adapted to carry a blank having helical grooves to form teeth provided with non-radially arranged cutting faces, a cutting tool, automatic means for effecting regular intermittent longitudinal feeding movements of the tool with respect to the blank all in the same direction and for withdrawing the tool from the blank during feeding, the said automatic means serving to effect each of the feeding and withdrawing movements after a little more or a little less than a complete revolution of the blank so that each movement occurs when the tool is opposite one of the helical grooves in the blank, automatically-acting mechanism for effecting, between each two feeding and withdrawing movements, a predetermined whole number of regular relieving movements, supplemental to the feeding and withdrawing movements, and means to compensate the relieving operation at different blank diameters for the non-radial cutting faces on the teeth of the blank.

120. In a machine of the class described, the combination comprising a rotatable spindle adapted to carry a blank having teeth provided with non-radially arranged cutting faces, a cutting tool, automatic means for effecting at intervals relative intermittent feeding movements between the tool and the blank longitudinally of the latter, means controlling the relative positions of the tool and blank so that they are out of contact during the feeding movements, means for moving the tool inward or outward as longitudinal movement takes place so as to cut the blank with different diameters, means for effecting relieving movement of the tool, and means to compensate the relieving operation at different blank diameters for the non-radial cutting faces on the teeth of the blank.

121. The combination comprising a rotatable spindle adapted to carry a blank having teeth provided with non-radially arranged cutting faces, a cutting tool, automatic means for effecting at intervals relative feeding movements between the tool and the blank and for withdrawing the tool from the blank at the time of each feeding movement, means for moving the tool inward or outward as feeding movement takes place so as to cut the blank with different diameters, means for effecting relieving movements, and means to compensate the relieving operation at different blank diameters for the non-radial cutting faces on the teeth of the blank.

122. In a machine of the class described, the combination comprising a rotatable spindle adapted to carry a blank having teeth provided with non-radially arranged cutting faces, a cutting tool, automatic means for effecting a relative feeding between the tool and the blank longitudinally of the latter, automatic mechanism including a former and a former pin for moving the tool inward or outward as longitudinal movement takes place so as to cut the blank with a predetermined contour differing from a straight line and corresponding to that of the former, means associated with the tool feeding means for effecting relative intermittent longitudinal movements between the former and the former pin and for separating them during the said intermittent movements, automatically-actuated means for effecting relieving movements of the tool, and means to compensate the relieving operation at different blank diameters for the non-radial cutting faces on the teeth of the blank.

123. In a machine of the class described, the combination comprising a rotatable spindle adapted to carry a blank having teeth provided with non-radially arranged cutting faces, a cutting tool, automatic means for effecting at intervals relative movements between the tool and the blank longitudinally of the latter and for withdrawing the tool from the blank at the time of each longitudinal movement, mechanism for effecting relieving movements of the tool in timed relation to the blank rotation, means to compensate the relieving operation at different blank diameters for the non-radial cutting faces on the teeth of the blank, and means for supplementally moving the tool inward or outward as longitudinal movement takes place so as to cut the blank with different diameters.

124. In a machine of the class described, the combination comprising a rotatable spindle adapted to carry a blank having teeth provided with non-radially arranged cutting faces, a cutting tool, automatic means for feeding the tool at intervals longitudinally of the blank, mechanism for effecting relieving movements of the tool in timed relation to the blank rotation, means to compensate the relieving operation at different blank diameters for the non-radial cutting faces on the teeth of the blank, means including a normally fixed former and former pin longitudinally movable with the tool for causing the tool to cut the blank with a predetermined contour, and mechanism for withdrawing the tool from the blank and the former pin from the former at the time of each longitudinal movement.

125. In a machine of the class described, the combination comprising a rotatable spindle adapted to carry a blank having teeth provided with non-radially arranged cutting faces, a cutting tool, automatic means for effecting at intervals relative movements between the tool and the blank longitudinally of the latter and for withdrawing the tool from the blank at the time of each longitudinal movement, mechanism for effecting relieving movements of the tool in timed relation to the blank rotation, means to compensate the relieving operation at different blank diameters for the non-radial cutting faces on the teeth of the blank, means for varying the relation between the relieving movements of the tool and the rotative movement of the blank in conformity with helical teeth on the blank, and means for supplementally moving the tool inward or outward as longitudinal movement takes place so as to cut the blank with different diameters.

126. The combination in a machine of the class described, of a rotatable spindle adapted to carry a blank having generally longitudinal grooves to form teeth provided with non-radially arranged cutting faces, a cutting tool, automatic means for repeatedly stopping the spindle with the tool opposite one of the grooves in the blank, automatically-acting mechanism for effecting a predetermined whole number of relieving movements of the tool during each rotative movement of the blank, and means to compensate the relieving operation at different blank diameters for the non-radial cutting faces on the teeth of the blank.

127. The combination in a machine of the class described, of a rotatable spindle adapted to carry a blank having generally longitudinal grooves to form teeth provided with non-radially arranged cutting faces, a cutting tool, automatic means for withdrawing the tool from the blank at intervals, automatically-acting mechanism for effecting a predetermined whole number of regular relieving movements of the tool supplemental to the said withdrawing movements between each two withdrawing movements, means to compensate the relieving operation at different blank diameters for the non-radial cutting faces on the teeth of the blank, and automatic means for stopping the spindle rotation and the relieving movements at the time of each withdrawing movement.

128. The combination in a machine of the class described, of a rotatable spindle adapted to carry a blank having generally longitudinal grooves to form teeth provided with non-radially arranged cutting faces, a cutting tool, automatic means for repeatedly stopping the spindle with the tool opposite one of the grooves in the blank, automatic means for withdrawing the tool from the blank at each stopping of the spindle, automatically-acting mechanism for effecting a predetermined whole number of regular relieving movements of the tool suplemental to the said withdrawing movements between each two withdrawing movements, and means to compensate the relieving operation at different blank diameters for the non-radial cutting faces on the teeth of the blank.

129. The combination in a machine of the class described, of a rotatable spindle adapted to carry a blank having helical grooves to form teeth provided with non-radially arranged cutting faces, a cutting tool, automatic means for repeatedly stopping the spindle with the tool opposite one of the helical grooves in the blank, automatically-acting mechanism for effecting a predetermined whole number of relieving movements of the tool during each rotative movement of the blank, and means to compensate the relieving operation at different blank diameters for the non-radial cutting faces on the teeth of the blank.

130. The combination in a machine of the class described, of a rotatable spindle adapted to carry a blank having helical grooves to form teeth provided with non-radially arranged cutting faces, a cutting tool, automatic means for repeatedly stopping the spindle with the tool opposite one of the helical grooves in the blank, automatic means for withdrawing the tool from the blank at intervals, automatically-acting mechanism for effecting a predetermined whole number of regular relieving movements of the tool supplemental of the said withdrawing movements between each two withdrawing movements, means to compensate the relieving operation at different blank diameters for the non-radial cutting faces on the teeth of the blank, and automatic means for stopping the spindle rotation and the relieving movements at the time of each withdrawing movement.

131. The combination in a machine of the class described, of a rotatable spindle adapted to carry a blank having generally longitudinal grooves to form teeth provided with non-radially arranged cutting faces, a cutting tool, means for feeding the tool longitudinally of the blank, automatic means for repeatedly stopping the spindle with the tool opposite one of the grooves in the blank, means for moving the tool inward or outward as longitudinal movement takes place so as to cut the blank with different diameters, means for effecting relieving movements of the tool, and means to compensate the relieving operation at different blank diameters for the non-radial cutting faces on the teeth of the blank.

132. In a metal cutting machine of the class described, the combination comprising a rotatable spindle adapted to carry a blank having generally longitudinal grooves to form teeth provided with non-radially arranged cutting faces, a cutting tool, automatic means for effecting regular intermittent longitudinal feeding movements of the tool with respect to the blank all in the same direction, automatic means for stopping the spindle at the time of each longitudinal movement with the tool opposite one of the grooves in the blank, automatically-acting mechanism for effecting a predetermined whole number of relieving movements of the tool during each rotative movement of the blank, and means to compensate the relieving operation at different blank diameters for the non-radial cutting faces on the teeth of the blank.

133. In a metal cutting machine of the class described, the combination comprising a rotatable spindle adapted to carry a blank having generally longitudinal grooves to form teeth provided with non-radially arranged cutting faces, a cutting tool, automatic means for effecting regular intermittent longitudinal feeding movements of the tool with respect to the blank all in the same direction, automatic means for withdrawing the tool from the blank at the time of each longitudinal feeding movement, automatically-acting mechanism for effecting a predetermined whole number of regular relieving movements of the tool supplemental of the said withdrawing movements between each two withdrawing movements, means to compensate the relieving operation at different blank diameters for the non-radial cutting faces on the teeth of the blank, and automatic means for stopping the spindle rotation and the relieving movements at the time of each withdrawing movement.

134. In a metal cutting machine of the class described, the combination comprising a rotatable spindle adapted to carry a blank having helical grooves to form teeth provided with non-radially arranged cutting faces, a cutting tool, automatic means for effecting regular intermittent longitudinal feeding movements of the tool with respect to the blank all in the same direction, automatic means for stopping the spindle at the time of each longitudinal movement with the tool opposite one of the helical grooves in the blank, automatically-acting mechanism for effecting a predetermined whole number of relieving movements of the tool during each rotative movement of the blank, and means to compensate the relieving operation at different blank diameters for the non-radial cutting faces on the teeth of the blank.

135. In a metal cutting machine of the class described, the combination comprising a rotatable spindle adapted to carry a blank having helical teeth provided with non-radially arranged cutting faces, a cutting tool, automatic means for effecting at intervals relative movements between the tool and the blank longitudinally of the latter, mechanism for effecting relieving movements of the tool at a normally uniform frequency, mechanism for varying the spindle rotation relatively to the uniform relieving movements to effect relieving in conformity with helical teeth on the blank, means to compensate the relieving operation at different blank diameters for the non-radial cutting faces on the teeth of the blank, and automatic means for stopping the blank rotation at the time of each longitudinal movement, the aforesaid variation in the spindle rotation making it possible for the blank to be so positioned that a helical groove thereof will be opposite the tool at each longitudinal movement.

136. In a metal cutting machine of the class described, the combination comprising a rotatable spindle adapted to carry a blank having generally longitudinal grooves to form teeth provided with non-radially arranged cutting faces, a cutting tool, automatic means for effecting at intervals relative movements between the tool and the blank longitudinally of the latter, automatic means for stopping the blank rotation at the time of each longitudinal movement with one of the grooves of the blank opposite the tool, means for moving the tool inward or outward as longitudinal movement takes place so as to cut the blank with different diameters, automatically-acting mechanism for effecting regular relieving movements of the tool supplemental to the aforesaid movements, and means to compensate the relieving operation at different blank diameters for the non-radial cutting faces on the teeth of the blank.

137. The combination comprising a rotatable spindle adapted to carry a blank having teeth provided with non-radially arranged cutting faces, a cutting tool movable transversely of the spindle axis toward or from the spindle, means for moving the tool toward the blank, fluid controlled means supplemental to the last named means for retarding the said movement of the tool, automatically-acting means for effecting relieving movements of the tool, and means to compensate the relieving operation at different blank diameters for the non-radial cutting faces on the teeth of the blank.

138. The combination comprising a rotatable spindle adapted to carry a blank having teeth provided with non-radially arranged cutting faces, a cutting tool movable transversely of the spindle faces toward or from the blank, means for retarding the movements of the tool toward the blank including a cylinder and a piston therein, a piston rod for connecting the piston with the tool, a spring surrounding the rod and serving to move the tool toward the blank, automatically-acting means for effecting relieving movements of the tool, and means to compensate the relieving operation at different blank diameters for the non-radial cutting faces on the teeth of the blank.

139. The combination comprising a rotatable spindle adapted to carry a blank having teeth provided with non-radially arranged cutting faces, a cutting tool, means for effecting feeding movements of said tool, a transversely movable tool slide, a transverse guideway for the slide, means for moving the tool slide, means supplemental to the last named means for retarding the said movement of the tool, slide means for vertically supporting the slide and the guideway, automatically-acting means for effecting relieving movements of the tool, and means to compensate the relieving operation at different blank diameters for the non-radial cutting faces on the teeth of the blank.

140. In a machine of the class described, the combination comprising a rotatable spindle adapted to carry a blank having teeth provided with non-radially arranged cutting faces, a cutting tool, automatic means for stopping the spindle rotation after each rotation of the blank to a predetermined extent, mechanism for withdrawing the tool from the blank at the time of each stopping of the latter, mechanism acting normally independently of the last said mechanism for returning the tool to the blank after each withdrawal, automatically acting means for effecting relieving movements of the tool, and means to compensate the relieving operation at different blank diameters for the non-radial cutting faces on the teeth of the blank.

141. A metal-cutting machine comprising in combination, a rotatable spindle adapted to carry a blank having teeth provided with non-radially arranged cutting faces, a cutting tool movable longitudinally of the spindle axis and also movable transversely toward or from the blank, automatic means for withdrawing the tool from the blank, means for returning the tool toward the blank after each withdrawal, means supplemental to the withdrawing means and acting independently thereof for retarding the movement of the tool toward the blank, automatically-acting mechanism for effecting regular relieving movements of the tool supplemental to the aforesaid movements, and means to compensate the relieving operation at different blank diameters for the non-radial cutting faces on the teeth of the blank.

142. A metal-cutting machine comprising in combination, a spindle adapted to carry a blank having teeth provided with non-radially arranged cutting faces, a cutting tool movable longitudinally of the spindle axis and also movable transversely toward or from the blank, automatic means for withdrawing the tool from the blank, means for returning the tool toward the blank after each withdrawal, means supplemental to the withdrawing means and acting independently thereof for retarding the movement of the tool toward the blank, automatically-acting mechanism for effecting regular relieving movements of the tool supplemental to the aforesaid movements and in timed relation to the spindle rotation, means to compensate the relieving operation at different blank diameters for the non-radial cutting faces on the teeth of the blank, and means for varying the said timed relation in accordance with the longitudinal movement of the tool.

143. A metal-cutting machine comprising in combination, a rotatable spindle adapted to carry a blank having teeth provided with non-radially arranged cutting faces, a cutting tool movable longitudinally of the spindle axis, and also movable transversely toward or from the blank, means for feeding the tool longitudinally, automatic means for withdrawing the tool from the blank at intervals, means for returning the tool toward the blank after each withdrawal, means supplemental to the withdrawing means and acting independently thereof for retarding the movement of the tool toward the blank, means for limiting the movements of the tool toward the blank at different positions so that the tool serves to cut the blank with different diameters, automatically-acting mechanism for effecting regular relieving movements of the tool supplemental to the aforesaid movements, and means to compensate the relieving operation at different blank diameters for the non-radial cutting faces on the teeth of the blank.

144. A metal-cutting machine comprising in combination, a rotatable spindle adapted to carry a blank having teeth provided with non-radially arranged cutting faces, a cutting tool movable longitudinally of the spindle axis and also movable transversely towards or from the blank, means for feeding the tool longitudinally, automatic means including a former and a former pin for so controlling the position of the tool as it is moved longitudinally that it will cut the blank with a predetermined contour corresponding to that of the former, automatic means for withdrawing the pin from the former at intervals, means supplemental to the withdrawing means and acting independently thereof for returning the pin to the former after each withdrawal, automatically-acting means for effecting relieving movements of the tool, and means to compensate the relieving operation at different blank diameters for the non-radial cutting faces on the teeth of the blank.

145. A metal-cutting machine, comprising in combination, a rotatable spindle adapted to carry a blank having teeth provided with non-radially arranged cutting faces, a cutting tool movable longitudinally of the spindle axis and also movable transversely toward or from the blank, means for feeding the tool longitudinally, automatic means including a former and a former pin for so controlling the positions of the tool as it is moved longitudinally that it will cut a blank with a predetermined contour corresponding to that of the former, automatic means for withdrawing the pin from the former at intervals, means for returning the pin to the former after each interval, means supplemental to the withdrawing means for retarding the movement of the pin toward the former, automatically-acting mechanism or effecting relieving movements of the tool, and means to compensate the relieving operation at different blank diameters for the non-radial cutting faces on the teeth of the blank.

146. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, automatically-acting mechanism for effecting regular relieving movements of the tool supplemental to the aforesaid movements, and means to compensate the relieving operation at different blank diameters for the non-radial cutting faces on the teeth of the blank.

147. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, automatically-acting mechanism for effecting regular relieving movements of the tool supplemental to the aforesaid movement and in timed relation to the spindle rotation, means to compensate the relieving operation at different blank diameters for the non-radial cutting faces on the teeth of the blank, and means for varying the said timed relation in accordance with the longitudinal movements of the tool.

148. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic means for withdrawing the tool from the blank at the time of the stopping of the spindle, means supplemental to the withdrawing means and acting independently thereof for returning the tool toward the blank after each withdrawal, automatically-acting mechanism for effecting regular relieving movements of the tool supplemental to the aforesaid movements, and means to compensate the relieving operation at different blank diameters for the non-radial cutting faces on the teeth of the blank.

149. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic mechanism for stopping the spindle rotation at intervals, automatic means for withdrawing the tool from the blank at the time of each stopping of the spindle, means supplemental to the withdrawing means and acting independently thereof for returning the tool toward the blank after each withdrawal, automatically-acting mechanism for effecting regular relieving movements of the tool supplemental to the aforesaid movements and in timed relation to the spindle rotation, means to compensate the relieving operation at different blank diameters for the non-radial cutting faces on the teeth of the blank, and means for varying the said timed relation in accordance with longitudinal movement of the tool.

150. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means for withdrawing the tool from the blank at the time of each longitudinal movement, means supplemental to the withdrawing means and acting independently thereof for returning the tool toward the blank after each withdrawal, automatically-acting mechanism for effecting regular relieving movements of the tool supplemental to the aforesaid movements, and means to compensate the relieving operation at different blank diameters for the non-radial cutting faces on the teeth of the blank.

151. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means for withdrawing the tool from the blank at the time of each longitudinal movement, means supplemental to the withdrawing means and acting independently thereof for returning the tool toward the blank after each withdrawal, automatically-acting mechanism for effecting regular relieving movements of the tool supplemental to the aforesaid movements and in timed relation to the spindle rotation, means for varying the said timed relation in accordance with the longitudinal movements of the tool, and means to compensate the relieving operation at different blank diameters for the non-radial cutting faces on the teeth of the blank.

152. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, automatically-acting mechanism for effecting regular relieving movements of the tool supplemental to the aforesaid movements, and means to compensate the relieving operation at different blank diameters for the non-radial cutting faces on the teeth of the blank.

153. A machine of the class described comprising in combination, a rotatable spindle adapted to carry a blank having teeth provided with non-radially arranged cutting faces, a cutting tool movable longitudinally of the spindle axis, and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, automatically-acting mechanism for effecting regular relieving movements of the tool supplemental to the aforesaid movements and in timed relation to the spindle rotation, and means to compensate the relieving operation at different blank diameters for the non-radial cutting faces on the teeth of the blank.

154. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means including a former and a former pin for so controlling the positions of the tool as it is moved longitudinally that it will cut the blank with a predetermined contour corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, means for effecting relieving movements of the tool, and means to compensate the relieving operation at different blank diameters for the non-radial cutting faces on the teeth of the blank.

155. A machine of the class described comprising in combination, a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut a blank with a predetermined contour corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, automatically-acting mechanism for effecting regular relieving movements of the tool supplemental to the aforesaid movements, and means to compensate the relieving operation at different blank diameters for the non-radial cutting faces on the teeth of the blank.

156. The described combination comprising a rotatable spindle adapted to carry a blank having teeth provided with non-radially arranged cutting faces, a transversely movable cutting tool, a support for said tool, automatic means for locking the tool to the support at intervals and for releasing it at intervals to permit transverse movement, means for effecting feeding movements between the tool and the blank, automatically-acting mechanism for effecting relieving movements of the tool, and means to compensate the relieving operation at different blank diameters for the non-radial cutting faces on the teeth of the blank.

157. The described combination comprising a rotatable spindle adapted to carry a blank having teeth provided with non-radially arranged cutting faces, a cutting tool, a transversely movable tool slide, a support for the tool slide, means for locking the slide to the support for releasing it to permit transverse movement, means for elevating the slide out of contact with the support when it is released, means for effecting feeding movements between the tool and the blank, automatically-acting means for effecting relieving movements of the tool, and means to compensate the relieving operation at different blank diameters for the non-radial cutting faces on the teeth of the blank.

158. The described combination comprising a rotatable spindle adapted to carry a blank having teeth provided with non-radially arranged cutting faces, a longitudinally movable tool carriage, a transversely movable cutting tool on the carriage, automatic means for withdrawing the tool from the blank at intervals, locking means between the tool and the carriage, automatic means effecting unlocking at the time of each withdrawal and for subsequently effecting a locking operation, automatically acting means for effecting relieving movements of the tool, and means to compensate the relieving operation at different blank diameters for the non-radial cutting faces on the teeth of the blank.

159. The described combination comprising a rotatable spindle adapted to carry a blank having teeth provided with non-radially arranged cutting faces, a cutting tool, a transversely movable tool slide, a second transversely movable slide supporting the tool slide, means for locking the slides together or for releasing them to permit relative movement, means for effecting the feeding operation of the tool relative to the blank, automatically-acting means for effecting relieving movements of the tool, and means to compensate the relieving operation at different blank diameters for the non-radial cutting faces on the teeth of the blank.

160. The described combination comprising a rotatable spindle adapted to carry a blank having teeth provided with non-radially arranged cutting faces, a cutting tool, a longitudinally movable tool carriage, a transversely movable slide on the carriage, a tool slide mounted on the first slide and transversely movable thereon, locking means between the slides, automatic means engaging the first said slide for moving both slides transversely to withdraw the tool from the blank at intervals, automatic means acting immediately after withdrawal to unlock the tool slide from the first slide and subsequently acting to lock the tool slide to the first slide, automatically-acting mechanism for effecting relieving movements, and means to compensate the relieving operation at different blank diameters for the non-radial cutting faces on the teeth of the blank.

161. In a metal-cutting machine, the combination comprising a rotatable spindle adapted to carry a blank having teeth provided with non-radially arranged cutting faces, a longitudinally movable tool carriage, a transversely movable cutting tool on the carriage, automatic means for moving the carriage longitudinally at intervals, locking means between the tool and the carriage, automatic means for effecting locking after each carriage movement and unlocking before the next following carriage movement, automatically-acting means for effecting relieving movements of the tool, and means to compensate the relieving operation at different blank diameters for the non-radial cutting faces on the teeth of the blank.

162. In a metal-cutting machine, the combination comprising a rotatable spindle adapted to carry a blank having teeth provided with non-radially arranged cutting faces, a longitudinally movable tool carriage, a transversely movable cutting tool on the carriage, automatic means for moving the carriage longitudinally at intervals, automatic means for withdrawing the tool from the blank at the time of each longitudinal movement, means for returning the tool to the blank at each carriage movement, locking means between the tool and the carriage, automatic means for effecting unlocking before each withdrawal and locking after each return, automatically-acting means for effecting relieving movements of the tool, and means to compensate the relieving operation at different blank diameters for the non-radial cutting faces on the teeth of the blank.

163. In a metal-cutting machine, the combination comprising a rotatable spindle adapted to carry a blank having teeth provided with non-radially arranged cutting faces, a longitudinally movable tool carriage, a transversely movable cutting tool on the carriage, automatic means for moving the carriage longitudinally at intervals, a longitudinally movable tool carriage, a cutting tool, a transversely movable tool slide on the carriage, automatic means for moving the tool slide transversely to withdraw the tool from the blank at the time of each longitudinal movement, locking means between the slide and carriage, automatic means for effecting locking after each carriage movement and unlocking before the next following carriage movement, automatically-acting means for effecting relieving movements of the tool, and means to compensate the relieving operation at different blank diameters for the non-radial cutting faces on the teeth of the blank.

164. In a metal-cutting machine, the combination comprising a rotatable spindle adapted to carry a blank having teeth provided with non-radially arranged cutting faces, a longitudinally movable tool carriage, a transversely movable cutting tool on the carriage, automatic means for moving the carriage longitudinally at intervals, a longitudinally movable tool carriage, a transversely movable slide on the carriage, a tool slide mounted on the first said slide and transversely movable thereon, automatic means for moving the carriage longitudinally at intervals, automatic means for moving the slide transversely to withdraw the tool from the blank at the time of each longitudinal movement, locking means between the slide, automatic means for effecting unlocking at the time of each longitudinal movement and withdrawal and for subsequently effecting locking, automatically-acting means for effecting relieving movements of the tool, and means to compensate the relieving operation at different blank diameters for the non-radial cutting faces on the teeth of the blank.

165. The combination comprising a rotatable spindle adapted to carry a blank having teeth provided with non-radially arranged cutting faces, a longitudinally movable tool carriage, a transversely movable tool slide on the carriage, automatic means for moving the carriage longitudinally at intervals, automatic means for moving the tool slide transversely to withdraw the tool from the blank at the time of each longitudinal movement, locking means between the slide and the carriage, automatic means for effecting locking after each said carriage movement and unlocking before the next following carriage movement, automatically-acting mechanism for effecting relieving movements of the tool relatively to the said tool slide, and means to compensate the relieving operation at different blank diameters for the non-radial cutting faces on the teeth of the blank.

166. The combination comprising a rotatable spindle adapted to carry a blank having teeth provided with non-radially arranged cutting faces, a longitudinally movable tool carriage, a transversely movable tool slide on the carriage, automatic means for moving the carriage longitudinally at intervals, automatic means for stopping the spindle rotation at the time of each longitudinal movement, automatic means for moving the tool slide transversely to withdraw the tool from the blank at the time of each longitudinal movement, locking means between the slide and the carriage, automatic means for effecting locking after each said carriage movement and unlocking before the next following carriage movement, automatically-acting mechanism for effecting relieving movements of the tool relatively to the said tool slide, and means to compensate the relieving operation at different blank diameters for the non-radial cutting faces on the teeth of the blank.

167. The combination comprising a rotatable spindle adapted to carry a blank having teeth provided with non-radially arranged cutting faces, a longitudinally movable tool carriage, a transversely movable tool slide on the carriage, automatic means for moving the carriage longitudinally at intervals, automatic means for moving the tool slide transversely to withdraw the tool from the blank at the time of each longitudinal movement, locking means between the slide and the carriage, automatic means for effecting locking after each said carriage movement and unlocking before the next following carriage movement, automatically-acting mechanism for effecting relieving movements of the tool relatively to the said tool slide and in timed relation to the spindle rotation, means to compensate the relieving operation at different blank diameters for the non-radial cutting faces on the teeth of the blank, and means for varying the said timed relation in accordance with longitudinal movement of the carriage.

168. The combination comprising a rotatable spindle adapted to carry a blank having teeth provided with non-radially arranged cutting faces, a longitudinally movable tool carriage, a transversely movable tool on the carriage, automatic means for moving the carriage longitudinally at intervals, means for controlling the tool so as to cause it to assume different positions with respect to the carriage following successive movements of the carriage so that it cuts the blank with different diameters, locking means between the tool and the carriage, automatic means for effecting locking after each carriage movement and unlocking before the next following carriage movement, automatically-acting means for effecting relieving movements of the tool, and means to compensate the relieving operation at different blank diameters for the non-radial cutting faces on the teeth of the blank.

169. The combination comprising a rotatable spindle adapted to carry a blank having teeth provided with non-radially arranged cutting faces, a longitudinally movable tool carriage, a transversely movable tool on the carriage, automatic means for moving the carriage longitudinally at intervals, means for controlling the slide to cause it to assume different positions following successive movements of the carriage so that the tool cuts the blank with different diameters, locking means between the slide and the carriage, automatic means for effecting locking after each carriage movement and unlocking before the next following carriage movement, automatic means for elevating the tool slide out of contact with the first said slide each time unlocking takes place, automatically-acting means for effecting relieving movements of the tool, and means to compensate the relieving operation at different blank diameters for the non-radial cutting faces on the teeth of the blank.

170. The combination comprising a rotatable spindle adapted to carry a blank having teeth provided with non-radially arranged cutting faces, a longitudinally movable tool carriage, a transversely movable tool on the carriage, automatic means for moving the carriage longitudinally at intervals, means including a former and a transversely movable former pin on the carriage for controlling the tool to cause it to assume different positions with respect to the carriage following successive movements of the carriage so that it cuts the blank with a predetermined contour differing from a straight line and corresponding to that of the former, locking means between the former pin and the carriage, automatic means for effecting locking after each carriage movement and unlocking before the next following carriage movement, automatically-acting means for effecting relieving movements of the tool, and means to compensate the relieving operation at different blank diameters for the non-radial cutting faces on the teeth of the blank.

171. The combination comprising a rotatable spindle adapted to carry a blank having teeth provided with non-radially arranged cutting faces, a longitudinally movable carriage, a transversely movable slide on the carriage, a cutting tool on the slide, automatic means for moving the carriage longitudinally at intervals, means including a former and a former pin on the slide for controlling the slide to cause it to assume different positions following successive movements of the carriage so that the tool cuts the blank with a predetermined contour corresponding to that of the former, automatic means for moving the slide to withdraw the tool from the blank and the former pin from the former at the time of each longitudinal movement, locking means between the slide and the carriage, automatic means for effecting locking after each carriage movement and unlocking before the next following carriage movement, automatically-acting mechanism for effecting relieving movements of the tool relatively to the said tool slide, and means to compensate the relieving operation at different blank diameters for the non-radial cutting faces on the teeth of the blank.

172. The combination comprising a rotatable spindle adapted to carry a blank having teeth provided with non-radially arranged cutting faces, a longitudinally movable carriage, a transversely movable slide on the carriage, a cutting tool on the slide, automatic means for moving the carriage longitudinally at intervals, means including a former and a former pin on the slide for controlling the slide to cause it to assume different positions following successive movements of the carriage so that the tool cuts the blank with a predetermined contour corresponding to that of the former, automatic means for moving the slide to withdraw the tool from the blank and the former pin from the former at the time of each longitudinal movement, locking means between the slide and the carriage, automatic means for effecting locking after each carriage movement and unlocking before the next following carriage movement, automatically-acting mechanism for effecting relieving movements of the tool relatively to the said tool slide and in timed relation to the spindle rotation, means to compensate the relieving operation at different blank diameters for the non-radial cutting faces on the teeth of the blank, and means for varying the said timed relation in accordance with longitudinal movement of the carriage.

173. The combination comprising a rotatable spindle adapted to carry a blank having teeth provided with non-radially arranged cutting faces, a cutting tool movable transversely of the spindle axis toward or from the blank, means for moving the tool towards the blank, means supplemental to the last said means for retarding the movement of the said tool, means for locking the tool in operative relation to the blank, means for effecting a feeding movement of the tool relative to the blank, automatically-acting means for effecting relieving movements of the tool, and means to compensate the relieving operation at different blank diameters for the non-radial cutting faces on the teeth of the blank.

174. The combination comprising a rotatable spindle adapted to carry a blank having teeth provided with non-radially arranged cutting faces, a cutting tool movable transversely of the spindle axis toward or from the blank, means for moving the tool towards the blank, automatic means for withdrawing the tool from the blank, means supplemental to the last said means and acting independently thereof for returning the tool toward the blank after each withdrawal, means for locking the tool in operative relation to the blank, means for effecting feeding movements of the tool relative to the blank, automatically-acting means for effecting relieving movements of the tool, and means to compensate the relieving operation at different blank diameters.

175. The combination comprising a rotatable spindle adapted to carry a blank having teeth provided with non-radially arranged cutting faces, a cutting tool, a transversely movable tool slide, a second transversely movable slide supporting the tool slide, automatic means for moving the tool slide transversely to withdraw the tool from the blank at intervals, means supplemental to the last said means for moving the tool slide to return the tool towards the blank after each withdrawal, means for locking the two slides together or for unlocking them, automatic means for effecting relieving movements of the tool, and means to compensate the relieving operation at different blank diameters for the non-radial cutting faces on the teeth of the blank.

176. The combination comprising a spindle adapted to carry a blank having teeth provided with non-radially arranged cutting faces, a transversely movable tool slide, a second transversely movable slide supporting the tool slide, automatic means engaging the second slide for moving both slides transversely to withdraw the tool from the blank at intervals, automatic means acting immediately after withdrawal to unlock the tool slide from the other slide and subsequently acting to lock the two slides together, automatic means supplemental to the withdrawing means and acting immediately after unlocking for moving the tool slide relatively to the second slide to return the tool toward the blank, means for effecting relieving movements of the tool, and means to compensate the relieving operation at different blank diameters for the non-radial cutting faces on the teeth of the blank.

177. The combination comprising a spindle adapted to carry a blank having teeth provided with non-radially arranged cutting faces, a transversely movable tool slide, a second transversely movable slide supporting the tool slide, automatic means engaging the second slide for moving both slides transversely to withdraw the tool from the blank at intervals, automatic means acting immediately after withdrawal to unlock the tool slide from the other slide and subsequently acting to lock the two slides together, automatic means supplemental to the withdrawing means and acting immediately after unlocking for moving the tool slide relatively to the second slide to return the tool toward the blank, means associated with the withdrawing means for returning the second slide to its initial position after the two slides have been unlocked, means for effecting relieving movements of the tool, and means to compensate the relieving operation at different blank diameters for the non-radial cutting faces on the teeth of the blank.

178. The combination comprising a rotatable spindle adapted to carry a blank having teeth provided with non-radially arranged cutting faces, a cutting tool, automatic mechanism for effecting at intervals relative movements between the tool and the blank longitudinally of the latter, mechanism for withdrawing the tool from the blank before each longitudinal movement, mechanism acting entirely independently of the last said mechanism for returning the tool to the blank after each longitudinal movement, means for locking the tool in operative relation to the blank after it has been returned, automatically-acting means for effecting relieving movements of the tool, and means to compensate the relieving operation at different blank diameters for the non-radial cutting faces on the teeth of the blank.

179. The combination comprising a rotatable spindle adapted to carry a blank having teeth provided with non-radially arranged cutting faces, a cutting tool, automatic mechanism for effecting at intervals relative movements between the tool and the blank longitudinally of the latter, mechanism for withdrawing the tool from the blank at the time of each longitudinal movement, means for returning the tool to the blank after each withdrawal, means for retarding the movement of the tool towards the blank, means for locking the tool in operative relation to the blank after it has been returned, automatically-acting means for effecting relieving movements of the tool, and means to compensate the relieving operation at different blank diameters for the non-radially arranged cutting faces on the teeth of the blank.

180. A metal-cutting machine comprising a rotatable spindle adapted to carry a blank having teeth provided with non-radially arranged cutting faces, a cutting tool movable transversely of the spindle axis toward or from the blank, automatic means for withdrawing the tool from the blank, means supplemental to the last said means and acting independently thereof for returning the tool toward the blank after each withdrawal, means for locking the tool in operative relation to the blank after it has been returned, automatically-acting mechanism for effecting relieving movements of the tool relatively to the said locking means and supplemental to the aforesaid movements, and means to compensate the relieving operation at different blank diameters for the non-radial cutting faces on the teeth of the blank.

181. A metal-cutting machine comprising a rotatable spindle adapted to carry a blank having teeth provided with non-radially arranged cutting faces, a cutting tool movable transversely of the spindle axis toward or from the blank, automatic means for withdrawing the tool from the blank, means for returning the tool toward the blank after each withdrawal, means for retarding the movement of the tool toward the blank, means for locking the tool in operative relation to the blank after it has been returned, automatically-acting mechanism for effecting relieving movements of the tool relatively to the said locking means and supplemental to the aforesaid movements, and means to compensate the relieving operation at different blank diameters for the non-radial cutting faces on the teeth of the blank.

182. A metal-cutting machine comprising a rotatable spindle adapted to carry a blank having teeth provided with non-radially arranged cutting faces, a cutting tool movable longitudinally and also transversely of the spindle axis toward or from the blank, automatic means for withdrawing the tool from the blank, means supplemental to the last said means and acting independently thereof for returning the tool toward the blank after each withdrawal, means for locking the tool in operative relation to the blank after it has been returned, automatically-acting mechanism for effecting relieving movements of the tool relatively to the said locking means and supplemental to the aforesaid movements in timed relation to the spindle rotation, means to compensate the relieving operation at different blank diameters for the non-radial cutting faces on the teeth of the blank, and means for changing the said timed relation in accordance with the longitudinal tool movement so that a blank with helical teeth may be relieved.

183. A metal-cutting machine comprising a rotatable spindle adapted to carry a blank having teeth provided with non-radially arranged cutting faces, a transversely movable tool slide, a second transversely movable slide supporting the tool slide, automatic means for moving the tool slide transversely to withdraw the tool from the blank at intervals, means supplemental to the last said means for moving the tool slide to return the tool toward the blank after each withdrawal, means for locking the two slides together or for unlocking them, automatically-acting mechanism for effecting relieving movements of the tool relatively to the said tool slide and supplemental to the aforesaid movements, and means to compensate the relieving operation at different blank diameters for the non-radial cutting faces on the teeth of the blank.

184. In a machine of the class described, the combination comprising a rotatable spindle adapted to carry a blank having teeth provided with non-radially arranged cutting faces, a cutting tool, automatic mechanism for effecting at intervals relative movements between the tool and the blank longitudinally of the latter, mechanism for withdrawing the tool from the blank before each longitudinal movement, mechanism acting entirely independently of the last said mechanism for returning the tool to the blank after each longitudinal movement, means for locking the tool in operative relation to the blank after it has been returned, automatically-acting mechanism for effecting relieving movements of the tool relatively to the said locking means and supplemental to the aforesaid movements, and means to compensate the relieving operation at different blank diameters for the non-radial cutting faces on the teeth of the blank.

185. In a machine of the class described, the combination comprising a rotatable spindle adapted to carry a blank having teeth provided with non-radially arranged cutting faces, a cutting tool, automatic mechanism for effecting at intervals relative movements between the tool and the blank longitudinally of the latter, mechanism for withdrawing the tool from the blank before each longitudinal movement, mechanism acting entirely independently of the last said mechanism for returning the tool to the blank after each longitudinal movement, means for locking the tool in operative relation to the blank after it has been returned, automatically-acting mechanism for effecting relieving movements of the tool relatively to the said locking means and supplemental to the aforesaid movements and in timed relation to the spindle rotation, means to compensate the relieving operation at different blank diameters for the non-radial cutting faces on the teeth of the blank, and means for changing the said timed relation in accordance with the longitudinal tool movement so that a blank with helical teeth may be relieved.

186. In a machine of the class described, the combination comprising a rotatable spindle adapted to carry a blank having teeth provided with non-radially arranged cutting faces, a cutting tool, automatic mechanism for effecting at intervals relative movements between the tool and the blank longitudinally of the latter, automatic mechanism for stopping the spindle rotation at the time of each longitudinal movement, mechanism for withdrawing the tool from the blank before each longitudinal movement, mechanism acting entirely independently of the last said mechanism for returning the tool to the blank after each longitudinal movement, means for locking the tool in operative relation to the blank after it is returned, automatically-acting mechanism for effecting relieving movements of the tool relatively to the said locking means and supplemental to the aforesaid movements, and means to compensate the relieving operation at different blank diameters for the non-radial cutting faces on the teeth of the blank.

187. In a machine of the class described, the combination comprising a rotatable spindle adapted to carry a blank having teeth provided with non-radially arranged cutting faces, a cutting tool, movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, means for locking the tool in its innermost position after each returning movement, automatically-acting mechanism for effecting regular relieving movements of the tool relatively to the locking means and supplemental to the aforesaid movements, and means to compensate the relieving operation at different blank diameters for the non-radial cutting faces on the teeth of the blank.

188. In a machine of the class described, the combination comprising a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, automatically-acting mechanism for effecting relieving movements of the tool relatively to the said locking means and supplemental to the aforesaid movements, means to compensate the relieving operation at different blank diameters for the non-radial cutting faces on the teeth of the blank, and means for varying the said timed relation in accordance with the longitudinal movements of the tool.

189. In a machine of the class described, the combination comprising a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, automatically-acting mechanism for effecting relieving movements of the tool relatively to the said locking means and supplemental to the aforesaid movements, and means to compensate the relieving operation at different diameters for the non-radial cutting faces on the teeth of the blank.

190. In a machine of the class described, the combination comprising a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, means for locking the tool and pin in their returned positions, automatically-acting mechanism for effecting regular relieving movements of the tool relatively to the said locking means and supplemental to the aforesaid movements, and means to compensate the relieving operation at different blank diameters for the non-radial cutting faces on the teeth of the blank.

191. In a machine of the class described the combination comprising a rotatable spindle adapted to carry a blank having teeth provided with non-radially arranged cutting faces, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut the blank with a predetermined contour corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, means for locking the tool and pin in their returned positions, automatically-acting mechanism for effecting regular relieving movements of the tool relatively to the locking means and supplemental to the aforesaid movements and in timed relation to the spindle rotation, means to compensate the relieving operation at different blank diameters for the non-radial cutting faces on the teeth of the blank, and means for varying the said timed relation in accordance with the longitudinal movements of the tool.

192. In a relieving machine for operating on a cutter blank having teeth provided with non-radially arranged cutting faces, the combination comprising a cutting tool, means for effecting feeding movements between the tool and the blank, means for guiding the cutting tool to cut a predetermined contour, means for effecting relieving movements of the tool relative to the blank, and means for changing the position of the relieving movements at different blank diameters to compensate for the non-radial cutting faces on the teeth of the blank.

193. In a relieving machine for operating on a cutter blank having helical teeth provided with non-radially arranged cutting faces, the combination comprising a cutting tool, means for effecting feeding movements between said tool and the blank, means for effecting relieving movements of the tool in conformity with the helical teeth on the blank, and means for varying the position of the relieving movements at different blank diameters to compensate for the non-radial cutting faces on the teeth of the blank.

194. In a relieving machine for operating on a cutter blank having teeth provided with non-radially arranged cutting faces, the combination comprising a cutting tool, means for effecting intermittent feeding movements between the tool and the blank, means for guiding the cutting tool to cut a predetermined contour, means for effecting relieving movements of the tool relative to the blank, and means for changing the position of the relieving movements at different blank diameters to compensate for the non-radial cutting faces on the teeth of the blank.

195. In a relieving machine for operating on a cutter blank having teeth provided with non-radially arranged cutting faces, the combination comprising a cutting tool, means for effecting intermittent feeding movements between the tool and the blank, means for guiding the cutting tool to cut a predetermined non-rectilinear contour, means for effecting relieving movements of the tool relative to the blank, and means for changing the position of the relieving movements at different blank diameters to compensate for the non-radial cutting faces on the teeth of the blank.

196. In a relieving machine for operating on a cutter blank having helical teeth provided with non-radially arranged cutting faces, the combination comprising a cutting tool, means for effecting feeding movements between said tool and the blank to form a cutter adapted to cut a predetermined contour differing from a straight line, and means for effecting relieving movements of the tool in conformity with the helical teeth on the blank and for varying the limits of the relieving movements at different blank diameters in conformity with the non-radial cutting faces on the teeth of the blank.

197. In a relieving machine for operating on a cutter blank having helical teeth provided with non-radially arranged cutting faces, the combination comprising a cutting tool, means for effecting intermittent longitudinal feeding movement of the cutting tool relative to the cutter blank, means for withdrawing the tool from engagement with the blank prior to each feeding movement and for restoring the tool into operative position relative to the blank after each feeding movement, means for effecting relieving movements of the tool in conformity with the helical teeth on the blank, and means for changing the position of the relieving movements of the tool at different blank diameters to compensate for the non-radial tooth faces on the blank.

198. In a relieving machine for operating on a cutter blank having teeth provided with non-radially arranged cutting faces, the combination comprising a cutting tool, means for effecting feeding movements between the tool and the blank, means comprising a pin and a former for guiding the cutting tool to cut a predetermined contour, means for varying the movements of the cutting tool to relieve the teeth on the blank, and means for changing the position of the relieving movements at different blank diameters to compensate for the non-radial cutting faces on the teeth of the blank.

199. In a relieving machine for operating on a cutter blank having helical teeth provided with non-radially arranged cutting faces, the combination comprising a cutting tool, means for effecting intermittent longitudinal feeding movements between said tool and the blank, means for withdrawing the tool from engagement with the blank prior to each feeding movement and for restoring the tool into operative position relative to the blank, means comprising a pin and a former for guiding the tool to cut a predetermined contour, means for effecting relieving movements of the tool in conformity with the helical teeth on the blank, and means for changing the position of the relieving movements at different blank diameters to compensate for the non-radial cutting faces on the teeth of the blank.

200. In a relieving machine for operating on a cutter blank having teeth provided with non-radially arranged cutting faces, the combination comprising a cutting tool, means for operating said tool to form a cutter adapted to cut a predetermined non-rectilinear contour, means for effecting relieving movements of the tool in conformity to the teeth on the blank, and means for varying the position of the relieving movements at different blank diameters to compensate for the non-radial cutting faces on the teeth of the blank.

201. In a relieving machine, the combination comprising a rotatable spindle adapted to carry a blank having teeth provided with non-radially arranged cutting faces, a cutting tool, means for effecting relative feeding movement between the tool and the blank longitudinally of the latter, means comprising a pin and former for moving the tool inward or outward during the feeding movement to cut the blank with different diameters, means for effecting relieving movements of the tool in timed relation to the blank rotation, and means for changing the position of the relieving movements of the tool at different blank diameters in conformity with the non-radial tooth faces on the blank.

202. In a relieving machine for operating on a cutter blank having helical teeth provided with non-radially arranged cutting faces, the combination comprising a cutting tool, means for effecting longitudinal feeding movements between the tool and the blank, means for varying the transverse position of the tool relative to the blank to permit the longitudinal feeding operation, means comprising a pin and a former for guiding the cutting tool to cut a predetermined contour, means for effecting relieving movements of the tool relative to the blanks, and means for changing the position of the relieving movements at different blank diameters to compensate for the non-radial cutting faces on the teeth of the blank.

203. In a relieving machine for operating on a cutter blank having teeth provided with non-radially arranged cutting faces, the combination comprising a cutting tool, means for effecting intermittent longitudinal feeding movements between the tool and the blank, means for withdrawing the tool from engagement with the blank prior to each feeding movement and for restoring the tool into operative position relatively to the blank after each feeding movement, a pin and a former member for guiding the tool to cut a predetermined contour, means for effecting relieving movements of the tool relative to the blank, and means for changing the position of the relieving movements at different blank diameters to compensate for the non-radial cutting faces on the teeth of the blank.

204. In a relieving machine for operating on a cutter blank having helical teeth provided with non-radially arranged cutting faces, the combination comprising a cutting tool, means for effecting longitudinal feeding movements between the tool and the blank, means for varying the transverse position of the tool relative to the blank to permit the longitudinal feeding movements, means comprising a pin and a former for guiding the cutting tool to cut a predetermined contour, means for effecting relieving movements, and means for changing the position of the relieving movements in accordance with the contour of the former to compensate for the non-radial cutting faces on the teeth of the blank.

205. In a relieving machine for operating on a cutter blank having undercut helical teeth, the combination comprising a cutting tool, means for effecting feeding movements between said tool and the blank, and means for effecting relieving movements of the tool in timed relation to the blank rotation and for changing the position of the relieving movements at different blank diameters in conformity with the undercut teeth on said blank.

206. In a relieving machine for operating on a cutter blank having undercut helical teeth, the combination with a cutting tool, and means for effecting intermittent longitudinal feeding movements of the cutting tool relative to the blank, of means for withdrawing the tool from engagement with the blank prior to each feeding movement and for moving the tool into operative relation to the blank after each feeding operation, means for effecting relieving movements of the tool in conformity with the helical teeth on the blank, and means for varying the position of the relieving movements at different blank diameters to compensate for the undercut teeth on the blank.

207. In a relieving machine, the combination comprising a rotatable spindle adapted to carry a blank having teeth provided with non-radially arranged cutting faces, a cutting tool, means for effecting relative feeding movement between the tool and the blank longitudinally of the latter, means comprising a pin and former for moving the tool inward and outward during the feeding movement to cut the blank with different diameters, means for effecting relieving movements of the tool in timed relation to the blank rotation, means for varying the relation between the relieving movements of the tool and the rotative movement of the blank in conformity with helical teeth on the blank, and means for changing the position of the relieving movements of the tool at different blank diameters in conformity with the non-radial tooth faces on the blank.

208. In a relieving machine for operating on a cutter blank having helical teeth provided with non-radially arranged cutting faces, the combination with a cutting tool and means for intermittently and longitudinally feeding the tool relatively to the blank, of means for effecting an oscillatory transverse movement of the cutting tool to obtain a relieving cut, and means for changing the position of the oscillatory movement at different blank diameters to compensate for the non-radial tooth faces on the blank.

209. In a relieving machine for operating on a cutter blank having helical teeth provided with non-radially arranged cutting faces, the combination comprising a cutting tool, means for effecting intermittent longitudinal feeding movement of the cutting tool relative to the cutter blank, means for withdrawing the tool from engagement with the blank prior to each feeding movement and for restoring the tool into operative position relative to the blank after each feeding means, means for effecting oscillatory transverse movements of the cutting tool to obtain relieving cuts, and means for changing the position of the oscillatory movements of the tool at different blank diameters to compensate for the non-radial tooth faces on the blank.

210. In a relieving machine for operating on a cutter blank having helical teeth provided with non-radially arranged cutting faces, the combination comprising a cutting tool, means for effecting longitudinal feeding movements between the tool and the blank, means for varying the transverse position of the tool relative to the blank to permit the longitudinal feeding movements, means comprising a pin and a former for guiding the cutting tool to cut a predetermined non-rectilinear contour, means for effecting relieving movements, and means for changing the position of the relieving movements in accordance with the contour of the former to compensate for the non-radial cutting faces on the teeth of the blank.

211. In a relieving machine for operating on a cutter blank having teeth provided with non-radially arranged cutting faces, the combination comprising a cutting tool, means for effecting feeding movements between the tool and the blank, means comprising a former for guiding the cutting tool to cut a predetermined contour, means for varying the movements of the cutting tool to relieve the teeth on the blank, and means for changing the position of the relieving movements in accordance with the contour of the former to compensate for the non-radial cutting faces on the teeth of the blank.

212. In a relieving machine for operating on a cutter blank having teeth provided with non-radially arranged cutting faces, the combination comprising a cutting tool, means for effecting intermittent longitudinal feeding movements between the tool and the blank, means for withdrawing the tool from engagement with the blank prior to each feeding movement and for restoring the tool into operative position relatively to the blank after each feeding movement, a pin and a former member for guiding the tool to cut a predetermined non-rectilinear contour, means for effecting relieving movements of the tool relative to the blank, and means for changing the position of the relieving movements at different blank diameters to compensate for the non-radial cutting faces on the teeth of the blank.

213. In a relieving machine, the combination of a rotatable spindle adapted to carry a blank having teeth provided with non-radially arranged cutting faces, a cutting tool, mechanism for effecting relative relieving movements of the tool at a normally uniform frequency, and means for changing the position of the relieving movements at different blank diameters to compensate for the non-radial cutting faces on the teeth of the blank.

214. In a relieving machine, the combination of a rotatable spindle adapted to carry a blank having teeth provided with non-radially arranged cutting faces, a cutting tool, mechanism for feeding the tool longitudinally of the blank, mechanism acting independently of the feeding mechanism for effecting relieving movements of the tool at a normally uniform frequency, and means for changing the position of the relieving movements at different blank diameters to compensate for the non-radial cutting faces on the teeth of the blank.

215. In a relieving machine, the combination of a rotatable spindle adapted to carry a blank having helical teeth provided with non-radially arranged cutting faces, a cutting tool, mechanism for effecting relative feeding movement between the tool and the blank longitudinally of the latter, mechanism acting independently of the feeding mechanism for effecting relieving movements of the tool at a normally uniform frequency, and means for changing the position of the relieving movements at different blank diameters to compensate for the non-radial cutting faces on the helical teeth of the blank.

216. The method of shaping a milling cutter blank having teeth provided with non-radially arranged cutting faces, which consists in effecting relative rotation between the blank and a cutting tool, in effecting relative transverse movement between the blank and the tool to cut the blank with different diameters, in effecting relieving movements between the tool and the blank, and in varying the relieving operation at different blank diameters to compensate for the non-radial cutting faces on the blank.

217. The method of shaping a milling cutter blank having helical teeth provided with non-radially arranged cutting faces, which consists in effecting relative rotation between the blank and a cutting tool, in effecting relative transverse movement between the blank and the tool to cut the blank with different diameters, in effecting relieving movements in conformity to the helical teeth on the blank, and in varying the relieving operation at different blank diameters to compensate for the non-radial cutting faces on the blank.

218. The method of shaping a milling cutter blank having teeth provided with non-radially arranged cutting faces, which consists in rotating the cutter blank, in effecting feeding movements of a cutting tool to cut the blank with different diameters, in reciprocating the cutting tool to provide the required relief on the teeth of the blank, and in varying the relieving operation at different blank diameters to compensate for the non-radial cutting faces on the blank.

219. The method of shaping a milling cutter blank having helical teeth provided with non-radially arranged cutting faces, which consists in rotating the cutter blank, in effecting feeding movements of a cutting tool to cut the blank with different diameters, in reciprocating the cutting tool in timed relation to the rotation of the blank to provide the required relief on the helical teeth of the blank, and in varying the relieving operation at different blank diameters to compensate for the non-radial cutting faces on the blank.

220. The method of shaping a milling cutter blank having teeth provided with non-radially arranged cutting faces, which consists in rotating the blank, in effecting intermittent longitudinal feeding movements between the tool and the blank, in effecting transverse movements of the tool relative to the blank to cut the blank with different diameters, in reciprocating the tool to provide the necessary relief, and in varying the relieving operation at different blank diameters to compensate for the non-radial cutting faces.

221. The method of shaping a milling cutter blank having helical teeth provided with non-radially arranged cutting faces, which consists in rotating the blank, in effecting intermittent longitudinal feeding movements of the tool relative to the blank, in effecting transverse movements of the tool to cut the blank with different diameters, in reciprocating the tool in timed relation to the blank rotation to provide the required relief on the helical teeth of the blank, and in varying the relieving operation at different blank diameters to compensate for the non-radial cutting faces.

222. The method of shaping a milling cutter blank having helical teeth provided with non-radially arranged cutting faces, which consists in effecting relative feeding movements between a cutting tool and the blank longitudinally of the latter, in varying the blank rotation according to the helical teeth on the blank, in effecting relieving movements between the tool and the blank, and in varying the relieving operation at different blank diameters to compensate for the non-radial cutting faces on the teeth of the blank.

223. The method of shaping a milling cutter blank having helical teeth provided with non-radially arranged cutting faces, which consists in effecting intermittent feeding movements of a cutting tool relative to the blank, in varying the blank rotation according to the helical teeth on the blank, in effecting relieving movements between the tool and the blank, and in varying the relieving operation at different blank diameters to compensate for the non-radial cutting faces on the teeth of the blank.

224. The method of shaping a milling cutter blank having helical teeth provided with non-radially arranged cutting faces, which consists in effecting intermittent feeding movements of a cutting tool relative to the blank, in effecting transverse movements of the tool to permit the feeding movements, in varying the blank rotation according to the helical teeth, in effecting relieving movements between the tool and the blank, and in varying the relieving operation at different blank diameters to compensate for the non-radial cutting faces on the teeth of the blank.

225. The method of shaping a milling cutter blank having helical teeth provided with non-radially arranged cutting faces, which consists in effecting relative feeding movements between the cutting tool and the blank longitudinally of the latter, in effecting relative transverse movement between the blank and the tool to cut the blank with different diameters, in varying the blank rotation according to the helical teeth on the blank, in effecting relieving movements between the tool and the blank, and in varying the relieving operation at different blank diameters to compensate for the non-radial cutting faces on the teeth of the blank.

226. The method of shaping a milling cutter blank having helical teeth provided with non-radially arranged cutting faces, which consists in effecting intermittent feeding movements between a cutting tool and the blank, in effecting transverse movements of the tool to permit the feeding movements, in varying the transverse movements to cut the blank with different diameters, in varying the blank rotation according to the helical teeth on the blank, in effecting relieving movements between the tool and the blank, and in varying the relieving operation at different blank diameters to compensate for the non-radial cutting faces on the teeth of the blank.

227. The method of shaping a milling cutter blank having helical teeth provided with non-radially arranged cutting faces, which consists in effecting feeding movements of a tool longitudinally of the blank, in effecting relieving movements of the tool at a normally uniform frequency, in varying the blank rotation relative to the uniform relieving movements to effect relieving in conformity with the helical teeth on the blank, and in varying the relieving operation at different blank diameters to compensate for the non-radial cutting faces on the teeth of the blank.

228. The method of shaping a cutter blank having teeth provided with non-radially arranged cutting faces, which consists in effecting longitudinal feeding movements of the tool relative to the blank, in rotating the blank, in stopping the blank after each rotation to a predetermined extent, in effecting a predetermined whole number of regular relieving movements of the tool supplemental to the feeding movements while the blank is rotating to the aforesaid predetermined extent, and in varying the relieving operation at different blank diameters to compensate for the non-radial cutting faces on the teeth of the blank.

229. The method of shaping a cutter blank having helical teeth provided with non-radially arranged cutting faces, which consists in rotating the blank, in effecting feeding movements of the tool longitudinally of the blank, in withdrawing the tool from engagement with the blank at intervals to permit the feeding movements, in effecting regular relieving movements of the tool supplemental to the withdrawing movements, and in varying the relieving operation at different blank diameters to compensate for the non-radial cutting faces on the teeth of the blank.

230. The method of shaping a cutter blank having teeth provided with non-radially arranged cutting faces which consists in rotating the blank, in effecting feeding movements of the cutting tool relative to the blank, in withdrawing the tool from the blank to permit the feeding movements, in returning the tool into operative position relative to the blank by a retarded movement, in effecting regular relieving movements of the tool, and in varying the relieving operation at different blank diameters to compensate for the non-radial cutting faces on the teeth of the blank.

231. The method of shaping a cutter blank having teeth provided with non-radially arranged cutting faces, which consists in rotating the blank, in feeding the tool longitudinally of the blank, in controlling the position of the tool as it is moved longitudinally to cut the blank with a predetermined contour, in withdrawing the tool from engagement with the blank at intervals to permit the longitudinal feeding movements, in returning the tool into operative relation with the blank by a retarded movement, in effecting relieving movements between the tool and the blank, and in varying the relieving operation at different blank diameters to compensate for the non-radial cutting faces on the teeth of the blank.

232. The method of cutting a relieved milling cutter having teeth provided with non-radially arranged cutting faces, which consists in rotating the blank, in effecting feeding movements of a tool longitudinally of the blank, in effecting transverse movements of the tool to permit the feeding movements, the last said operative relation being so determined at each successive instance as to cut the blank with a varying diameter, in reciprocating the tool at all operative positions thereof in timed relation to the rotation of the blank to provide the required relief, and in varying the relieving operation at different blank diameters to compensate for the non-radial cutting faces on the blank.

233. The method of shaping a relieved milling cutter having teeth provided with non-radially arranged cutting faces, which consists in rotating the blank, in providing a former having a predetermined contour in accordance with which the blank is to be shaped, in providing a former pin connected with a cutting tool and normally engaging the former, in effecting feeding movements of the tool and the pin longitudinally of the blank and the former, in effecting transverse movements of the tool and the pin to permit the feeding movements, in reciprocating the tool at all operative positions thereof in timed relation to the rotation of the blank to provide the required relief, and in varying the relieving operation at different blank diameters to compensate for the non-radial cutting faces on the blank.

234. The method of shaping a relieved milling cutter having helicoidal teeth provided with non-radially arranged cutting faces, which consists in rotating the blank, in providing a former having a predetermined contour in accordance with which the blank is to be shaped, in providing a former pin connected with a cutting tool and normally engaging the former, in effecting feeding movements of the tool and the pin longitudinally of the blank and the former, in effecting transverse movements of the tool to permit the feeding movements, in reciprocating the tool at all operative positions thereof in timed relation to the rotation of the blank to provide the required relief, in varying the timed relation between the rotative movement of the blank and the relieving movements of the tool in accordance with the feeding movement, thereby following the helicoidal cutting faces, and in varying the 235. The method of cutting a milling cutter blank having a series of helical grooves therein forming helicoidal teeth provided with non-radially arranged cutting faces, which consists in rotating the blank, in effecting feeding movements of a tool longitudinally of the blank, in effecting transverse movements of the tool to permit the feeding movements, the aforesaid transverse movements being effected while one of the aforesaid helical grooves in the blank is opposite the tool, in reciprocating the tool at all operative positions thereof in timed relation to the rotation of the blank to provide the required relief, and in varying the relieving operation at different blank diameters to compensate for the non-radial cutting faces on the blank.

236. The method of shaping a milling cutter blank having a series of helical grooves therein forming helicoidal teeth provided with non-radially arranged cutting faces, which consists in rotating the blank, in providing a former having a predetermined non-rectilinear contour in accordance with which the blank is to be shaped, in providing a former pin connected with a cutting tool and normally engaging the former, in effecting feeding movements of the tool and the pin longitudinally of the blank and the former, in effecting transverse movements of the tool and pin to permit the feeding movements, the aforesaid transverse movements of the tool and pin being effected while one of the aforesaid grooves in the blank is opposite the tool, in reciprocating the tool at all operative positions thereof in timed relation to the rotation of the blank to provide the required relief, and in varying the relieving operation at different blank diameters to compensate for the non-radial cutting faces.

237. The method of shaping a milling cutter blank having a series of helical grooves therein forming helicoidal teeth provided with non-radially arranged cutting faces, which consists in providing a cutting tool in position to cut the blank, in repeatedly rotating the blank through approximately a single revolution and stopping it after each revolution with one of the helical grooves opposite the tool, in feeding the tool longitudinally of the blank at each stopping of the blank, in supplementally turning the blank at each feeding movement to maintain the helical groove opposite the tool, in withdrawing the tool from the blank prior to each feeding movement, in restoring the tool to operative relation with the blank after each feeding movement, in reciprocating the tool at all operative positions thereof in timed relation to the rotation of the blank to provide the required relief, and in varying the relieving operation at different blank diameters to compensate for the non-radial cutting faces.

238. The method of cutting a milling cutter blank having a series of helical grooves therein forming helicoidal teeth provided with non-radially arranged cutting faces, which consists in repeatedly rotating the blank through approximately a single revolution and stopping it after each revolution with one of the helical grooves opposite the tool, in feeding a tool longitudinally of the blank at each stopping thereof, in supplementally turning the blank at each feeding movement to maintain the helical groove opposite the tool, in effecting transverse movements of the tool to permit the feeding movements, in reciprocating the tool at all operative positions thereof in timed relation to the rotation of the blank to provide the required relief, and in varying the relieving operation at different blank diameters to compensate for the non-radial cutting faces on the blank.

239. The method of shaping a cutter blank having teeth provided with non-radially arranged cutting faces which consists in axially rotating the blank, in providing a cutting tool in position to cut the blank, in intermittently feeding the tool longitudinally of the blank, in withdrawing the tool from the blank prior to each feeding movement, in restoring the tool to operative relation with the blank after each feeding movement, the last said operative relation being so determined at each successive instance as to cut the blank with a varying diameter, in reciprocating the tool in timed relation to the rotation of the blank to provide the required relief, and in varying the relieving operation at different blank diameters to compensate for the non-radial cutting faces on the blank.

240. The method of shaping a cutter blank having teeth provided with non-radially arranged cutting faces which consists in axially rotating the blank, in providing a cutting tool in position to cut the blank, in automatically feeding the tool intermittently and longitudinally of the blank, in automatically withdrawing the tool from the blank prior to each feeding movement, in automatically restoring the tool to operative relation with the blank after each feeding movement, the last said operative relation being so determined at each successive instance as to cut the blank with a varying diameter, in reciprocating the tool in timed relation to the rotation of the blank to provide the required relief, and in varying the relieving operation at different blank diameters to compensate for the non-radial cutting faces on the blank.

241. The method of shaping a cutter blank having teeth provided with non-radially arranged cutting faces which consists in axially rotating the blank, in providing a cutting tool in position to cut the blank, in intermittently feeding the tool longitudinally of the blank, in withdrawing the tool from the blank prior to each feeding movement, in restoring the tool to operative relation with the blank after each feeding movement, the last said operative relation being determined in each successive instance in accordance with a predetermined contour to which the blank is to be shaped, in reciprocating the tool in timed relation to the rotation of the blank to provide the required relief, and in varying the relieving operation at different blank diameters to compensate for the non-radial cutting faces on the blank.

242. The method of shaping a cutter blank having teeth provided with non-radially arranged cutting faces which consists in axially rotating the blank, in providing a cutting tool in position to cut the blank, in automatically feeding the tool intermittently and longitudinally of the blank, in automatically withdrawing the tool from the blank prior to each feeding movement, in automatically restoring the tool to operative relation with the blank after each feeding movement, the last said operative relation being determined in each successive instance in accordance with a predetermined contour to which the blank is to be shaped, in reciprocating the tool in timed relation to the rotation of the blank to provide the required relief, and in varying the relieving operation at different blank diameters to compensate for the non-radial cutting faces on the blank.

243. The method of shaping a cutter blank having teeth provided with non-radially arranged cutting faces which consists in axially rotating the blank, in providing a cutting tool in position to cut the blank, in providing a former having a predetermined contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, in restoring the tool to operative relation with the blank and the pin to engagement with the former after each feeding movement, in reciprocating the tool in timed relation to the rotation of the blank to provide the required relief, and in varying the relieving operation at different blank diameters to compensate for the non-radial cutting faces on the blank.

244. The method of shaping a cutter blank having teeth provided with non-radially arranged cutting faces which consists in axially rotating the blank, in providing a cutting tool in position to cut the blank, in providing a former having a predetermined contour in accordance with which the blank is to be shaped, in providing a former pin connected with the tool and normally engaging the former, in automatically feeding the tool and the pin intermittently and longitudinally of the blank and the former, in automatically withdrawing the tool from the blank and the pin from the former prior to each feeding movement, in automatically restoring the tool to operative relation with the blank and the pin to engagement with the former after each feeding movement, in reciprocating the tool in timed relation to the rotation of the blank to provide the required relief, and in varying the relieving operation at different blank diameters to compensate for the non-radial cutting faces on the blank.

245. The method of cutting a relieving milling cutter having helicoidal teeth provided with non-radially arranged cutting faces which consists in rotating the blank, in providing a cutting tool in position to cut the blank, in intermittently feeding the tool longitudinally of the blank, in withdrawing the tool from the blank prior to each feeding movement, in restoring the tool to operative relation with the blank after each feeding movement, the last said operative relation being so determined at each successive instance as to cut the blank with a varying diameter, in reciprocating the tool at all operative positions thereof in timed relation to the rotation of the blank to provide the required relief, in varying the timed relation between the rotative movement of the blank and the relieving movements of the tool in accordance with the feeding movements, thereby following the helicoidal cutting faces, and in varying the relieving operation at different blank diameters to compensate for the non-radial cutting faces on the blank.

246. The method of cutting a milling cutter blank having a series of generally longitudinal grooves therein and non-radially arranged cutting faces which consists in axially rotating the blank, in providing a cutting tool in position to cut the blank, in intermittently feeding the tool longitudinally of the blank, in withdrawing the tool from the blank prior to each feeding movement, in restoring the tool to operative relation with the blank after each feeding movement, the aforesaid withdrawing, feeding and restoring movements being effected while one of the aforesaid grooves in the blank is opposite the tool, in reciprocating the tool in timed relation to the rotation of the blank to provide the required relief, and in varying the relieving operation at different blank diameters to compensate for the non-radial cutting faces on the blank.

247. The method of shaping a milling cutter blank having a series of generally longitudinal grooves therein and non-radially arranged cutting faces which consists in axially rotating the blank, in providing a cutting tool in position to cut the blank, in providing a former having a predetermined non-rectilinear contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, in restoring the tool to operative relation with the blank and the pin to engagement with the former after each feeding movement, the aforesaid withdrawing, feeding and restoring movements being effected while one of the aforesaid grooves in the blank is opposite the tool, in reciprocating the tool in timed relation to the rotation of the blank to provide the required relief, and in varying the relieving operation at different blank diameters to compensate for the non-radial cutting faces.

248. The method of cutting a milling cutter blank having a series of generally longitudinal grooves therein and non-radially arranged cutting faces which consists in providing a cutting tool in position to cut the blank, in repeatedly rotating the blank through a single revolution or approximately a single revolution and stopping it after each revolution with one of the grooves opposite the tool, in feeding the tool longitudinally of the blank at each stopping thereof, in withdrawing the tool from the blank prior to each feeding movement, in restoring the tool to operative relation with the blank after each feeding movement, in reciprocating the tool in timed relation to the blank rotation to provide the required relief, and in varying the relieving operation at different blank diameters to compensate for the non-radial cutting faces.

249. The method of shaping a milling cutter blank having a series of generally longitudinal grooves therein and non-radially arranged cutting faces which consists in providing a cutting tool in position to cut the blank, in repeatedly rotating the blank through a single revolution or approximately a single revolution and stopping it after each revolution with one of the grooves opposite the tool, in providing a former having a predetermined contour in accordance with which the blank is to be shaped, in providing a former pin connected with the tool and normally engaging the former, in feeding the tool and the pin longitudinally of the blank and the former at each stopping of the blank, in withdrawing the tool from the blank and the pin from the former prior to each feeding movement, in restoring the tool to operative relation with the blank and the pin to engagement with the former after each feeding movement, in reciprocating the tool in timed relation to the blank rotation to provide the required relief and in varying the relieving operation at different blank diameters to compensate for the non-radial cutting faces.

250. The method of cutting a milling cutter blank having a series of helical grooves therein forming helicoidal teeth provided with non-radially arranged cutting faces which consists in axially rotating the blank, in providing a cutting tool in position to cut the blank, in intermittently feeding the tool longitudinally of the blank, in withdrawing the tool from the blank prior to each feeding movement, in restoring the tool to operative relation with the blank after each feeding movement, the aforesaid withdrawing, feeding and restoring movements being effected while one of the aforesaid helical grooves in the blank is opposite the tool, in reciprocating the tool in timed relation to the blank rotation to provide the required relief, and in varying the relieving operation at different blank diameters to compensate for the non-radial cutting faces.

251. The method of shaping a milling cutter blank having a series of helical grooves therein forming helicoidal teeth provided with non-radially arranged cutting faces which consists in axially rotating the blank, in providing a cutting tool in position to cut the blank, in providing a former having a predetermined contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, in restoring the tool to operative relation with the blank and the pin to engagement with the former after each feeding movement, the aforesaid withdrawing, feeding and restoring movements being effected while one of the aforesaid grooves in the blank is opposite the tool, in reciprocating the tool in timed relation to the blank rotation to provide the required relief, and in varying the relieving operation at different blank diameters to compensate for the non-radial cutting faces.

252. The method of cutting a milling cutter blank having a series of helical grooves therein forming helicoidal teeth provided with non-radially arranged cutting faces which consists in providing a cutting tool in position to cut the blank, in repeatedly rotating the blank through approximately a single revolution and stopping it after each revolution with one of the helical grooves opposite the tool, in feeding the tool longitudinally of the blank at each stopping thereof, in withdrawing the tool from the blank prior to each feeding movement, in restoring the tool to operative relation with the blank after each feeding movement, in reciprocating the tool in timed relation to the blank rotation to provide the required relief, and in varying the relieving operation at different blank diameters to compensate for the non-radial cutting faces.

253. The method of shaping a milling cutter blank having a series of helical grooves forming helicoidal teeth provided with non-radially arranged cutting faces which consists in providing a cutting tool in position to cut the blank, in repeatedly rotating the blank through approximately a single revolution and stopping it after each revolution with one of the helical grooves opposite the tool, in providing a former having a predetermined contour in accordance with which the blank is to be shaped, in providing a former pin connected with the tool and normally engaging the former, in feeding the tool and the pin longitudinally of the blank and the former at each stopping of the blank, in withdrawing the tool from the blank and the pin from the former prior to each feeding movement, in restoring the tool to operative relation with the blank and the pin to engagement with the former after each feeding movement, in reciprocating the tool in timed relation to the blank rotation to provide the required relief, and in varying the relieving operation at different blank diameters to compensate for the non-radial cutting faces.

254. The method of cutting a milling cutter blank having a series of helical grooves forming helicoidal teeth provided with non-radially arranged cutting faces which consists in providing a cutting tool in position to cut the blank, in repeatedly rotating the blank through approximately a single revolution and stopping it after each revolution with one of the helical grooves opposite the tool, in feeding the tool longitudinally of the blank at each stopping thereof, in supplementally turning the blank at each feeding movement to maintain the helical groove opposite the tool, in withdrawing the tool from the blank prior to each feeding movement, in restoring the tool to operative relation with the blank after each feeding movement, in reciprocating the tool in timed relation to the blank rotation to provide the required relief, and in varying the relieving operation at different blank diameters to compensate for the non-radial cutting faces.

255. The method of shaping a milling cutter blank having a series of helical grooves therein forming helicoidal teeth provided with non-radial cutting faces which consists in providing a cutting tool in position to cut the blank, in repeatedly rotating the blank through approximately a single revolution and stopping it after each revolution with one of the helical grooves opposite the tool, in providing a former having a predetermined contour in accordance with which the blank is to be shaped, in providing a former pin connected with the tool and normally engaging the former, in feeding the tool and the pin longitudinally of the blank and the former at each stopping of the blank, in supplementally turning the blank at each feeding movement to maintain the helical groove opposite the tool, in withdrawing the tool from the blank and the pin from the former prior to each feeding movement, in restoring the tool to operative relation with the blank and the pin to engagement with the former after each feeding movement, in reciprocating the tool in timed relation to the blank rotation to provide the required relief, and in varying the relieving operation at different blank diameters to compensate for the non-radial cutting faces.

256. The method of shaping a milling cutter blank having teeth provided with non-radially arranged cutting faces, which consists in effecting relative rotation between the blank and the cutting tool, in effecting relative transverse movements between the blank and the tool to cut the blank with different diameters, in effecting relieving movements between the tool and the blank, and in varying the position of the relieving movements at different blank diameters to compensate for the non-radial cutting faces.

257. The herein described method of shaping a spirally relieved milling cutter having non-radial helicoidal cutting faces, which consists in axially rotating a blank having teeth provided with non-radial helicoidal front faces, in providing a cutting tool in position to cut the blank, in guiding the tool to cut the blank with different diameters, in reciprocating the tool in timed relation to the rotation of the blank to provide the required relief, in changing the limits of the relieving movements of the tool in accordance with the changes in diameter of the blank, thereby conforming to the non-radial tooth faces, and in varying the relation between the relieving movements of the tool and the rotative movement of the blank in proportion to the longitudinal movement of the tool, thereby conforming to the helicoids.

258. The method of shaping a milling cutter blank having non-radial cutting faces, which consists in rotating the blank, in positioning a cutting tool to cut the blank, in guiding the tool to cut the blank with a predetermined contour, in reciprocating the tool in timed relation to the rotation of the blank to provide the required relief, and in varying the position of the relieving movements of the tool at different blank diameters to compensate for the non-radial cutting faces.

259. The method of shaping a milling cutter blank having helical teeth provided with non-radially arranged cutting faces, which consists in effecting relative rotation between the blank and the cutting tool, in effecting relative transverse movements between the blank and the tool to cut the blank with different diameters, in effecting relieving movements in conformity to the helical teeth on the blank, and in varying the position of the relieving movements at different blank diameters to compensate for the non-radial cutting faces.

260. The method of shaping a milling cutter blank having teeth provided with non-radial cutting faces, which consists in rotating the blank, in guiding a cutting tool to cut the blank with different diameters, in effecting longitudinal intermittent feeding movements between the tool and the blank, in reciprocating the tool in timed relation to the rotation of the blank to provide the necessary relief, and in varying the position of the relieving movements of the tool at different blank diameters to compensate for the non-radial cutting faces.

261. The method of shaping a milling cutter blank having teeth provided with non-radial cutting faces, which consists in rotating the blank, in guiding a cutting tool to cut the blank with different diameters, in effecting intermittent longitudinal feeding movements of the tool relative to the blank in timed relation to the blank rotation, in reciprocating the tool in timed relation to the rotation of the blank to provide the necessary relief, and in varying the position of the relieving movements at different blank diameters to compensate for the non-radial cutting face.

262. The method of shaping a spirally relieved milling cutter having non-radial cutting faces, which consists in axially rotating a blank having teeth provided with non-radial front faces, in providing a cutting tool in position to cut the blank, in guiding the tool to cut the blank with different diameters, in reciprocating the tool in timed relation to the rotation of the blank to provide the required relief, and in changing the limits of the relieving movements of the tool in accordance with the changes in diameter of the blank, thereby conforming to the non-radial tooth faces.

263. The method of shaping a spirally relieved milling cutter having non-radial cutting faces, which consists in axially rotating a blank having teeth provided with non-radial front faces, in providing a cutting tool in position to cut the blank, in guiding the tool to cut the blank with different diameters, in reciprocating the tool in timed relation to the rotation of the blank to provide the required relief, and in moving the limits of the relieving movements of the tool outward in accordance with the changes in diameter of the blank, thereby conforming to the non-radial tooth faces.

264. The method of shaping a milling cutter blank having non-radially arranged cutting faces, which consists in rotating the blank, in guiding a cutting tool to cut the blank with different diameters, in reciprocating the tool in timed relation to the rotation of the blank to provide the necessary relief, and in moving the tool outward in accordance with the changes in diameter of the blank to compensate for the non-radial cutting faces on the blank.

265. The herein described method of shaping a spirally relieved milling cutter having non-radial cutting faces, the method consisting in axially rotating a blank having teeth provided with non-radial front faces, in providing a cutting tool in position to cut the blank, in guiding the tool to cut the blank with different diameters, in reciprocating the tool in timed relation to the rotation of the blank to provide the required relief, in changing the limits of the relieving movements of the tool in accordance with the changes in diameter of the blank, thereby conforming to the non-radial tooth faces, and in varying the rotative movement of the blank in proportion to the longitudinal movement of the tool, thereby conforming to the helicoids.

266. The method of shaping a milling cutter blank having teeth provided with non-radially arranged cutting faces, which consists in rotating the blank, in guiding a tool in accordance with a former to cut the blank with different diameters, in reciprocating the tool in timed relation to the rotation of the blank to provide the required relief, and in varying the relation between the tool and the former to compensate the relieving operation at different blank diameters for the non-radial cutting faces.

267. The method of shaping a milling cutter blank having helical teeth provided with non-radially arranged cutting faces, which consists in rotating the blank, in guiding a tool in accordance with a former to cut the blank with different diameters, in reciprocating the tool in timed relation to the rotation of the blank to provide the required relief on the helical teeth, and in varying the relation between the tool and the former to compensate the relieving operation at different blank diameters for the non-radial cutting faces.

268. The method of shaping a milling cutter blank having teeth provided with non-radial cutting faces which consists in rotating the blank, in guiding a tool in accordance with a former to cut the blank with different diameters, in effecting intermittent feeding movements between the tool and the blank, in reciprocating the tool in timed relation to the rotation of the blank to provide the necessary relief, and in varying the relation between the blank and the former to compensate the relieving operation at different blank diameters for the non-radial cutting faces.

269. The method of shaping a milling cutter blank having helical teeth provided with non-radial cutting faces, which consists in rotating the blank, in guiding a tool in accordance with a former to cut the blank with different diameters, in effecting intermittent feeding movements between the tool and the blank, in reciprocating the tool in timed relation to the rotation of the blank to provide the required relief on the helical teeth, and in varying the relation between the tool and the former to compensate the relieving operation at different blank diameters for the non-radial cutting faces.

In testimony whereof, I hereto affix my signature.

FRIEDERICH MÜLLER.

Certificate of Correction.

It is hereby certified that in Letters Patent No. 1,443,638, granted January 30, 1923, upon the application of Friederich Müller, of Hartford, Connecticut, for an improvement in "Machines for and Methods of Cutting Undercut Cutters," errors appear in the printed specification requiring correction as follows: Page 10, line 114, "$-\text{arcsin}\frac{F'}{r^o}$" should be $=arcsin\frac{F'}{r}$; page 11, line 90, "$\frac{1}{r}=$" should be $\frac{1}{r}=$; page 25, line 23, claim 64, after the word "contour" insert a comma; page 37, line 99, claim 145, for the word "or" read *for;* and that the said Letters Patent should be read with these corrections therein that the same may conform to the record of the case in the Patent Office.

Signed and sealed this 3d day of April, A. D., 1923.

[SEAL.]

KARL FENNING,
*Acting Commissioner of Patents.*